US010629900B2

(12) United States Patent
Dutta et al.

(10) Patent No.: US 10,629,900 B2
(45) Date of Patent: Apr. 21, 2020

(54) POROUS SILICON COMPOSITIONS AND DEVICES AND METHODS THEREOF

(71) Applicant: Corning Incorporated, Corning, NY (US)

(72) Inventors: Indrajit Dutta, Horseheads, NY (US); Brian Alan Kent, Horseheads, NY (US); Patrick David Tepesch, Corning, NY (US); Shawn Michael O'Malley, Horseheads, NY (US); Randall Eugene Youngman, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 393 days.

(21) Appl. No.: 15/350,343

(22) Filed: Nov. 14, 2016

(65) Prior Publication Data

US 2017/0149059 A1 May 25, 2017

Related U.S. Application Data

(60) Provisional application No. 62/259,877, filed on Nov. 25, 2015.

(51) Int. Cl.
*H01M 4/38* (2006.01)
*H01M 4/134* (2010.01)
*H01M 4/62* (2006.01)
*H01M 4/36* (2006.01)
*C03C 10/00* (2006.01)
*C03C 11/00* (2006.01)

(52) U.S. Cl.
CPC ......... *H01M 4/386* (2013.01); *C03C 10/0009* (2013.01); *C03C 11/005* (2013.01); *H01M 4/134* (2013.01); *H01M 4/62* (2013.01); *H01M 4/366* (2013.01)

(58) Field of Classification Search
None
See application file for complete search history.

(56) References Cited

U.S. PATENT DOCUMENTS 5,970,751 A * 10/1999 Maxon ................ C03B 19/14
501/38
8,158,090 B2 4/2012 Chiang et al.
8,415,555 B2 4/2013 Bellman
(Continued)

FOREIGN PATENT DOCUMENTS

CN 104846307 A 8/2015
GB 2520946 A 6/2015
(Continued)

OTHER PUBLICATIONS

Obrovac, M.N., et al., Reversible Cycling of Crystalline Silicon Powder, J. Electrochem. Soc., 154 (2) A103-A108, (2007).
(Continued)

*Primary Examiner* — Sin J Lee

(57) ABSTRACT

A porous silicon composition, a porous alloy composition, or a porous silicon containing cermet composition, as defined herein. A method of making: the porous silicon composition; the porous alloy composition, or the porous silicon containing cermet composition, as defined herein. Also disclosed is an electrode, and an energy storage device incorporating the electrode and at least one of the disclosed compositions, as defined herein.

26 Claims, 27 Drawing Sheets

(56) References Cited

U.S. PATENT DOCUMENTS

| | | | |
|---|---|---|---|
| 10,439,206 B2* | 10/2019 | Behan | H01M 4/386 |
| 2002/0048548 A1* | 4/2002 | Chaklader | C01B 3/08 |
| | | | 423/657 |
| 2008/0054349 A1 | 3/2008 | Cheng et al. | |
| 2009/0092899 A1 | 4/2009 | Treger | |
| 2013/0149549 A1 | 6/2013 | Borrelli | |
| 2013/0189575 A1 | 7/2013 | Anguchamy | |
| 2013/0216907 A1 | 8/2013 | Rayner et al. | |
| 2013/0220211 A1 | 8/2013 | Dutta | |
| 2013/0252101 A1 | 9/2013 | Zhou et al. | |
| 2014/0234721 A1 | 8/2014 | Yang et al. | |
| 2014/0308585 A1 | 10/2014 | Han et al. | |
| 2015/0044556 A1* | 2/2015 | Wang | H01M 4/366 |
| | | | 429/213 |
| 2015/0291470 A1 | 10/2015 | Borrelli | |
| 2015/0380733 A1 | 12/2015 | Lee et al. | |

FOREIGN PATENT DOCUMENTS

| | | | |
|---|---|---|---|
| JP | 2010170943 | | 8/2010 |
| WO | 2012114126 A1 | | 8/2012 |
| WO | 2013130696 | | 9/2013 |
| WO | 2014102219 | | 7/2014 |
| WO | 2014209682 A1 | | 12/2014 |
| WO | WO2015061159 A1 * | 4/2015 | C01B 33/06 |
| WO | 2015157538 | | 10/2015 |
| WO | 2016085953 | | 6/2016 |

OTHER PUBLICATIONS

Zhu, J., et al., Synthesis and characterization of mesoporous silicon directly from pure silica sodalite single crystal, Journal of Materials Science, 2010. 45(24): p. 6769-6774.

Bao, Z., et al., Chemical reduction of three-dimensional silica micro-assemblies into microporous silicon replicas. Nature, 2007. 446(7132): p. 172.

Cai, Y., et al., Three-Dimensional Magnesia-Based Nanocrystal Assemblies Via Low-Temperature Magnesiothermic Reaction of Diatom Microshells. Journal of the American Ceramic Society, 2005. 88(7): p. 2005.

Chen, Mesoporous Silicon Anodes Prepared by Magnesiothermic Reduction for Lithium Ion Batteries. Journal of the Electrochemical Society, 2011. 158(9): p. A1055-A1059.

Chevrier, V.L., et al., Evaluating Si-Based Materials for Li-Ion Batteries in Commercially Relevant Negative Electrodes. Journal of the Electrochemical Society, 2014. 161(5): p. A783-A791.

Erk, C., et al., Toward Silicon Anodes for Next-Generation Lithium Ion Batteries: A Comparative Performance Study of Various Polymer Binders and Silicon Nanopowders. ACS Applied Materials & Interfaces, 2013. 5(15): p. 7299.

Favors, Z., et al., Scalable Synthesis of Nano-Silicon from Beach Sand for Long Cycle Life Li-ion Batteries. Sci. Rep., 2014. 4.

Feng et al; "Facile Approach to SiOX/Si/C Coposite Anode Material From Bulk SiO for Lithium Ion Batteries"; Phys. Chem. Chem. Phys., 2013, 15, pp. 14420-14426.

Ge, M., et al., Porous Doped Silicon Nanowires for Lithium Ion Battery Anode with Long Cycle Life. Nano Letters, 2012. 12(5): p. 2318.

Ge, M., et al., Scalable preparation of porous silicon nanoparticles and their application for lithium-ion battery anodes. Nano Research, 2012. 6(3): p. 174-181.

Goriparti, S., et al., Review on recent progress of nanostructured anode materials for Li-ion batteries. Journal of Power Sources, 2014.

Hai, N.H., I. Grigoriants, and A. Gedanken, Converting Stber Silica and Mediterranean Sand to High Surface Area Silicon by a Reaction under Autogenic Pressure at Elevated Temperatures. The Journal of Physical Chemistry C, 2009. 113(24): p. 10521.

Liu et al; "Hollow Nanostructured Anode Materials for Li-Ion Batteries"; Nanoscale Res Lett (2010) 5; 1525-1534.

Liu et al; "Si-Based Anode Materials for Lithium Rechargeable Batteries"; J. Mater. Chem.; (2010), 20, pp. 10055-10057.

Netz et al; "Investigations of a Number Of Alternative Negative Electrode Materials for Use in Lithium Cells"; Ionics 7 (2001); pp. 433-439.

Nohira et al; "Pinpoint and Bulk Electrochemical Reduction of Insulating Silicon Dioxide to Silicon"; Nature Materials, vol. 2, Jun. 2003; pp. 397-401.

Obrovac, M.N., et al., Alloy Negative Electrodes for Li-Ion Batteries. Chemical Reviews, 2014. 114(23): p. 11444.

Sadique, S.E., "Production and Purification of Silicon by Magnesiothermic Reduction of Silica Fume", Department of Materials Science and Engineering. 2010, University of Toronto: Toronto. 78 Pages.

Schlaudt et al; "Crystalline Solution in the System MgO—Mg2SiO4,—MgAl2O4"; Journal of the American Ceramic Society, 1965.48(5): pp. 248-251.

Shao, W.-L., et al, "NMR and Short Range Order in Amorphous Silicon," J. of Non-Crystalline Solids, 114 (1989) 232-234.

Shen et al; "Magnesiothermically Reduced Diatomaceous Earth As a Porous Silicon Anode Material for Lithium Ion Batteries"; Journal of Power Sources, 2012.213(0): pp. 229-232.

Wilson et al; "Lithium Insertion in Carbons Containing Nanodispersed Silicon"; Journal of the Electrochemical Society, 1995. 142(2): pp. 326-332.

Yermekova et al; "Combustion Synthesis of Silicon Nanopowders"; International Journal of Self-Propagating High-Temperautre Synthesis, 2010. 19(2): pp. 94-101.

Yoo et al; "Porous Silicon Nanowires for Lithium Rechargeable Batteries"; Nanotechnology, 24; (2013) 7 Pages.

Zhou et al; "The Nanostructure of the SiAl Eutectic and Its Use in Lithium Batteries"; MRS Communications, 2013, 3 (3), pp. 119-121.

Wu; "Porous Silicon and Li-Ion Batteries"; Handbook of Porous Silicon, Canham, L. (ED.) Springer International Publishing Switzerland (2014) pp. 965-973 ISBN: 978-3-319-05743-9.

Wynnyckyj et al; "The Mechanism of Reduction of Silica by Magnesium Vapor"; High Temperature Science, 8, (1976) pp. 203-217.

* cited by examiner

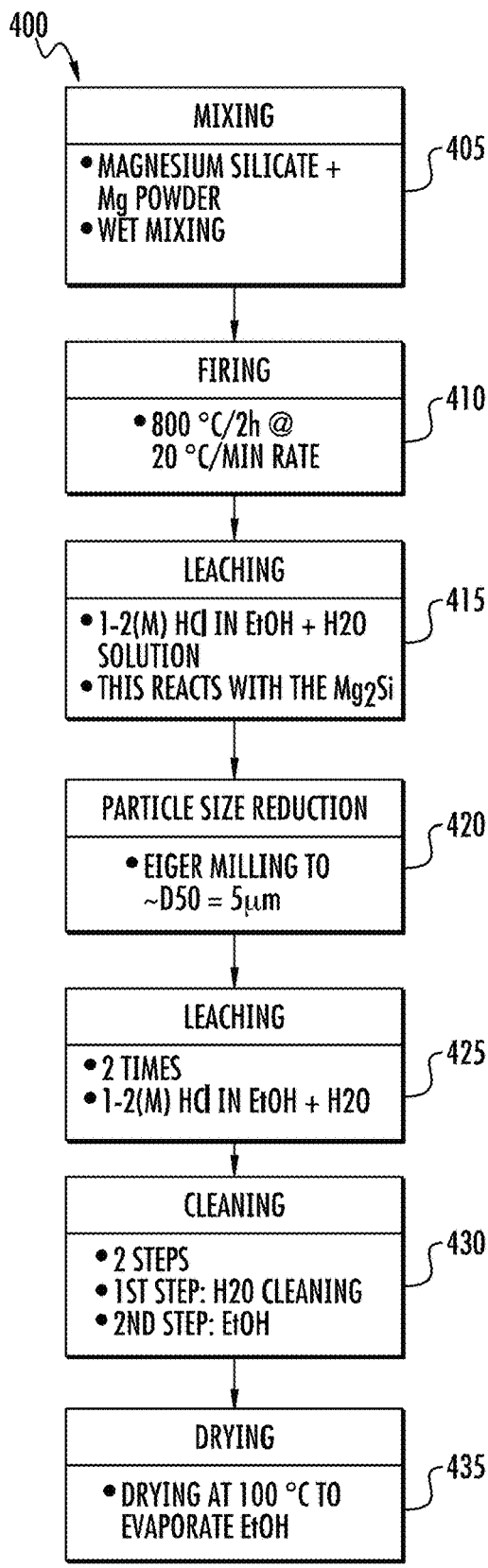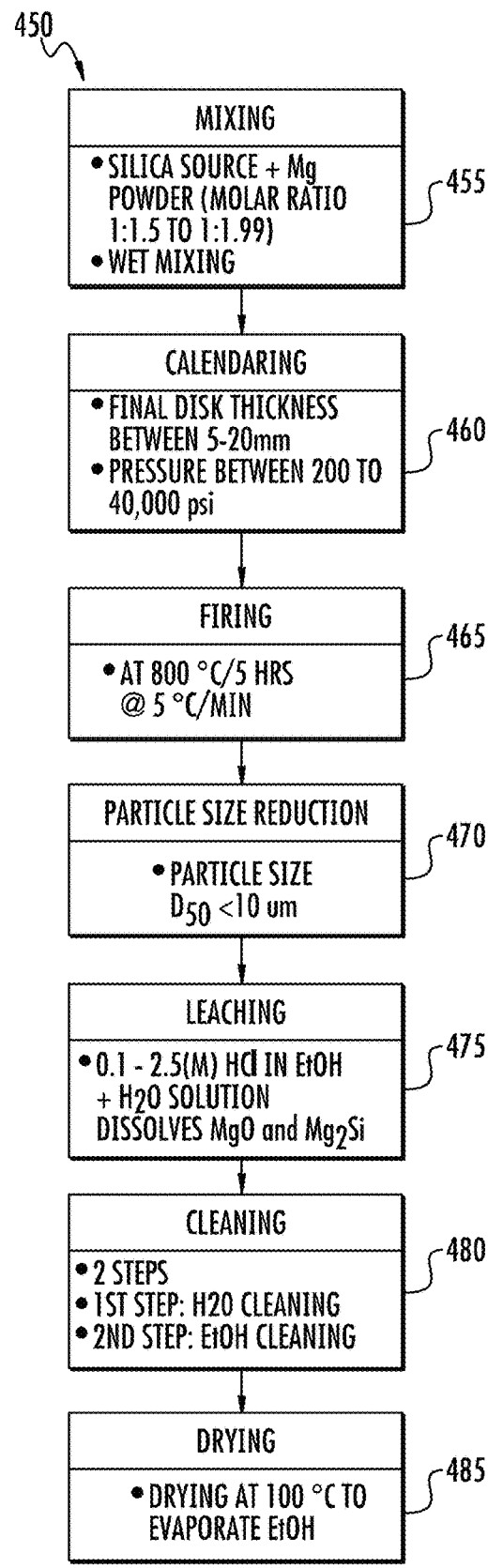
FIG. 4A
(PRIOR METHOD)
FIG. 4B
(PRESENT METHOD)

POROUS SILICON COMPOSITIONS AND DEVICES AND METHODS THEREOF

PRIORITY CLAIM

This application claims the benefit of priority under 35 U.S.C. § 119 of U.S. Provisional Application Ser. No. 62/259,877, filed on Nov. 25, 2015 the content of which is relied upon and incorporated herein by reference in its entirety.

CROSS-REFERENCE TO RELATED APPLICATION

This application is related to commonly owned and assigned patent documents, but does not claim priority thereto:

Patent application U.S. Ser. No. 14/751,202 filed Jun. 26, 2015 entitled "METALLIC SURFACES BY METALLO-THERMAL REDUCTION";

Provisional Patent Application U.S. Ser. No. 62/084,084 filed Nov. 25, 2014 entitled "METHOD AND MATERIAL FOR LITHIUM ION BATTERY ANODES";

Provisional Patent Application U.S. Ser. No. 61/977,451 filed Apr. 9, 2014 entitled "METHOD AND MATERIAL FOR LITHIUM ION BATTERY ANODES";

Patent application U.S. Ser. No. 13/765,800 filed Feb. 13, 2013 entitled "CRYSTAL TO CRYSTAL OXYGEN EXTRACTION";

Patent application U.S. Ser. No. 13/693,453 filed Dec. 4, 2012, of US Appln. Pub. No. 2013/0149549, published Jun. 13, 2013, entitled "METALLIC STRUCTURES BY METALLOTHERMAL REDUCTION"; and Patent application U.S. Ser. No. 13/100,593 filed May 4, 2011, U.S. Pat. No. 8,415,555 issued Apr. 9, 2013, entitled "DIMENSIONAL SILICA-BASED POROUS SILICON STRUCTURES AND METHODS OF FABRICATION".

The entire disclosure of each publication or patent document mentioned herein is incorporated by reference.

BACKGROUND

The disclosure relates to porous silicon containing compositions, articles and devices including the compositions, and to methods of making and using the porous silicon containing compositions.

SUMMARY

In embodiments the disclosure provides a stable porous silicon composition (SPS)("Type I" composition), and a method for making the stable porous silicon composition.

In embodiments the disclosure provides an alloy stable porous composition (ASPS)("Type II" composition), and a method for making the alloy stable porous composition.

In embodiments the disclosure provides a porous silicon containing cermet composition (stable porous cermet; SPCermet; SPC)("Type III" composition), and a method for making the porous silicon containing cermet composition.

In embodiments the disclosure provides compositions comprising, for example, combinations of the disclosed compositions, including, for example:

a Type II' (i.e., "two prime") composition prepared by a combination of a Type I and a Type II composition or components, which Type II' composition is an alloy of silicon and a metal silicide;

a Type IV composition prepared by a combination of a Type II and a Type III composition or components, which Type IV composition is an alloy of a metal silicide, silicon, and a cermet; and a Type IV' (i.e., "four prime") composition prepared by a combination of a Type I, a Type II, and a Type III composition or components, which is an alloy of silicon, a metal silicide, and a cermet.

In embodiments the disclosed compositions are useful for making electrode (e.g., anode) components for use, for example, in a lithium ion battery.

In embodiments, the present disclosure provides a method of making a stable (i.e., having stable mechanical and electrical properties) porous silicon (SPS) composition, using for example, low cost, naturally abundant magnesium silicate minerals of the formula $xMgO-ySiO_2$ such as talc, enstatite, forsterite, steatite, and like minerals, through magnesiothermal reduction.

In embodiments, the stable porous Si product can be used to make an anode material for an energy storage article and applications thereof. In embodiments the disclosure provides a method of making that can use, for example, any silicate mineral other than, for example, magnesium silicate.

In embodiments the disclosure provides a method of making a porous Si composition that can use a glass, or like amorphous silicate, as a Si precursor or Si source.

In embodiments the disclosure provides a method of making a porous Si composition that can use any $SiO_2$, as a Si precursor or a Si source.

In embodiments the disclosure provides a method of making a porous Si cermet composition that can use, for example, oxides, nitrides, carbides, and like conjunctive forms, or mixtures thereof, of different metals such as Fe, Ni, Sn, and like metals, or combinations thereof.

In embodiments the disclosure provides a method of making a porous Si composition that can use different reactive gaseous atmospheres, such as oxygen, nitrogen, ammonia, and like substances, or mixtures thereof, in the initial reaction to form different products.

The final microstructure of the SPS, ASPS, or SPC compositions produced by the disclosed methods can be particles having an open porosity, which particulate and porosity properties can provide significant mechanical stability to the anode material during electrochemical cycling of an energy storage device.

BRIEF DESCRIPTION OF THE DRAWINGS

In embodiments of the disclosure:

FIGS. 4A and 4B show, respectively, flow charts summarizing the steps of the prior method and present method of making the disclosed porous silicon compositions.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed compositions, articles, and methods of making and using provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

Definitions

"Stable," "stability," or like terms refer to electrochemical and physical properties of the disclosed porous silicon particle compositions with respect to known non-porous bulk silicon particle compositions of similar size (see, e.g., Obrovac, M. N., et al., *Reversible Cycling of Crystalline Silicon Powder*, J. Electrochem. Soc., 154 (2) A103 (2007) (Obrovac I)). The disclosed carbon coated porous silicon particle compositions are more stable during electrochemical cycling, for example, for hundreds of electrochemical cycles, and are more resistant to disintegration during cycling, compared to the carbon coated non-porous bulk Si compositions. The porosity of the disclosed silicon particle compositions is stable, and when coated, the porosity of the composition survives during electrochemical cycling. The stable porosity reduces the overall expansion (i.e., bulk) and contraction of the micron sized particles after hundreds of cycles (based on SEM images; not shown). Although not limited by theory, the reduced bulk expansion and contraction of, for example, the carbon coated SPS particles is believed to reduce or eliminate particle disintegration during cycling, and provides silicon compositions having a superior electrochemical cycle life. In a working device, the cumulative reduced expansion of individual SPS particles reduces the overall expansion of the anode, which reduced anode expansion helps to maintain the dimensional, physical, and electrochemical integrity of the battery (based on inventive and comparative cross-sectioned SEM images of cycled anodes; not shown).

Figure 3A:
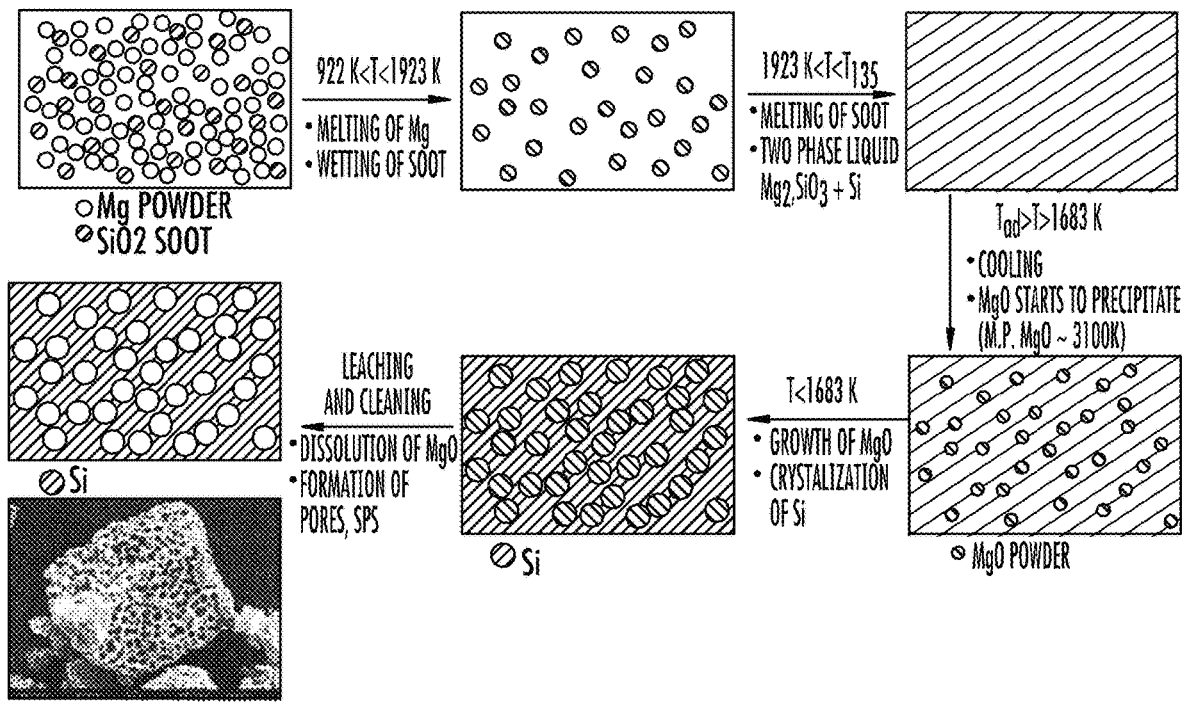
FIGS. 3A to 3E show aspects of the disclosed preparative methods and schematics of their respective porous compositions (not to scale).
Figure 3B:
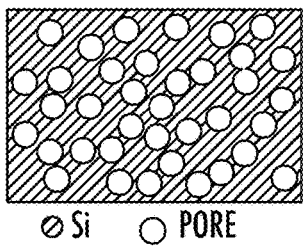

"SPS" refers to a stable porous silicon composition as defined herein and as illustrated generally in FIG. 3B.

"ASPS" refers to an alloy stable porous silicon composition as defined herein, for example, titanium silicide (TiSi$_2$) as a secondary or discontinuous phase in a crystalline silicon matrix as a primary or continuous phase.

Figure 3C:
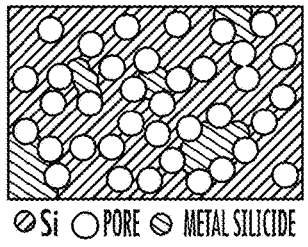

"Alloy" or like terms refer to metal and silicon mixture, specifically a porous silicon continuous phase containing a dispersed metal silicide phase, and as illustrated generally in FIG. 3C.

Figure 3D:
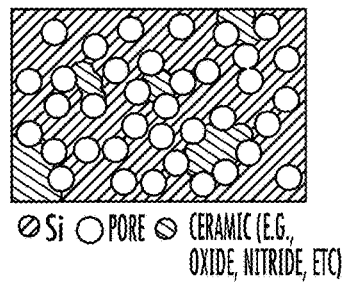

"SPC," "SPCermet," "PSCermet," "Stable porous silicon containing cermet," or like acronyms or terms refer to a stable porous silicon composition containing a dispersed cermet as defined herein, and as illustrated generally in FIG. 3D.

Figure 3E:
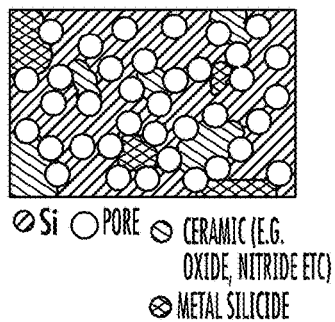

"Porous silicon containing cermet and metal silicide," or like terms refer to an alloy of a porous silicon continuous phase containing a dispersed cermet phase and a dispersed metal silicide phase, and as illustrated generally in FIG. 3E.

A prefix "C" preceding an acronym label such as SPS (stable porous silicon), ASPS (alloy stable porous silicon), or SPC (SPCermet; stable porous cermet), and like terms refer to a carbon coating or a conformal carbon coating on the surface of the stable porous particle composition. Examples include, for example "CSPS," "CASPS," and "CSPC".

"Compress," "mechanical press," "compaction," "calendaring," and like terms refer to, for example, applying a mechanical force or a pressure of, for example, greater than 0.5 MPa (i.e., 75.2 psi) during the method of making the disclosed compositions.

"Atomic percent" "atomic %," "at. %," and like terms refer to the percentage of one specie of atom relative to the total number of all atoms.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The compositions and methods of the disclosure can include any value or any combination of the values, specific values, more specific values, and preferred values described herein, including explicit or implicit intermediate values and ranges.

Figure 1:
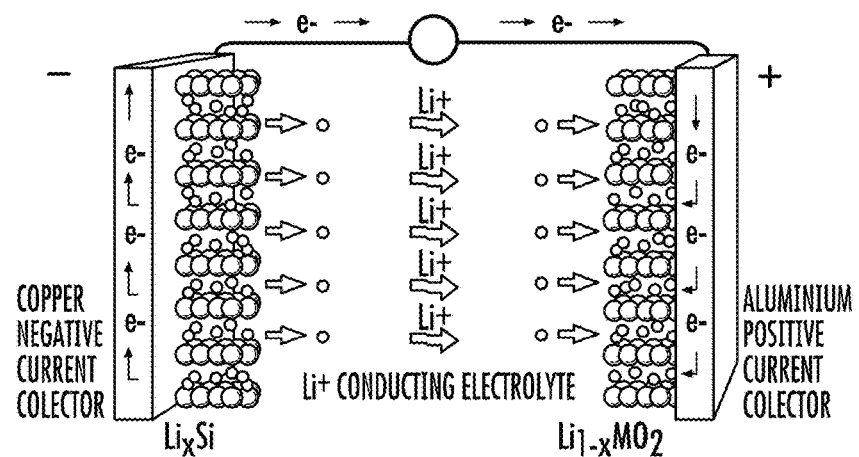
FIG. 1 shows the known [PRIOR ART] overall mechanism of a lithium ion battery (see: nexeon.co.uk/technology/about-li-ion-batteries/).
Figure 2:
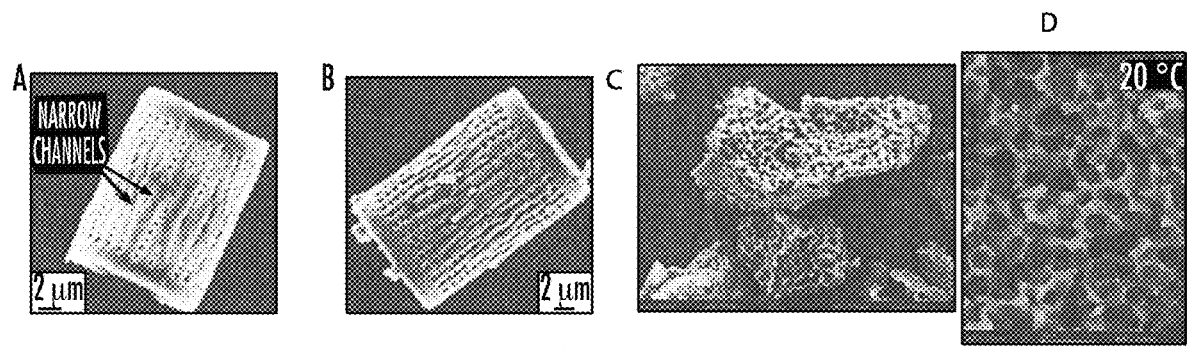
FIG. 2 shows two different routes [PRIOR ART] for magnesiothermal reduction of silica and representative images of their products produced (vapor phase: a and b; molten phase: c and d).

Lithium ion batteries (LIB) are an important class of rechargeable energy storage devices in which lithium ions move from the negative electrode to the positive electrode during discharge. Lithium batteries were first proposed in 1972 by M. S. Whittingham. Today lithium ion batteries are widely used in the portable consumer electronics and in electric vehicles. Lithium ion batteries are popular for several reasons including; they are lighter than most other rechargeable batteries, the chemistry delivers high open-circuit voltage, low self-discharge rate, reduced toxicity, and lack battery memory effect. The basic components and function of a lithium ion battery, which uses a silicon anode are shown in FIG. 1 (Nexeon [PRIOR ART]). During discharge lithium ions stored on the anode migrate from the anode through an electrolyte medium to the cathode creating an electrical current. During the charging process the lithium metal migrates back and is electroplated onto the anode. One of the most widely used materials for making the anode is graphite, primarily because of its abundance and low cost. When carbon is used as the anode the reaction on a Li-ion cell is:

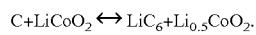

The reactions at each electrode are:

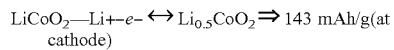

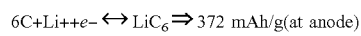

The use of silicon as an anode has been long considered as a negative electrode for LIB (Wilson, A. M. et al., *Lithium Insertion in Carbons Containing Nanodispersed Silicon*, Journal of The Electrochemical Society, 1995. 142(2): p. 326-33). The Li—Si anode system is known to have one of the highest possible gravimetric capacities of all the elements (Obrovac, M. N., et al., *Alloy Negative Electrodes for Li-Ion Batteries*. Chemical Reviews, 2014. 114(23): p. 11444 (Obrovac II)). Silicon is a more valuable anode material over carbon anodes because a single silicon atom is able to bind to 3.75 lithium ions. Conversely, it takes 6 carbon atoms to retain a single lithium ion. When silicon as an anode material is compared to graphitic carbon the theoretical capacities differ by an order of magnitude. For a range of x from 0 to 3.75 the theoretical specific capacity of pure silicon is about 3580 mAh/g, far greater than the theoretical capacity of 372 mAh/g for graphitic carbons. The full reaction is: 4Si+15Li++15e$^-$ $\Rightarrow$ Li$_{15}$Si$_4$ having a capacity of 3580 mAh/g. However, one negative consequence of this enhanced lithium ion interaction is the large increase in volume (about 300%) during lithiation. Hence, one of the most challenging features for the use of silicon as a viable anode material is its limited structural stability against multiple volume expansions. One path to mitigate these detrimental effects in silicon when used as an anode material is to have: high surface area (e.g., high porosity); and the anode material needs to have mechanical stability.

Several different processing routes have been investigated to produce porous Si powders (see Chevrier, V. L., et al., *Evaluating Si-Based Materials for Li Ion Batteries in Commercially Relevant Negative Electrodes.* Journal of The Electrochemical Society, 2014. 161(5): p. A783-A791; Erk, C., et al., *Toward Silicon Anodes for Next-Generation Lithium Ion Batteries: A Comparative Performance Study of Various Polymer Binders and Silicon Nanopowders.* ACS Applied Materials & Interfaces, 2013. 5(15): p. 7299; Ge, M., et al., *Scalable preparation of porous silicon nanoparticles and their application for lithium-ion battery anodes.* Nano Research, 2012. 6(3): p. 174-181; Ge, M., et al., *Porous Doped Silicon Nanowires for Lithium Ion Battery Anode with Long Cycle Life.* Nano Letters, 2012. 12(5): p. 2318; Goriparti, S., et al., *Review on recent progress of nanostructured anode materials for Li-ion batteries.* Journal of Power Sources, 2014; Jung-Keun Yoo, et al., *Porous silicon nanowires for lithium rechargeable batteries.* Nanotechnology, 2013. 24(42): p. 424008; Liu, H. K., et al., *Si-based anode materials for lithium rechargeable batteries.* Journal of Materials Chemistry, 2010. 20(45): p. 10055). See also: Handbook of Porous Silicon, Canham, L. (Ed.) (see springer.com, ISBN: 978-3-319-05743-9).

Some of these processes use chemical etching (Jung-Keun Yoo, supra.), some use complex template growth (see Liu, J., et al., Hollow Nanostructured Anode Materials for Li-Ion Batteries. Nanoscale Research Letters, 2010. 5(10): p. 1525). One of the most promising processes that has been proposed is metallothermal reduction of silica. Magnesium and calcium are the most prominent metal candidates. Calcium has a higher exothermic reaction compared to magnesium (see Sadique, S. E., *Production and Purification of Silicon by Magnesiothermic Reduction of Silica Fume, in Department of Materials Science and Engineering.* 2010, University of Toronto: Toronto. p. 66). One of the first reports of porous silicon prepared by this process was by J. R. Wynnyckyj (see *The Mechanism of Reduction of Silica by Magnesium Vapor.* High Temperature science, 1976. 8: p. 203-217). Different silica sources have been proposed in journals and patents. Bao and Sandhage successfully converted nanostructured microshells of diatoms into microporous silicon replicas at 650° C. through a spontaneous process, having 100 nm pores (Bao, Z., et al., *Chemical reduction of three-dimensional silica micro-assemblies into microporous silicon replicas.* Nature, 2007. 446(7132): p. 172)). More recently, Mediterranean sand was reduced to porous silicon under auto pressure at 750° C. (Hai, N. H., I. Grigoriants, and A. Gedanken, *Converting Stöber Silica and Mediterranean Sand to High Surface Area Silicon by a Reaction under Autogenic Pressure at Elevated Temperatures.* The Journal of Physical Chemistry C, 2009. 113(24): p. 10521; Favors, Z., et al., *Scalable Synthesis of Nano-Silicon from Beach Sand for Long Cycle Life Li-ion Batteries.* Sci. Rep., 2014. 4). In other instances crystalline silicates such as zeolites and aluminosilicates such as zeolites, clay, and sodalities have been proposed (see Zhu, J., et al., *Synthesis and characterization of mesoporous silicon directly from pure silica sodalite single crystal*, Journal of Materials Science, 2010. 45(24): p. 6769-6774; and the above mentioned U.S. Ser. No. 13/765,800).

The battery industry appraises the overall performance and value of any battery system by "the 4 C's", which represent a figure of merit that takes into account the following target metrics: cycle life (about 70 to 80% efficiency after 100 cycles); capacity (greater than 500 mAh/g after 100 cycles); coulombic efficiency (C.E.) (about 50 to 85% of the capacity after the first cycle); and (the) cost of the alternative battery design is less than the cost of a graphite based battery design.

While all of these metrics are important considerations, cost is perhaps the most significant in being able to enter an energy storage device market. An additional consideration is the ability to have a process that provides scalability of manufacture where sufficient output can meet customer needs without dramatically raising cost. The cost of graphite as the incumbent anode material is about $20 to 40/Kg. Graphite is also highly abundant. So any material that hopes to displace graphite may have to match or exceed these two attributes (i.e., low cost and scalability).

In a recent review (Obrovac II, supra.) on Si-alloy from 3M, the benefit of having a Si-alloy instead of pure Si is mentioned. There are two different kinds of alloying elements for Si: Active alloys, e.g., H, Mg, Ca, Zn, B, Al, and Sn; and inactive alloys, e.g., Fe, Ti, Mn, Co, Ni, and Cu.

Active alloys: according to literature (see Obrovac II, supra.), alloying combinations of active elements often result in electrochemical behavior which is unlike the parent elements. If the grain size of the active phases are made small enough, two-phase regions can be avoided during cycling. It is also mentioned that alloying active elements with inactive elements can reduce volume expansion, leading to improved cycle life. In the alloy, when the Si is present in nanometer-sized regions within a matrix of other active elements, such as Zn and Sn, the formation of $Li_{15}Si_4$ can be suppressed, leading to good cycling.

Inactive Alloys: Si reacts with inactive metals to form silicides. Theoretically such silicides are active with Li via displacement-type reactions. Although in some literature it has been mentioned that transition metal silicides are inactive. One explanation of their capacity is that since Si has a very high capacity small impurities can result in measurable reversible capacity. It is reported (Obrovac II, supra.) that NiSi made by ball milling and pulsed laser deposition has reversible capacities of 1180 and 1220 mAh/g, respectively.

Active/Inactive Alloys: mixtures of active and inactive elements can result in modification of voltage characteristics, grain structure, and reduced overall alloy volume expansion. When the active phase is present as nanometer-sized regions in an active matrix, two phase regions are often avoided resulting in improved cycling performance. It is reported (Netz, A., et al., *Investigations of a number of alternative negative electrode materials for use in lithium cells*, Ionics, 2001. 7(4-6) p. 433; Zhou, W. et al., *The nanostructure of the Si—Al eutectic and its use in lithium batteries.*, MRS Communications, 2013, 3 (3), p. 119) that the formation of $Li_{15}Si_4$ is suppressed in nanostructured active Si/inactive alloys. It has been speculated that the matrix phase in (active Si)/inactive alloys may play a similar role in suppressing the formation of $Li_{15}Si_4$. In some instances, the inactive elements can also take part in lithiation reactions, forming a ternary Li phase, or undergo displacement type reactions. Within this alloy family there are two types of classification. Type I is comprised of one completely active phase and one completely inactive phase. Examples are $Si/FeSi_2$ where Si is active and $FeSi_2$ is completely inactive. Type II is comprised of alloys that are lithiated via a displacement reaction, e.g., (active Si)/$Sn_2Fe$ or $SnO_2$.

Stable Porous Silicon (SPS)

In embodiments, the disclosure provides a porous silicon composition comprising or including:

a crystalline phase in from 50 to 99 atom % Si by NMR, comprised of crystalline Si in from 95 to 100 wt % by XRD, crystalline forsterite (i.e., $Mg_2SiO_4$) in from 0.1 to 5 wt % by XRD, and crystalline quartz (i.e., $SiO_2$, crystalline silica) in from 0.1 to 1 wt %, such as from 0.2 to 0.9 wt %, by XRD;

an amorphous phase comprised of at least one of amorphous silica, amorphous silicate, or a mixture thereof, in from 1 to 50 atom % Si by NMR, based on the total amount of Si;

a total Si content in from 20 to 99 wt % by inductively coupled plasma (ICP);

a total elemental oxygen content of from 0.001 to 1 wt % by difference, based on a 100 wt % total; and a form factor comprising a porous particle, such as shown schematically in a two-dimensional cross-section of FIG. 3B.

In embodiments, the porous particle can comprise:

a continuous phase comprising the stable porous crystalline silicon composition, and the porous particle having at least one of:
- a porous particulate powder form (i.e., not flakes, and not sheets) having a $d_{50}$ of, for example, 3 to 14 microns, including intermediate values and ranges;
- a percent porosity (% P) in from 60 to 80%, including intermediate values and ranges;
- an open pore structure having a pore size diameter from 1 to 1,000 nm, for example, 2 nm to 500 nm, where the total pore volume ($cm^3/g$) is greater than 70% for pore diameters greater than 10 nm, and the total pore volume ($cm^3/g$) is greater than 40% for pore diameters greater than 40 nm to 1000 nm, including intermediate values and ranges; or
- a Brunauer-Emmett-Teller (BET) (e.g., by multi-point) surface area of from 20 to 75 $m^2/g$ (cf, 10 to 310 $m^2/g$ for the prior method for stable porous Si), including intermediate values and ranges; or combination thereof.

Figure 14:
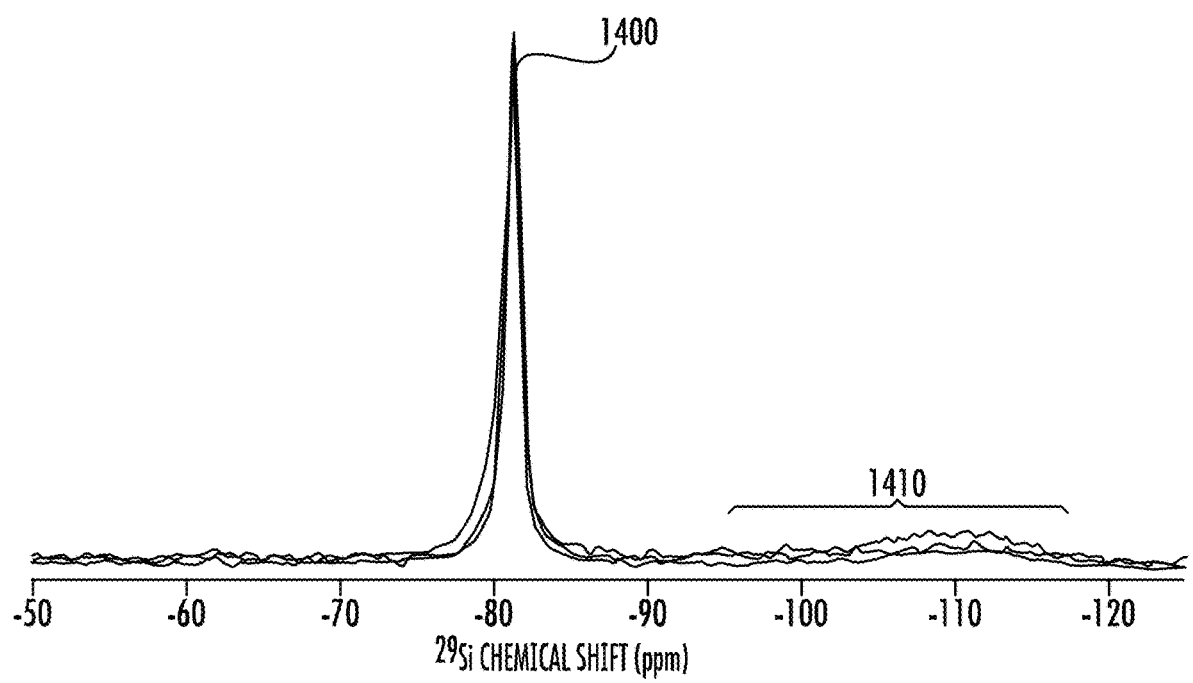
FIG. 14 shows an overlay of multiple exemplary silicon 29 magic angle spinning nuclear magnetic resonance ($^{29}Si$ MAS NMR) spectra of the disclosed stable porous silicon (SPS) compositions.

In embodiments, the disclosure provides a porous silicon composition (SPS) comprising a $^{29}Si$ MAS NMR spectrum of FIG. 14, having a distinct main or major $^{29}Si$ peak at a chemical shift at about −81 ppm and an indistinct or diffuse minor $^{29}Si$ signal region at a chemical shift of about −95 to −120 ppm.

Method of Making the Stable Porous Si (SPS) Composition

In embodiments, the disclosure provides a method of making the abovementioned porous silicon particle composition, comprising:

compressing, for example, with a Carver press, a mixture of magnesium powder having, for example, a particle size of from 10 nm to 100 microns, and a silica source powder having, for example, a particle size of from 10 nm to 100 microns, to a compressed form, e.g., a sheet, a pellet, and like forms, having a thickness of from 5 to 20 mm having a Mg:silica molar percent ratio from 1:1.5 to 1:1.99; i.e., less than 2. The Mg powder and silica source powder are thoroughly mixed to form a homogeneously dispersed mixture using, for example, a cone mixer. In embodiments, the dry powder mixture can be compressed by any suitable method, for example, pressing with a press, or calendering with a calender having one or more rolls, to provide a tape or film having a uniform surface smoothness and thickness, for example, a thickness of 5 to 20 mm, such as less than about 20 mm, 17 mm, 15 mm, and preferably about 10 mm, including intermediate values and ranges. The compression can be achieved with a pressure of, for example, from 1.379 to 275.8 MPa (i.e., 200 to 40,000 psi)).

In embodiments, the dry powder can preferably be wet mixed by, for example, $SiO_2$ and Mg were weighed and mixed together in Nalgene container. 100% ethanol was added to form a 50 wt % slurry. The slurry was evaporated with a Rotavap to create a homogenous powder, prior to being compressed. The prior process disclosed in above mentioned U.S. Ser. No. 61/977,451 was accomplished by manual hand packing and without significant mechanical compression. The presently disclosed improved process was accomplished with significant mechanical compression and can provide the stable porous silicon product having BET surface areas of from 20 to 100 $m^2/g$, such as 20 to 75 $m^2/g$, including intermediate values and ranges;

heating or firing the compressed form at from 600 to 900° C., for example, 600 to 850° C., 650 to 850° C., 700 to 850° C., 700 to 825° C., 725 to 825° C., 750 to 825° C., 775 to 825° C., 775 to 825° C., including intermediate values and ranges. The heating of the compressed form can be, for example, from about 540 to 1000° C., preferably greater than about 600 to 700° C., such as 650° C., and the reaction appears to go to completion in a furnace, see for example, the silica soot+Mg curve represented by the curve of triangles in FIG. 5. The furnace heating rate can be, for example, less than about 10° C./min, and preferably less than 5° C./min. It was discovered that lower rates of heating appear to provide a superior yield of the desired stable porous silicon product.

In embodiments, the disclosure provides a porous silicon composition made by the above method.

Although not bound by theory, one hypothesis is that at lower temperature ramp rates the reaction sequence goes to greater completion. The furnace can be held at the highest or top temperature, for example, for 2 hrs, preferably more than 5 hrs. Holding the top temperature for a longer period, such as up to 5 hrs, appears to drive the conversion reaction to completion. Beyond 5 to 10 hrs there does not appear to any additional yield benefit. The heated powder reacts to form an intermediate product that, after cooling can be milled to a powder, for example, having a $d_{50}$ of less than about 100 microns. The intermediate reaction product can comprise, for example: MgO in from 63 to 70 wt %, $Mg_2Si$ (magnesium silicide) in from 5 to 9 wt %, forsterite (magnesium silicate, $Mg_2SiO_4$) in from 2 to 5 wt %, and Si in from 20 to 25 wt %;

milling the compressed and heated form to an intermediate product powder (The milled intermediate powder product is then leached in an acid solution of, for example, HCl in ethanol, or like acids and liquid carriers, having molarity of from about 0.1 to 2.5 M, such as greater than about 0.5 M, preferably greater than about 1.5M, for from about 2 to 10 hrs, preferably greater than 5 hrs, including intermediate values and ranges. The leached powder product can optionally be washed with, for example, ethanol or like solvents, to reduce agglomeration of the particles of the final porous silicon product);

leaching the intermediate product powder with an acid solution (alternative leaching methods and agents are available); and optionally washing the resulting leached product to form the porous silicon composition.

In embodiments, the abovementioned method of making the composition can further comprise, for example:

coating the porous silicon composition with at least one of a conductive material (e.g., a conformal coating), a strength enhancing material, or a combination thereof, to form a coated composition. Coating the porous silicon composition provides improved electrochemical cycle-ability when the coated composition is incorporated into an energy storage device and provides improved manufacturing processability.

In embodiments, the disclosure provides an energy storage device comprising: an electrode comprising:
a conductive substrate, e.g., copper or like materials, coated with a mixture comprising the porous silicon composition, a conductive carbon, and a binder.

In embodiments, the above energy storage device can have, for example, at least one of:

an electrochemical gravimetric capacity of from 1000 to 3400 mAh/g, for example, greater than 2000 mAh/g, for lithiation or de-lithiation;

an initial coulombic efficiency of from 38 to 96% (e.g., 80%, the initial coulombic efficiency (ICE) is the ratio between first de-lithiation to first lithiation of the anode); and a second coulombic efficiency of from 60 to 97% (e.g., 94%, the second coulombic efficiency (SCE) is the ratio between second de-lithiation to second lithiation of the anode).

Alloy Stable Porous Silicon (ASPS)

In embodiments, the alloy stable porous silicon composition can be comprised of stable porous silicon and a silicide, which alloy stable porous silicon composition when formulated into an energy storage device can have a superior cycle life compared to the stable porous silicon alone.

In embodiments, the disclosure provides an alloy stable porous silicon composition comprising:

a crystalline phase in from 70 to 90 atom % Si by NMR, comprised of crystalline Si in from 20 to 80 wt % by XRD, crystalline forsterite in from 0.1 to 5 wt % by XRD, crystalline quartz in from 0.1 to 1 wt % by XRD such as from 0.2 to 0.9 wt %, and at least one crystalline metal silicide in from 1 to 80 wt % by XRD;

an amorphous phase in from 10 to 30 atom % Si by NMR comprised of at least one of amorphous silica, amorphous silicate, or a mixture thereof;

a total Si content in from 20 to 99 wt % by ICP;

a total elemental oxygen content of from 0.001 to 1 wt % by difference, based on a 100 wt % total; and a form factor comprising a porous particle.

In embodiments, the particle can comprise:

a continuous phase comprising a porous silicon composition; and a discontinuous phase comprising a metal silicide dispersed in the continuous phase, and the porous particle having at least one of:

a percent porosity (% P) in from 60 to 80 vol %; or a BET (multi-point) surface area of from 20 to 75 m$^2$/g, the porous alloy has an open pore structure having a pore size diameter from 1 to 1,000 nm, where the total pore volume is greater than 85% for pore diameters greater than 10 nm, and the total pore volume is greater than 50% for pore diameters greater than 40 nm to 1000 nm.

The porous alloy can have an open pore structure having a pore size diameter, for example, from 1 to 1,000 nm, for example, 2 nm to 500 nm, where the total pore volume (cm$^3$/g) is greater than 85% for pore diameters greater than 10 nm, and the total pore volume (cm$^3$/g) is greater than 50% for pore diameters greater than 40 nm to 1000 nm, for example, as schematically shown in FIG. 3C.

In embodiments, depending upon the starting material selected, such as talc or forsterite, the total Si content in the porous alloy composition product can vary by, for example, from 20 to 99%, including intermediate values and ranges.

Figure 18A:
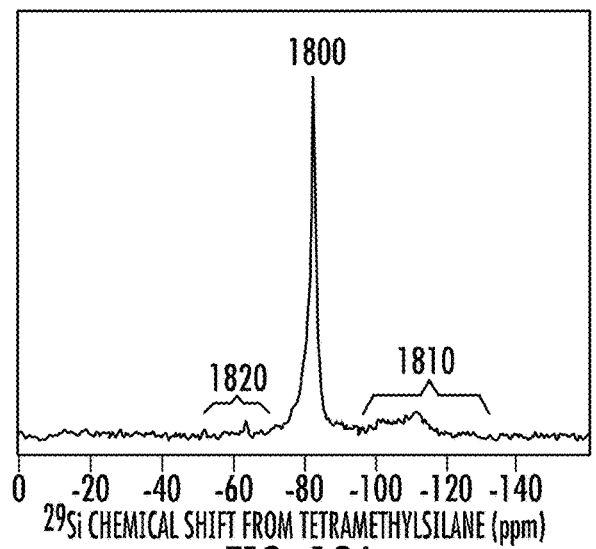
FIGS. 18A to 18B show exemplary $^{29}Si$ MAS NMR spectra of the disclosed alloy stable porous silicon (ASPS) compositions.
Figure 18B:
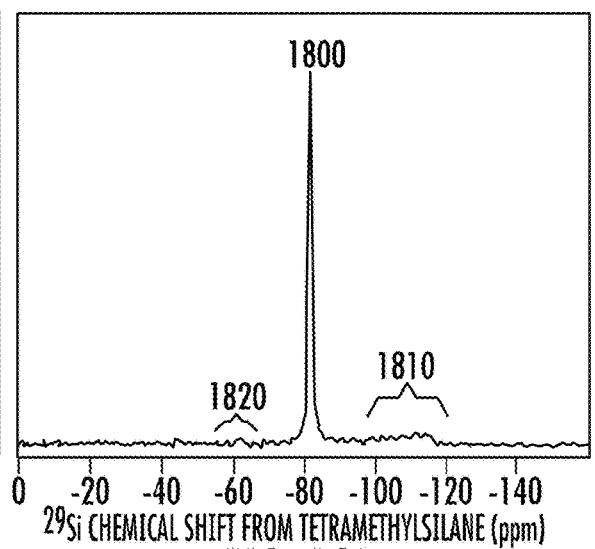

In embodiments, the disclosure provides an alloy stable porous silicon composition comprising a $^{29}$Si MAS NMR spectrum as shown in FIG. 18A or 18B. FIG. 18A shows a $^{29}$Si NMR of an ASPS composition made with 20 wt % TiO$_2$ mixed with pure silica soot. FIG. 18B shows a $^{29}$Si NMR of an ASPS composition made with 8 wt % titania doped silica soot. The $^{29}$Si NMR for these ASPS compositions have a major single peak at a chemical shift of −81 ppm, a first diffuse minor signal region from at from −95 to −135 ppm or at from −95 to −120 ppm, and a second diffuse minor signal region at a −50 to −70 ppm. The −50 to −70 ppm signal region includes any forsterite (e.g., 0.1 to 5 wt % by XRD).

Figure 18C:
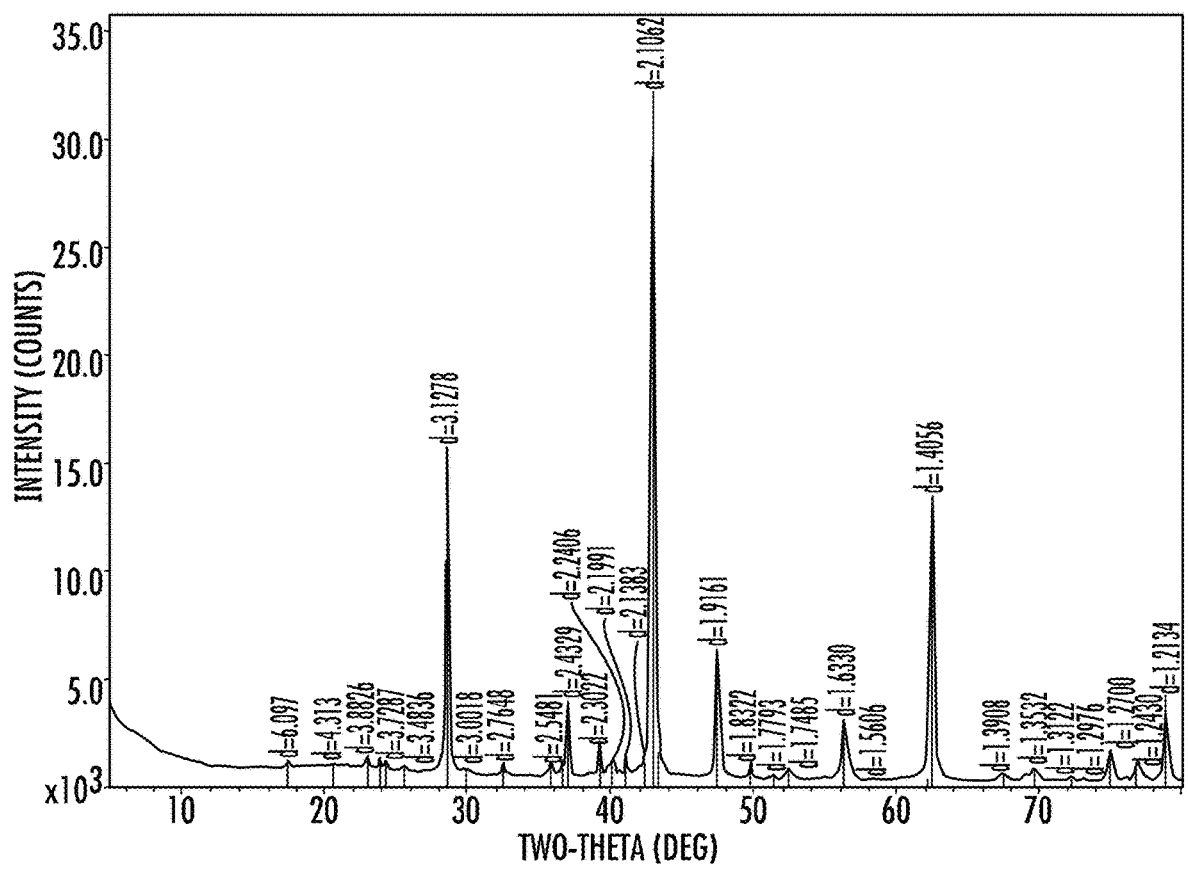
FIG. 18C shows an XRD of an uncleaned ASPS composition made from titania doped silica soot.

FIG. 18C shows an XRD of an uncleaned ASPS composition made from titania doped silica soot.

Method of Making the Alloy Stable Porous Silicon Composition

The molar ratio of Mg powder:pure silica precursor, or a silicate mineral precursor (i.e., a naturally occurring silicate, e.g., talc, forsterite, steatite, clay, and like sources) with added metal oxides (e.g., transition metals, Group III, Group IV (TiO$_2$), and glass) was less than 2. The intermediate reacted powder contained: MgO of from 50 to 80 wt %, Mg$_2$Si (magnesium silicide) of from 3 to 9 wt %, forsterite of from 2 to 10 wt %, and Si of from 6 to 20%, and metal silicide (alloy) of from 1 to 10 wt %.

In embodiments, the disclosure provides a method of making the above mentioned alloy Si porous composition, comprising:

compressing a mixture of magnesium powder having a particle size of, for example, from 10 nm to 100 microns, and at least one of a source of metal silicide, a silica source powder, or a mixture thereof having a particle size of, for example, from 10 nm to 100 microns, to a compressed form having a thickness of from 5 to 20 mm having a Mg: Si molar percent ratio from 1:1.5 to 1:1.99;

heating the compressed form at from 600 to 900° C. (for example, 600 to 900° C., 600 to 850° C., 650 to 850° C., 700 to 850° C., 700 to 825° C., 725 to 825° C., 750 to 825° C., 775 to 825° C., 775 to 825° C., including intermediate values and ranges);

milling the compressed and heated form to an intermediate product powder;

leaching the intermediate product powder with an acid solution; and washing the resulting leached product to form the alloy porous Si composition.

In the process for making an alloy porous Si composition, an intimate (e.g., atomic level) mixture of Si and a metal source such as a mineral, a glass, a metal coated soot, and like materials, is desirable.

The molar equivalent ratio (e.q., mol. % ratio) of the reactants magnesium powder and silicate source, i.e., Mg powder: silicate mineral precursor (i.e., natural silicates, e.g., talc, forsterite, steatite, clay, amorphous silicate glasses, etc.) was less than 2. The reacted powder mixture contained: MgO in from 50 to 80 wt %, Mg$_2$Si (magnesium silicide) in from 3 to 9 wt %, forsterite in from 2 to 10 wt %, Si in from 3 to 20%, and metal silicide (alloy) in from 1 to 10 wt %.

In embodiments, the method of making the above mentioned alloy porous Si composition can further comprise:

coating the porous alloy composition with at least one of a conductive material, a strength enhancing material, or a combination thereof, to form a conformally coated alloy porous Si composition, wherein coating the composition provides improved electrochemical cycle-ability when the coated composition is incorporated into an energy storage device and provides improved manufacturing processability.

In embodiments, the at least one of a source of metal silicide, a silica source powder, or a mixture thereof, can be selected, for example, from talc, forsterite, and like materials, or mixtures thereof.

In embodiments, the disclosure provides an alloy porous silicon composition made by the above method.

In embodiments, the disclosure provides an energy storage device comprising: an electrode comprising:

a conductive substrate, e.g., copper and like conductive substrates, coated with a mixture of the abovementioned coated alloy porous Si composition, optionally a conductive carbon, and optionally a binder.

In embodiments, the energy storage device can have has at least one of:

an electrochemical gravimetric capacity of from 1000 to 2000 mAh/g;

an initial coulombic efficiency of from 38 to 96% (e.g., about 85%);

a second coulombic efficiency of from 60 to 94% (e.g., about 90%); or a combination thereof.

Stable Porous Cermet (SPC)

In embodiments, the disclosure provides a stable porous cermet (SPC) (e.g., a porous silicon containing cermet composition (PSCermet)), or alternatively, a porous cermet containing a metalloid phase and a ceramic phase where, for example, a spinel is the ceramic component that is the dispersed phase and the silicon is the porous metalloid component in the continuous phase. The SPC composition is typically formed with metal oxides that are remote (i.e., far away or well separated) from Si in the Ellingham diagram. If one adds, for example, a Ti metal oxide, e.g., $TiO_2$, which is proximal (i.e., very close) to Si in the Ellingham diagram, then the reaction forms a TiSi component rather than a spinel.

In embodiments, the disclosure provides a porous silicon containing cermet (SPC) composition comprising:

a crystalline phase in from 70 to 90 atom % Si by NMR comprised of crystalline Si in from 90 to 95 wt % by XRD, crystalline forsterite in from 0.1 to 5 wt % by XRD, crystalline quartz in from 0.1 to 1 wt % by XRD, and at least one crystalline ceramic component in from to 1 to 10 wt % by XRD;

an amorphous phase in from 10 to 30 atom % Si by NMR comprised of at least one of amorphous silica, amorphous silicate, or a mixture thereof;

a total Si content in from 20 to 99 wt % by ICP;

a total elemental oxygen content of from 0.001 to 1 wt % by difference, based on a 100 wt % total; and a form factor comprising a porous particle.

In embodiments, the porous particle comprises:

a continuous phase comprising: a crystalline silicon; and a discontinuous phase comprising a ceramic dispersed in the continuous phase, and the porous particle having at least one of:

a percent porosity in from 60 to 80%;

an open pore structure having a pore size diameter from 1 to 1,000 nm, where the total pore volume is greater than 85% for pore diameters greater than 10 nm, and the total pore volume is greater than 50% for pore diameters greater than 40 nm to 1000 nm;

a BET surface area of from 20 to 75 m$^2$/g, or a combination thereof.

Figure 19:
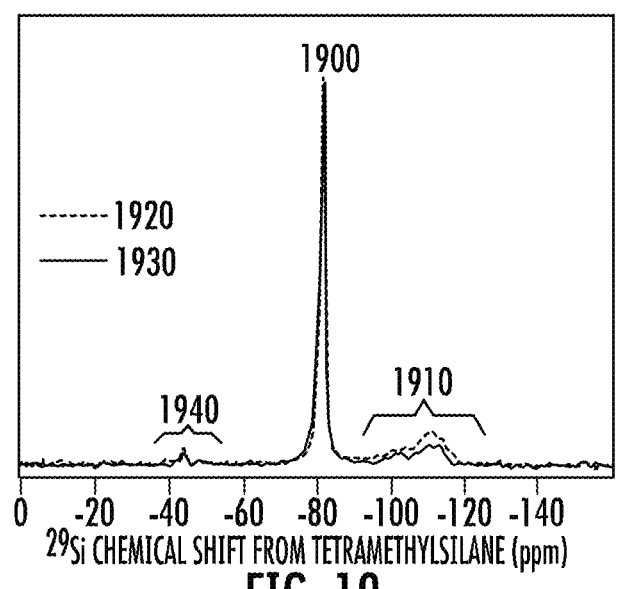
FIG. 19 show exemplary $^{29}Si$ MAS NMR spectra of two disclosed porous Si containing cermet compositions prepared from a mixture of a metal oxide and a silicon precursor. The two disclosed porous Si containing cermet composition can have a $^{29}Si$ MAS NMR spectra having a major single peak at a chemical shift of –81 ppm, and a first diffuse minor signal region at from –95 to –130 ppm and a second diffuse minor signal region at from –35 to –55 ppm.

In embodiments, the disclosure provides a porous silicon containing cermet comprising: at least one of the $^{29}$Si MAS NMR spectra of FIG. 19, having at least one of $SnO_2$ (dotted line), NiO (solid line), or a combination thereof. FIG. 19 shows the $^{29}$Si NMR spectra of two exemplary disclosed SPCermet compositions prepared, respectively, from $SnO_2$-doped and NiO-doped silica soot. An unidentified minor peak at about −45 ppm is under further investigation. The composition has a $^{29}$Si MAS NMR spectra having a major single peak at a chemical shift of −81 ppm, a first diffuse minor silicate signal region from at from −95 to −130 ppm, and a second unidentified diffuse minor signal region at a −35 to −55 ppm contains Si species. A resonance at −45 ppm is consistent with $Si_3N_4$.

Method of Making the Stable Porous Silicon Containing a Cermet (SPC)

In embodiments, the disclosure provides a method of making the above mentioned stable porous silicon composition containing a cermet (SPC), comprising:

compressing a mixture of a magnesium powder having a particle size of, for example, from 10 nm to 100 microns, a metal oxide having a particle size of, for example, from 10 nm to 100 microns, and a silica source powder (e.g., silica soot) having a particle size of, for example, from 10 nm to 100 microns, to a compressed form (e.g., a sheet, a pellet, and like forms) having a thickness of from 5 to 20 mm having a Mg:silica molar ratio from 1:1.5 to 1:1.99;

heating the compressed form at from 600 to 900° C., for example, 600 to 900° C., 600 to 850° C., 650 to 850° C., 700 to 850° C., 700 to 825° C., 725 to 825° C., 750 to 825° C., 775 to 825° C., 775 to 825° C., including intermediate values and ranges;

milling the compressed and heated form to an intermediate product powder;

leaching the intermediate product powder with an acid solution; and optionally washing the resulting leached product to form the porous silicon containing cermet composition.

In embodiments, the method of making the composition can further comprise:

coating the porous silicon containing cermet with at least one of a conductive material, a strength enhancing material, or a combination thereof, to form a coated porous silicon containing cermet composition.

In embodiments, the metal oxide can be selected from, for example, transition metals (e.g., Ag, Zn), metals (e.g., Al, Sn, Pb), alkaline earth metals (e.g., Mg), metalloids (e.g., B), or mixtures thereof, and the silica source powder or silica precursor powder can be selected from, for example, silica soot, quartz, fumed silica, or mixtures thereof.

In embodiments, the disclosure provides a porous silicon containing cermet composition made by the above method.

In embodiments, the disclosure provides an energy storage device comprising: an electrode comprising:

a conductive substrate (e.g., copper) coated with a mixture of the above mentioned coated porous silicon containing cermet composition, a conductive carbon, and a binder.

In embodiments, the device has at least one of:

an electrochemical gravimetric capacity of from 1000 to 2000 mAh/g;

an initial coulombic efficiency of from 38 to 96% (e.g., about 85%);

a second coulombic efficiency of from 60 to 96% (e.g., about 90%), or a combination thereof.

In embodiments, the disclosure provides products made by the disclosed methods, including a porous silicon composition made by the disclosed porous silicon method, an alloy porous silicon composition made by the disclosed alloy porous silicon method, or a porous silicon containing cermet made by the method for the disclosed porous silicon containing a cermet.

In embodiments, the disclosure provides a method of making a stable porous Si (SPS) composition, an alloy stable porous Si (ASPS) composition, or a stable porous cermet (SPC) composition including the use of, for example, naturally occurring minerals or synthetic equivalents as a starting material. The product compositions can have impurities that can form a metal-silicide (e.g., $Fe_2Si$, TiSi, etc.), which metal-silicide component can provide a benefit to the electronic conduction of the active material. When a natural mineral or glass are used as the reactant Si precursor, a metal-silicide is obtained. When a mixture of a metal oxide and soot are used as the reactant precursors a cermet is obtained.

The enthalpy of the magnesio-thermal reaction of these minerals per mol of silicon ($\Delta$H/mol Si) is lower compared to the conventional silicate precursors (e.g., soot, quartz, sand, clay, zeolite, etc.). The average density of the natural minerals is higher compared to the silicate source, which results in a greater yield per batch of Si production. This makes the natural mineral precursors attractive for large scale, low cost production of the alloy stable porous silicon (ASPS) materials.

The present disclosure is advantaged is several aspects, including for example:

The use of naturally occurring silicate sources, such as magnesium silicates, can eliminate a reaction step during the method of making (i.e., the formation of forsterite during the heating step (see FIG. 3A).

The enthalpy of reaction ($\Delta$H, KJ/mol Si) of natural magnesium silicates is lower compared to pure silica and other silicate sources or precursors, such as silica, soot, quartz, and like sources. Thus the adiabatic temperature/mol of Si generated during the reaction is lower for natural magnesium silicates.

The yield of porous Si per molar percent of a natural magnesium silicate precursor is higher compared to methods that use soot as an Si precursor. Most natural minerals have a higher density compared to soot, thus the total yield of the porous Si per reaction can be higher.

The disclosed methods of making the disclosed porous compositions provide lower costs and higher scalabilities compared to prior art methods.

When formulated into a lithium battery or like device, the electrochemical performance of the disclosed conformally coated porous silicon powder product is superior compared to a graphite based product.

In embodiments, an exemplary coating formulation for preparing the amorphous carbon forming sugar mixture included glucose and sucrose in aqueous sulfuric acid. The glucose solubility limit is about 5 M in 100 g water at 25° C., and the sucrose solubility limit is about 1.98 M in 100 g of water at 25° C. A more concentrated solution causes more difficulty in centrifuging to remove particles, and causes the carbon coating to be thicker. Typical amorphous carbon coating thicknesses were about 4 to 8 nm and can be readily decreased or increased by simple variation.

In embodiments, in a preferred carbon coating procedure, a precursor carbon forming coating solution was prepared by mixing 0.56 M glucose, 0.58 M aqueous sucrose, 1.7 mgs of 95% pure multi-walled carbon nanotube (mw-CNT)(from Nanostructured & Amorphous Materials, Inc.), 5 to 10 nm width by 5 to 10 micron in length) and 0.2 g/mL graphene oxide (GO, graphene sheets ranged from about 400 to 800 nm by 400 to 800 nm) in 0.16 M aqueous sulfuric acid. Various concentrations of mw-CNTs, such as above about 50 mgs/mL did not show marked improvements or benefits. TEM images (no shown) demonstrated the mw-CNTs were partially embedded into the amorphous carbon. Graphene oxide flakes having the dimensions: about 1 to 20 carbon layers thick with an average of about 12 layers thick; and an overall graphene oxide flake surface area was about 600 square nm, and were prepared from a commercially available graphene oxide. The stable porous silicon (SPS) was combined with the precursor coating solution and sonicated 1 hr to form a slurry. The slurry was centrifuged for 30 mins at 5000 to 9000 rpm, and the resulting SPS-sugar-graphene oxide-mw-CNT mixed (C-SPS) pellet was separated from the supernatant by decanting. The procedure can optionally be repeated to provide multiple coating layers on the SPS prior to final carbonization. Once the coating was completed, the pellet was transferred to a vacuum oven and dried at 80° C. for 4 hrs or more. The pellet was then transferred to a graphite or vitreous carbon crucible and thermally treated to carbonize by heating the closed mixture in an oven under argon atmosphere at 800 to 900° C. for about 5 hrs. The carbonized product can be pulverized or milled to a desired particle size.

The disclosed porous silicon composition products are highly versatile since the product can be elementally modified via precursor selection.

Magnesiothermic reduction of silica has been studied for several decades (see e.g., Sadique, et al., supra., and Cai, Y., et al., *Three Dimensional Magnesia-Based Nanocrystal Assemblies Via Low-Temperature Magnesiothermic Reaction of Diatom Microshells*. Journal of the American Ceramic Society, 2005. 88(7): p. 2005; and Chen, *Mesoporous Silicon Anodes Prepared by Magnesiothermic Reduction for Lithium Ion Batteries*. Journal of The Electrochemical Society, 2011. 158(9): p. A1055-A1059). Several different sources of silica have been studied from natural (e.g., diatoms, sand, quartz, etc.) to laboratory made complex structures. The reduction process can be divided into vapor phase and molten phase processes. In 'Vapor Phase Synthesis' the reactants (silica and Mg powders) are separated in the reaction chamber. The Mg volatilizes and contacts the silica particles only in vapor phase. In this instance the final reduced structure of the crystalline silicon is the same as the initial precursor. The final reduced Si structure is same as the initial diatoms (see Bao, supra.). The other process is a "Molten Phase Synthesis" or "Self Propagating High-temperature Synthesis (SPHS)" where the precursors are homogeneously mixed together before firing. The mixture is reacted in a closed system under inert atmosphere (see Favors, Dutta, supra., and Chen, W., et al., supra.). Under this processing condition the final porous crystalline Si has a sponge-like microstructure.

FIG. 3A shows a schematic and hypothetical mechanism of the molten phase reaction of the disclosure for the formation of a stable porous silicon (SPS) composition.

FIG. 3B shows a schematic of an exemplary stable porous silicon (SPS) composition product formed in FIG. 3A of the disclosure having a continuous porous silicon phase, i.e., a continuous silicon phase (continuous gray) having interconnected pores (open circles).

FIG. 3C shows a schematic of an exemplary alloy stable porous silicon ("alloy SPS"; ASPS) composition of the disclosure having a continuous porous silicon phase as described for FIG. 3B and further including a discontinuous or discrete metal-silicide phase (diagonal cross-hatching regions).

FIG. 3D shows a schematic of an exemplary stable porous cermet (SPC) composition of the disclosure having a continuous porous silicon phase as described for FIG. 3B and further including a discontinuous or discrete phase including a ceramic (cross-hatching regions).

FIG. 3E shows a schematic of an exemplary Type IV composition from a combination of Type II and Type III compositions or components, which composition is an alloy of silicon, a metal silicide, and a cermet, having a continuous porous silicon phase as described for FIG. 3B and further including a discontinuous or discrete phase including the metal silicide (double cross-hatching regions) and the cermet (diagonal cross-hatching regions).

Referring again to FIG. 3A, a hypothetical scheme is shown for the molten phase reaction of the molten phase method. The adiabatic temperature for this reaction is about 2100° K, which is higher than the melting temperature of Mg metal, silicon, and silica particles (Yermekova, Z., Z. et al., *Combustion synthesis of silicon nanopowders*. International Journal of Self-Propagating High-Temperature Synthesis, 2010. 19(2): p. 94-101). Above 1923° K (melting point of silica, a two phase liquid is formed consisting of forsterite (2MgO.SiO$_2$) and Si. During cooling from the maximum temperature the first product that precipitates uniformly throughout the melt is periclase (MgO). Finally when the temperature cools to below 1923° K, Si crystallizes capturing the MgO precipitates inside the crystalline Si matrix. During the subsequent acid leaching and cleaning process, the precipitated periclase dissolves leaving behind pores. This creates the porous structure in the final clean product. A flow chart that summarizes significant aspects of the molten phase synthesis is shown in FIG. 4A ("prior method"), and includes:

mixing reactants such as magnesium silicate and magnesium powder, and optionally wet mixing the mixture;

firing or heating the mixture, for example at 800° C. for 2 hr at a rate of 20° C. per minute;

a first etching or leaching, such as with 1 to 2 M HCl in an ethanol and water mixture, to react with and dissolve the soluble product Mg$_2$Cl;

reducing the particle size of the insoluble Si containing product, e.g., Eiger milling to about D50 of about 1 to 10 microns, such as about 5 microns;

a second etching or leaching, such as treating two times with 1 to 2 M HCl in an ethanol and water mixture;

cleaning the second etched product, i.e., a two step cleaning sequence of the as-fired SPS, i.e., a first water wash then a second ethanol wash; and drying the cleaned product such as at 100° C. to remove volatile liquids.

A flow chart that summarizes significant aspects of the molten phase synthesis in the presently disclosed method shown in FIG. 4B ("present method"), includes:

mixing reactants such as magnesium silicate and magnesium powder, and optionally wet mixing the mixture;

compressing the reactant mixture into a compressed pellet or form (e.g., calendering or applying high pressure under pressure of, e.g., from 200 to 40,000 psi to the mixture);

firing or heating the compressed form, for example at 800° C. for 5 hr at a rate of 5° C. per minute to produce a fired form;

reducing the particle size of the fired form product to a d50 of less than or equal to 10 microns;

an etching or leaching the reduced particles, such as with 0.1 to 2.5 M HCl in an ethanol and water mixture, to react with and dissolve the soluble products such as MgO and Mg$_2$Cl;

cleaning or washing the etched particles, for example, first with water and then with ethanol; and drying the cleaned product such as at 100° C. to remove volatile liquids.

The apparent reaction sequence occurring during the firing is shown in equations (1, 2, and 3):

$$2Mg + 2SiO_2 = Mg_2SiO_4 + 2Si \quad (1)$$

$$Mg_2SiO_4 + 2Mg = 4MgO + Si \quad (2)$$

$$Si + 2Mg = Mg_2Si \quad (3)(Excess/unreacted\ Mg).$$

In embodiments, the present disclosure includes methods of making that can use, for example, forsterite (Mg$_2$SiO$_4$ or 2MgO.SiO$_2$) as the Si precursor or Si source, which reacts with Mg metal to form MgO and Si. In this instance the reaction in equation (1) is avoided. The enthalpy (ΔH) of reaction (2) is 248 KJ/mol of Si, which is significantly lower than the enthalpy of magnesiothermal reduction of silica (ΔH=313 KJ/mol Si of reaction (1)). Similar magnesiothermal reduction reactions can be performed with any magnesium silicate of the formula xMgO.ySiO$_2$ where x and y are moles of magnesium oxide and silica, respectively, in the mineral.

The silicate minerals, such as magnesium silicate minerals, can, in embodiments, be selected from, for example, forsterite (Mg$_2$SiO$_4$), enstatite (MgSiO$_3$), talc (3MgO.4SiO$_2$), steatite, serpentine ((Mg,Fe)$_3$Si$_2$O$_5$(OH)$_4$), diopside (MgCaSi$_2$O$_6$), pigeonite, augite, anthophyllite (Mg,Fe)$_7$Si$_8$O$_{22}$(OH)$_2$), tremolite (Ca$_2$Mg$_5$Si$_8$O$_{22}$(OH)$_2$), actinolite (Ca$_2$(Mg,Fe)$_5$Si$_8$O$_{22}$(OH)$_2$), cummingtonite (Fe$_2$Mg$_5$Si$_8$O$_{22}$(OH)$_2$), richterite (Na$_2$Ca(Mg,Fe)$_5$Si$_8$O$_{22}$(OH)$_2$), monticellite (CaMgSiO$_4$), and like minerals, or mixtures thereof. Other silicate minerals, can be selected, for example, from clay, feldspar, and like minerals. Still other silicate reactants can be, for example a silicate glass, or a mixture of a silica source and a source of titanium oxide (TiO$_2$) powder.

Figure 5:
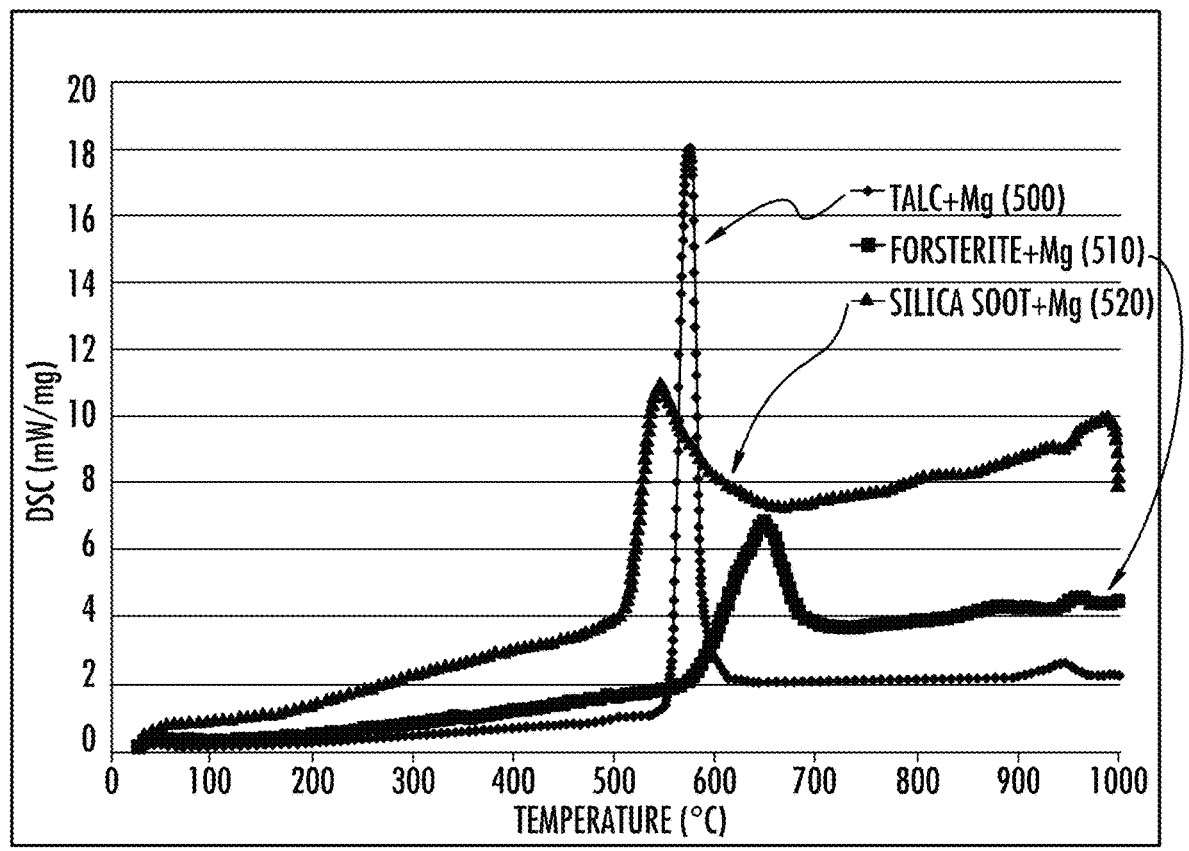
FIG. 5 shows DSC data for firing of magnesium powder mixed with different Si sources, such as silica soot, talc, and forsterite.

FIG. 5 shows the differential scanning calorimetry (DSC) data for three different precursors (talc (500), forsterite (510), and silica soot (520)) mixed with Mg powder using a ramp rate of 20° C./min. In each mixture the exothermic maxima falls within 540 to 650° C. The exothermic energy/mol of Si is highest for the pure silica soot (520) reaction of about 11 mW/mg, the forsterite (510) reaction is intermediate at 7.4 mW/mg, and the talc (500) reaction at 4.45 mW/mg is the lowest. Alternative Si sources and mixtures thereof can be selected if desired.

EXAMPLES

The following examples demonstrate making, use, and analysis of the disclosed stable porous silicon compositions, stable porous alloy compositions, stable porous silicon containing cermet compositions, electrode structures, energy storage articles, and methods of making and use in accordance with the above general procedures.

Example 1

Preparation of a Stable Porous Silicon (SPS) Powder 1.95 Mg (47.4 g)+SiO$_2$ (60 g) 1.95 MgO (78.6 g)+Si (28.1 g)

Figure 26:
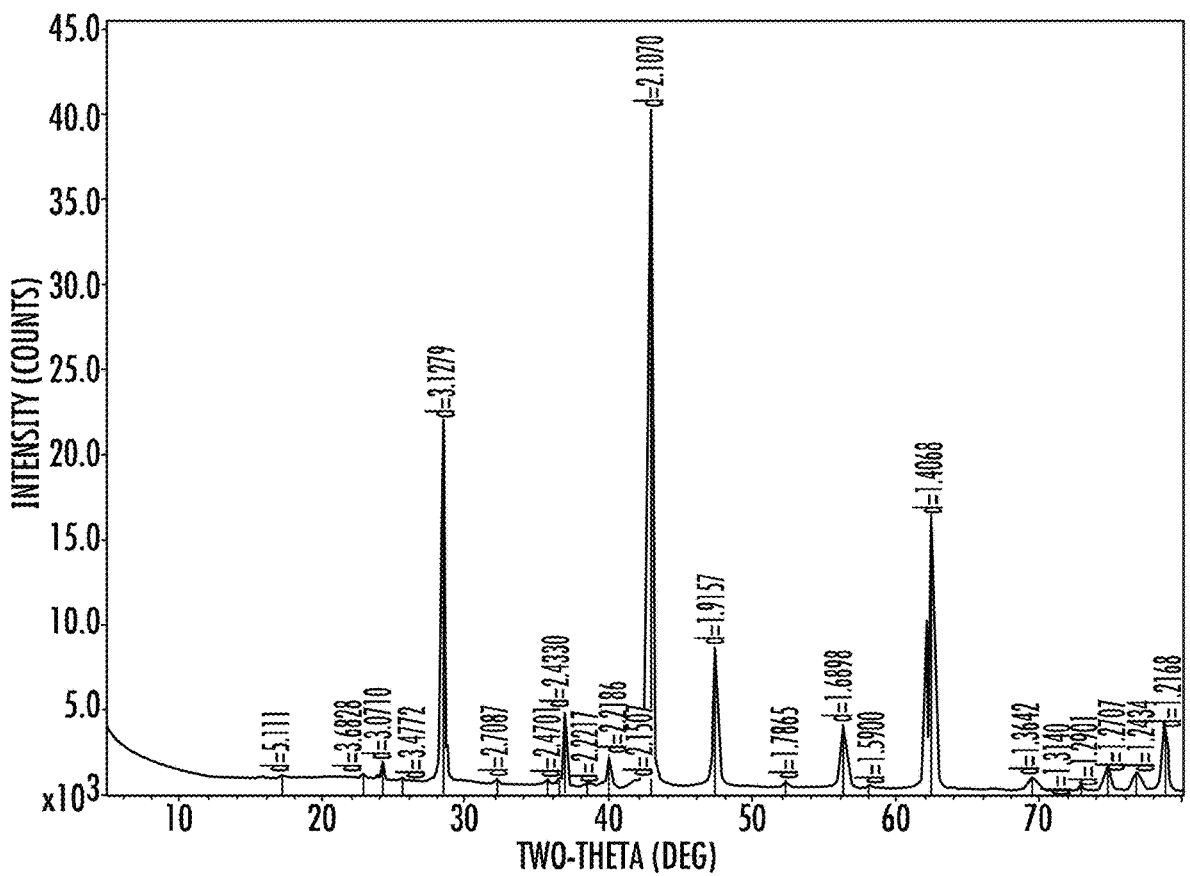
FIG. 26 shows an XRD of an un-cleaned intermediate product of an SPS method of making.

60 g SiO$_2$ soot and 47.4 g Mg were weighed and mixed together in a Nalgene bottle. 100% ethanol was added to form 50 wt % slurry. The slurry was then concentrated on a roto-evaporator to a homogenous powder. The homogeneous powder was then compressed into a 26 g pellet using a 2.25" Carver press pellet die. The pellet was compressed using an incremental pressure increase according to: 2.5 tons for 30 seconds, 5 tons for 30 seconds, and finally 10 tons for 30 seconds. The compressed pellets were fired in a non-oxygen atmosphere, preferably in argon. The firing schedule for the pelletized powder was: initial reaction at 800° C./5° C.-min ramp rate/dwell 5 hrs in a sealed (graphite collars) graphite crucible. A typical X-ray diffraction (XRD) spectrum of the intermediate product is shown in FIG. 26, and the final product shown in FIG. 27. The intermediate leading to the stable porous silicon (SPS) product was analyzed and is summarized in Table 1. The Reitveld analysis of the final stable porous silicon (SPS) product peaks for the two separately prepared final products are shown in Table 2 and Table 3, respectively. The reacted powder is reduced to a d50 of about 5 microns particles (d10 of about 1 microns, d95 of about 10 microns) as measured by a laser particle size distribution diffraction method with a Microtrac particle size analyzer S3500. The powder was then leached or extracted in a 2.4 M hydrochloric acid in ethanol solution (20% HCl/80% ethanol by volume) in an ultrasonic bath for 5 hrs, using a 20:1 ratio of solution (mL):powder (g). The leaching or extraction is believed to remove the MgO and $Mg_2Si$ phases. The first leached powder was centrifuged, at from 1250 and 2300 rpm to separate the particles from the solution. A second leaching or extraction was performed as above but for only 1.5 hrs. This second leaching is believed to remove the residual forsterite ($Mg_2SiO_4$) phase. A similar centrifuge schedule was used to separate the powder from the solubilized or leached forsterite. The leached powder was then cleaned with a 1:1 by volume mixture of DI water and 100% ethanol, then ultrasonicated for 1.5 hrs to dissolve the MgCl salts formed during the first and second leaching steps. The foregoing is referred to as the "standard soot+Mg cleaning procedure". The cleaned powder was centrifuged to remove residual liquid solution and the solid residue was placed in drying oven for 16 hrs or until powder was dry. The dried stable porous silicon (SPS) product was screened with a 325 mesh (i.e., less than 35 microns) to remove any unmilled and large particles, and then submitted for materials characterization (e.g., BET, PSD, XRD, helium pycnometry, and tap density). The final yield of 28 g, included, for example, the SPS, and residual forsterite and quartz listed in Tables 2 and 3.

TABLE 1

Intermediate SPS product characterization by XRD.

| As Fired Powder | Wt % | Crystallite size (nm) | Lattice Parameters | | |
|---|---|---|---|---|---|
| periclase - MgO | 72 | 89 | 4.216 | 4.216 | 4.216 |
| silicon | 22 | 63 | 5.418 | 5.418 | 5.418 |
| $Mg_2Si$ | 1.2 | 159 | 6.364 | 6.364 | 6.364 |
| forsterite | 5.1 | 32 | 4.755 | 10.170 | 5.999 |

TABLE 2

Final stable porous silicon (SPS) composition characterization by XRD.

| Final SPS Product | Wt % | Crystallite size (nm) | Lattice Parameters | | |
|---|---|---|---|---|---|
| Periclase - MgO | — | — | — | — | — |
| silicon | 98 | 380 | 5.432 | 5.432 | 5.432 |
| $Mg_2Si$ | — | — | — | — | — |
| forsterite | 1.5 | 496 | 4.756 | 10.184 | 5.997 |
| quartz | 0.5 | 544 | 4.913 | 4.913 | 5.387 |

TABLE 3

Final SPS composition characterization by XRD.

| Final SPS composition | Wt % | Crystallite size (nm) | Lattice Parameters | | |
|---|---|---|---|---|---|
| Periclase - MgO | — | — | — | — | — |
| Silicon | 96 | 239 | 5.432 | 5.432 | 5.432 |
| $Mg_2Si$ | — | — | — | — | — |
| forsterite | 3.4 | 398 | 4.759 | 10.201 | 5.993 |
| quartz | 0.8 | 180 | 4.917 | 4.917 | 5.409 |

Product characterization. The stable porous silicon (SPS) product was characterized by various known methods including: elemental chemical analysis; spectroscopic analysis; electrochemical analysis; surface analysis; and imaging techniques.

The SPS powders were conformally coated with conductive carbon materials in accordance with the procedure disclosed in the above mentioned U.S. Ser. No. provisional patent application 62/084,084 and as described below in Examples 9 to 14.

Exemplary SPS elemental ranges (Wt %) by ICP and Quantitative Spectrophotometric Analysis (QSA) are for example: Si: 65 to 80 wt %; Mg: 2 to 4 wt %; Ca, Fe, Zr, Al, Na, B, Li, Ti: 1 to 2 wt %; and O: 13 to 32 wt % (by difference of the sum of the preceding).

Example 2

Preparation of an SPS Electrode 0.5 g of a conformally coated stable porous silicon (SPS) material obtained from Example 1 was combined with 67 mg carbon, 67 mg polyacrylic acid (PAA), 33 mg carboxymethylcellulose (CMC), and 2.67 g water, and mixed in a Mazerustar (an integrated planetary mixing and de-aerating system from Kurabo) until well blended, with the PAA and CMC being fully dissolved in the water, making a slip batch. 5-6 5 mm YTZ® media (yttrium stabilized zirconia grinding beads) was used to assist the mixing. The slip batch was tape cast onto a 7 mil copper sheet using a 2 mil doctor blade. The tape cast material was air dried. The air dried casting was punched using a 16 mm round die into electrode samples. A 16 mm punched electrode was weighed and measured for thickness. The weighed electrode was calendared to a desired density. The final density of the electrode varied between 55-65% dense. The calendared electrode was vacuumed dried 16 hrs at 250° F. The vacuumed dried electrode was assembled into a conventional coin cell as shown in the exploded assembly FIG. 28 in an argon atmosphere. This is a half-cell configuration where one electrode is the electrode (i.e., anode) described above and the other electrode (i.e., cathode) is, for example, a pure lithium metal foil.

Figure 29:
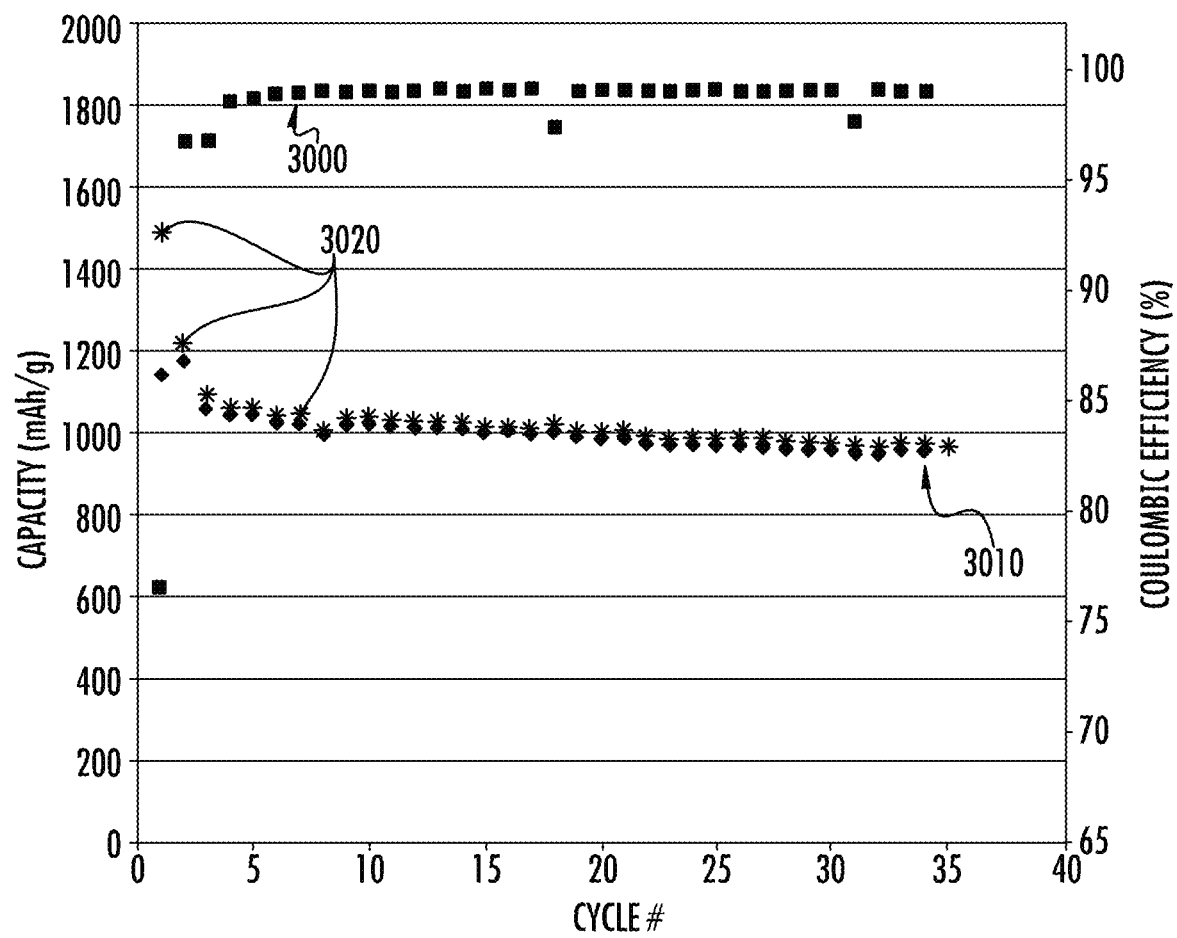
FIG. 29 shows electrochemical characterization (i.e., cycling) of a typical delithiation curve for a carbon coated SPS material in a half cell.

The assembled coin cell was tested for electrochemical properties. Each coin cell was tested at C/10 with a 1.75 mA/cm² current density. Each cell had a high initial capacity (greater than 1500 mAh/g) and an initial coulombic efficiency of about 85%. The second coulombic efficiency of these materials were about 95%. A typical delithiation curve is shown in FIG. 29 for SPS material in the half cell.

Comparative Example 3

Magnesiothermal Reduction of Calcined Natural Talc ($3MgO.4SiO_2$)

$8Mg+(3MgO. 4SiO_2)=11MgO+4Si$ $\Delta H=290$ KJ/mol Si

Weight in grams: 194.44+361.244=443.344+112.34

Yield of Si: 26.6% (by mol), 20.2% (by wt).

Figure 6A:
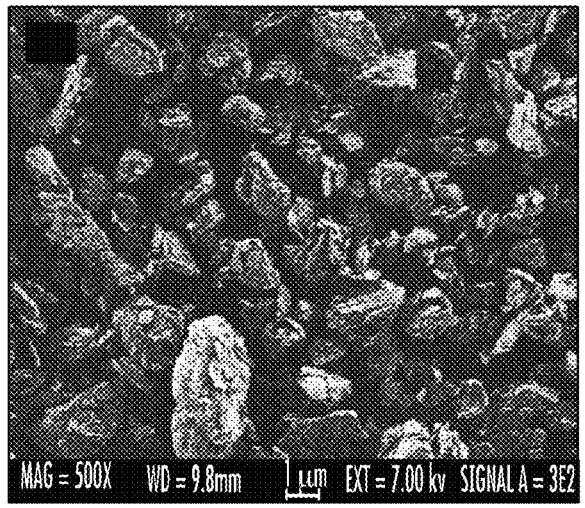
FIGS. 6A to 6D show SEM images of calcined talc (FIGS. 6A and 6B), and an ASPS from talc (FIGS. 6C and 6D show the same material having images at different magnification).
Figure 6B:
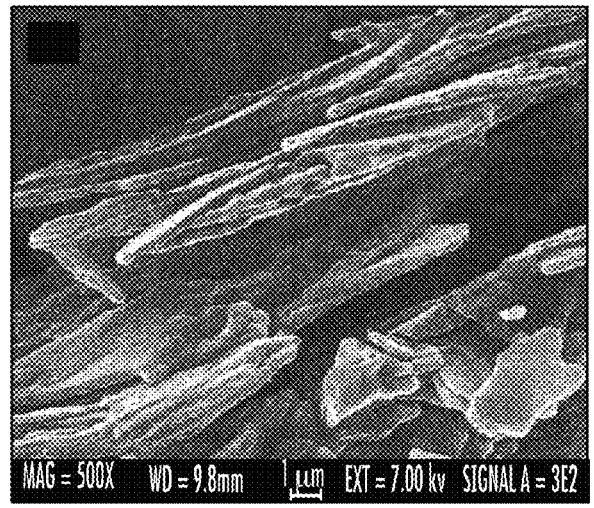
Figure 6C:
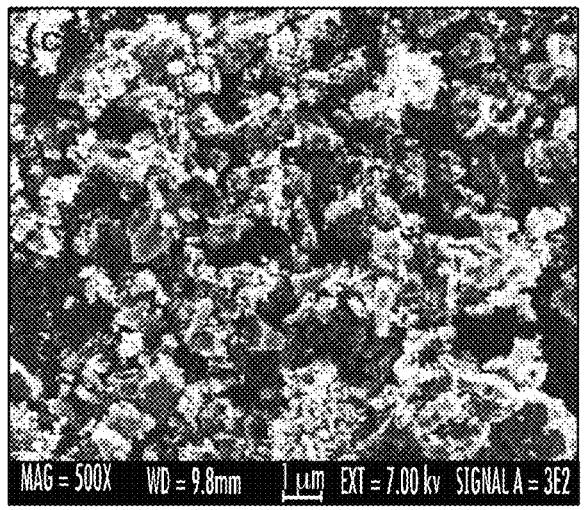
Figure 6D:
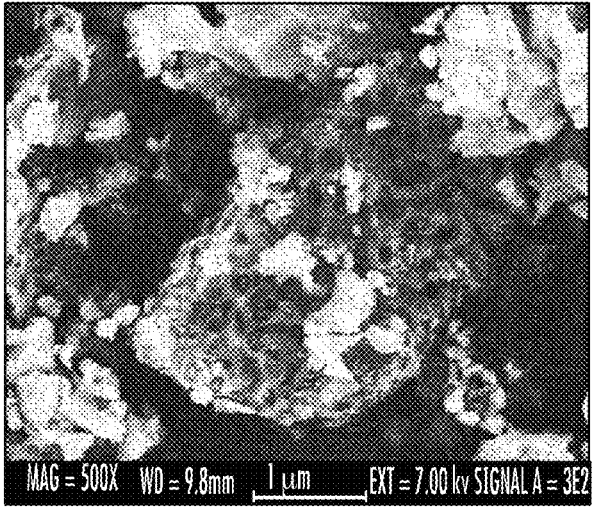
Figure 7A:
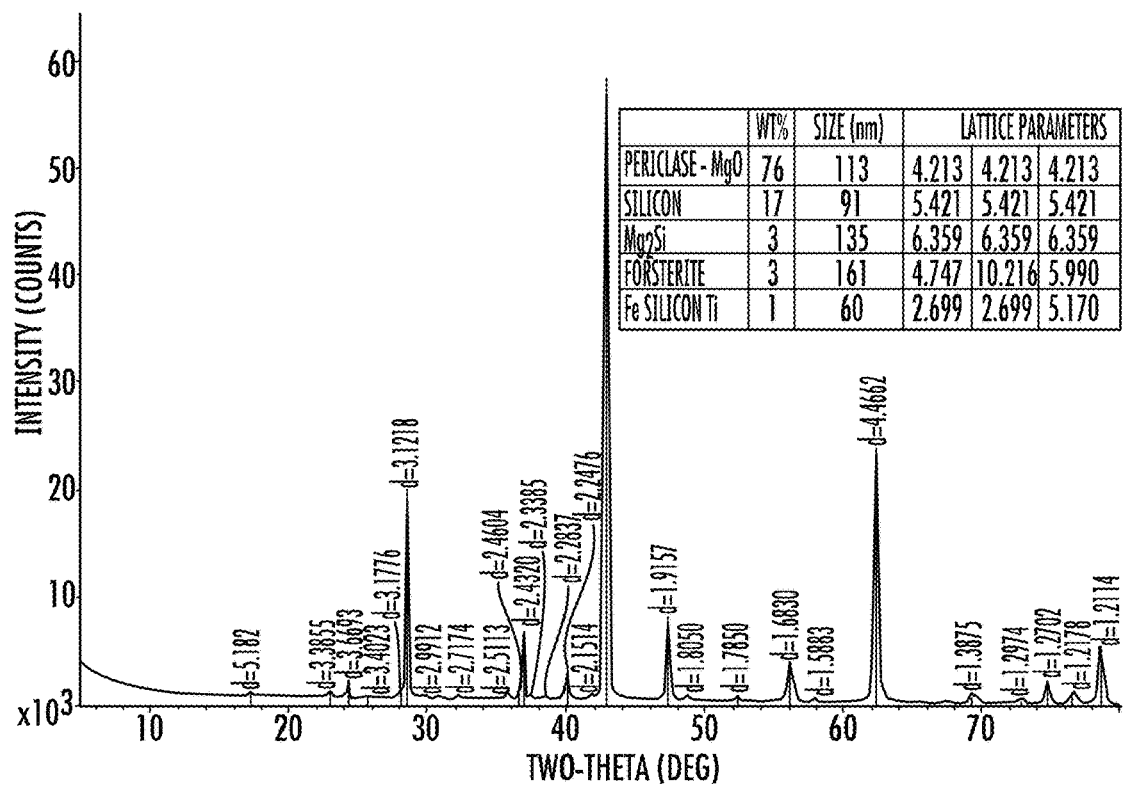
FIGS. 7A to 7B show x-ray diffraction (XRD) spectra from magnesiothermal reduction of talc before cleaning (FIG. 7A) and after cleaning (FIG. 7B).
Figure 7B:
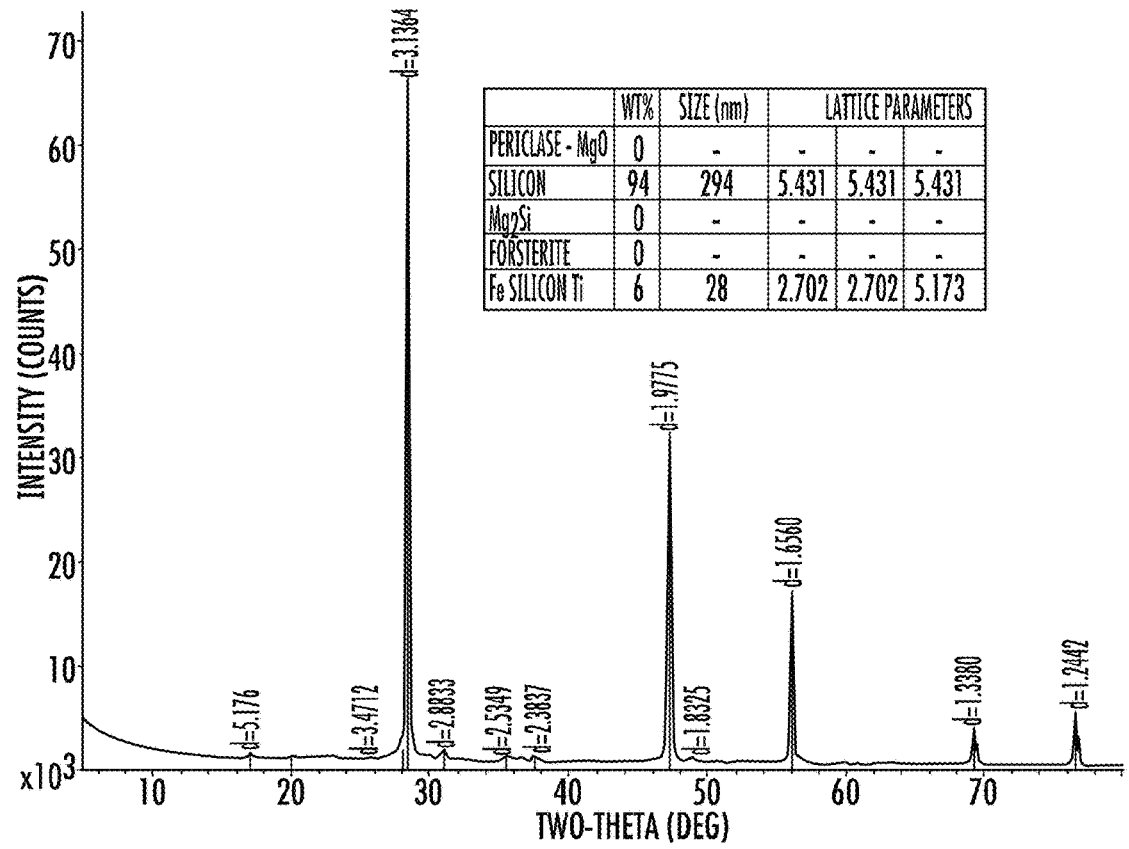

Natural mineral talc is hydrated. A calcining step can be used to remove water from the structure. This can be accomplished in a rotary kiln at from 800 to 1300° C. FIGS. 6A and 6B show SEM images of a 1150° C. calcined talc at different magnifications. The higher magnification image (FIG. 6B right) reveals the flakey or platety nature of talc powder. This powder was mixed thoroughly in ethanol using a rotovap with Mg powder. A crucible was completely filled by hand packing and had no large void space. Compared to the soot mixture, it was easier to hand pack the talc and Mg mixture because of the higher density of the talc. The mixture was then fired in the sealed graphite crucible under Ar atmosphere at 800° C./2 hrs at 20° C./min ramp. After firing it was observed that the as-fired material formed a strong cake (i.e., a monolith solid) in the shape of the crucible. FIG. 7A shows the X-ray spectrum of the as-fired powder, which showed usual products (MgO, Si, forsterite, and magnesium silicide) along with some Fe/Ti silicide. This Fe/Ti silicide could be due to the presence of Fe/Ti impurities in the forsterite or talc. The Fe/Ti silicide could be beneficial for the SPS since Fe can increase the electronic conduction of the porous Si. The FIG. 7A inset shows the Rietveld data for the as-fired material, which shows that about 17 wt % Si is formed as the rest of the Si is consumed to reform forsterite and some $Mg_2Si$ and Fe/Ti silicides. The as-fired powder was etched and cleaned following the steps outlined in FIG. 4A. FIG. 7B shows the XRD data for the cleaned Si from talc. The product appears to be fairly pure with about 96 wt % crystalline Si and the remainder is Fe silicide. FIG. 6C shows the SEM image of the cleaned crystalline Si. These images demonstrate that the disclosed final SPS product is indeed porous in nature. This is similar to the microstructure observed for the silica precursor.

Table 4 summarizes final SPS and alloy SPS surface area and pore property characterizations.

TABLE 4

Final SPS and Alloy SPS Surface Area And Pore Property Characterization.

| Sample ID | BET (multi-point) Surface Area ($m^2/g$) | BJH[1] Cumul. Surf. Area of Pores ($m^2/g$) | BJH[1] Cumulative Pore Volume ($cm^3/g$) | BJH[1] Average Pore Diameter (A) |
|---|---|---|---|---|
| SPS | 91 | 81 | 0.224 | 110 |
| Alloy SPS | 90 | 95 | 0.242 | 102 |

[1]BJH (Barrett, Joyner, and Halenda) is a method for calculating pore size distributions from experimental isotherms using the Kelvin model of pore filling. It applies only to the mesopore and small macropore size range (and by inference inapplicable to micropores) (see Barrett, E. P., et al., JACS, 1951.

Table 5 summarizes surface area and pore property characterizations of the cleaned products prepared from different precursors.

TABLE 5

Surface area comparison of the cleaned products prepared from different precursors.

| Sample precursors | BET (multi-point) Surface Area ($m^2/g$) | Single point surface area ($m^2/g$) | BJH[1] Cumul. Surf. Area of Pores ($m^2/g$) | BJH[1] Cumulative Pore Volume ($cm^3/g$) | BJH[1] Average Pore Diameter (A) |
|---|---|---|---|---|---|
| soot + Mg | 61.09 | 59.35 | 42.07 | 0.08 | 78.2 |
| talc + Mg | 38.49 | 37.35 | 30.45 | 0.07 | 93.0 |

[1]BJH see footnote 1 for Table 4 above.

Example 4

Magnesiothermal Reduction of Natural Forsterite $2Mg+Mg_2SiO_4=4MgO+Si$ $\Delta H=248$ KJ/mol Si (using forsterite)

Wt in gms: 48.6+140.7=161.2+28.1

Yield of Si: 20% (by mol) and 14.8% (by wt)

Figure 8A:
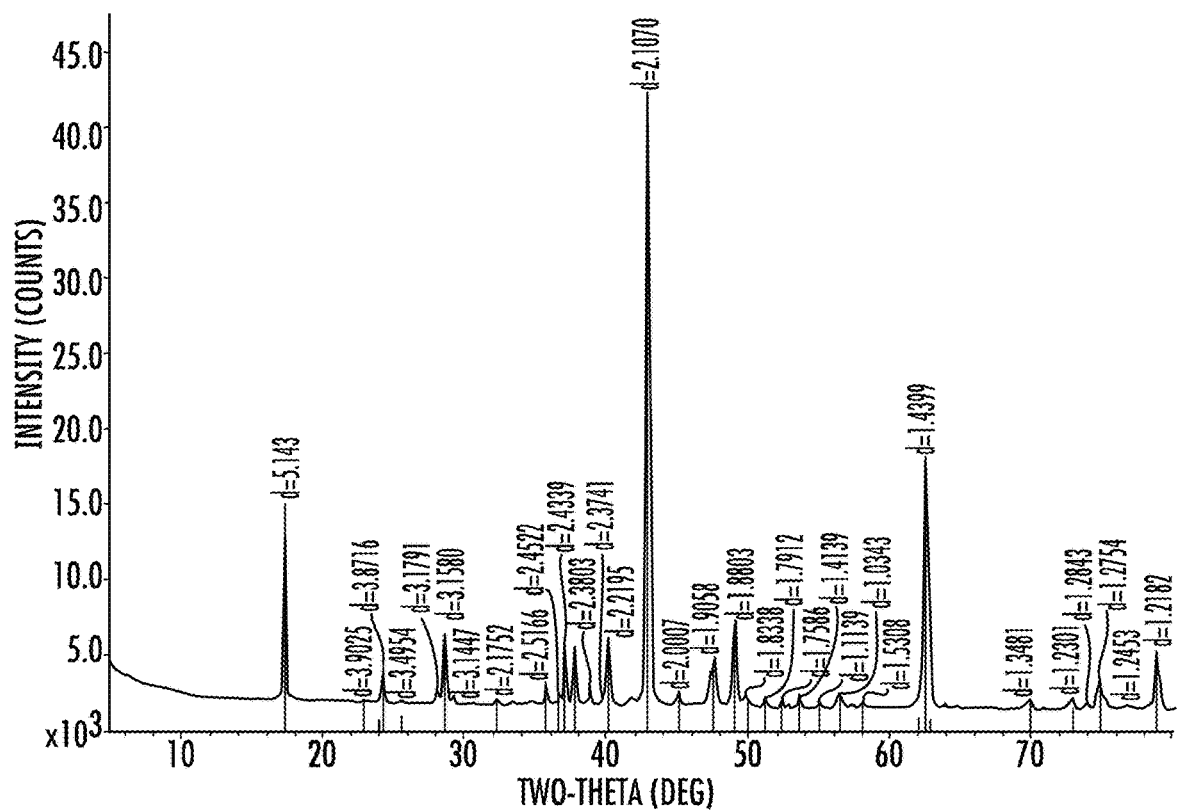
FIGS. 8A and 8B show XRD spectra from magnesiothermal reduction of forsterite before cleaning (FIG. 8A) and after cleaning (FIG. 8B).
Figure 8B:
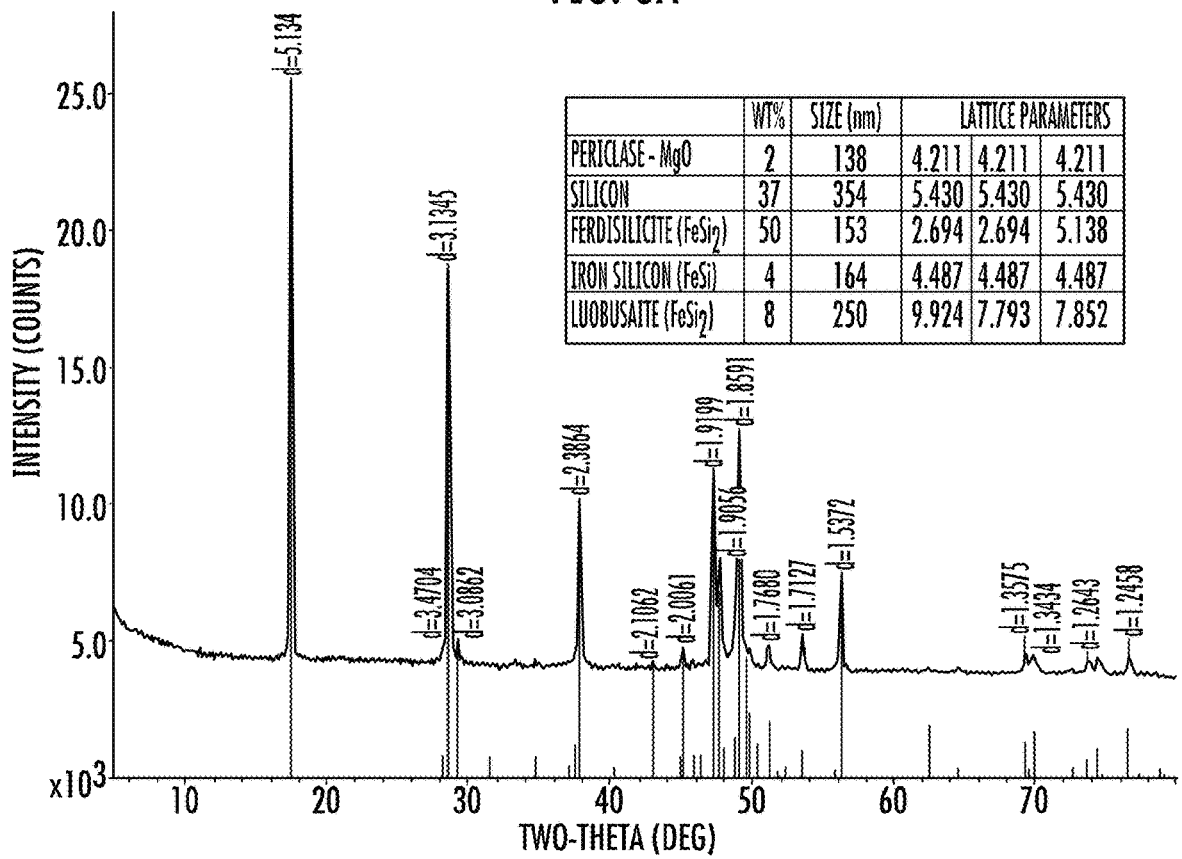
Figure 9A:
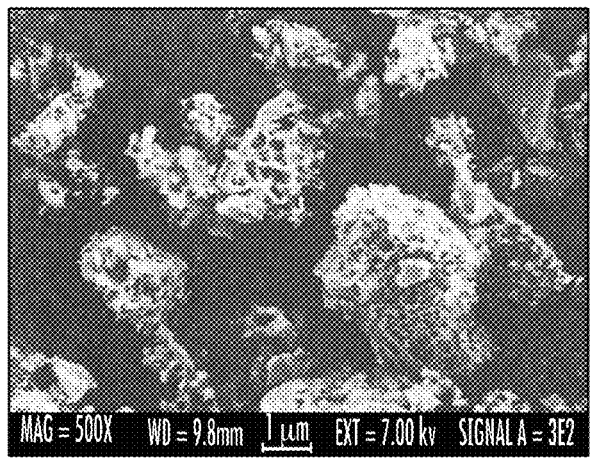
FIGS. 9A and 9B show SEM images of a forsterite alloy-SPS (ASPS).
Figure 9B:
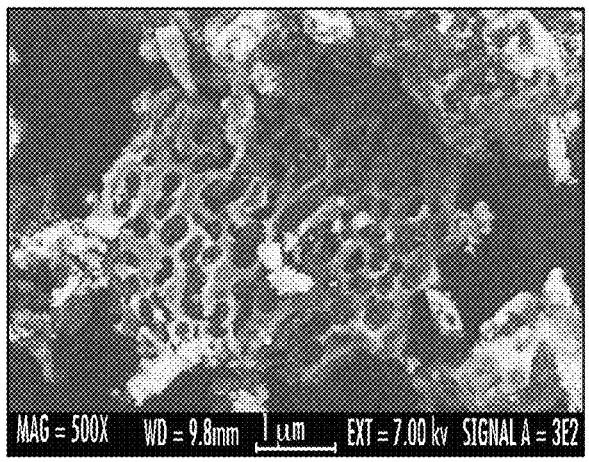

Similar processing was used with natural forsterite ($2MgO.SiO_2$) from Alfa Aeser. Handheld x-ray fluorescence (XRF) measured Si at 16 wt %, Mg at 12 wt %, and Fe at 9 wt % for a total of 37 wt %, and a trace amount (i.e., less than 1 wt %) of Mn and Ni, which trace elements are attributable to the natural mineral forsterite. The as-fired product showed formation of iron silicides along with periclase, and Si and magnesium silicide as shown in FIG. 8A. Cleaning of this material resulted in a mixed phase of crystalline Si and Fe-silicide as shown in FIG. 8B. It is notable that there are two forms of iron silicides that are formed having different oxidation states of Fe. Rietveld analysis is shown in the FIG. 8B inset. The SEM microstructure of the cleaned product is still porous in nature and is shown in FIGS. 9A and 9B. FIGS. 9A and 9B show an alloy-SPS-forsterite (ASPS) (the same material having images at different magnification)(Scale bar: 1 micron).

Figure 10A:
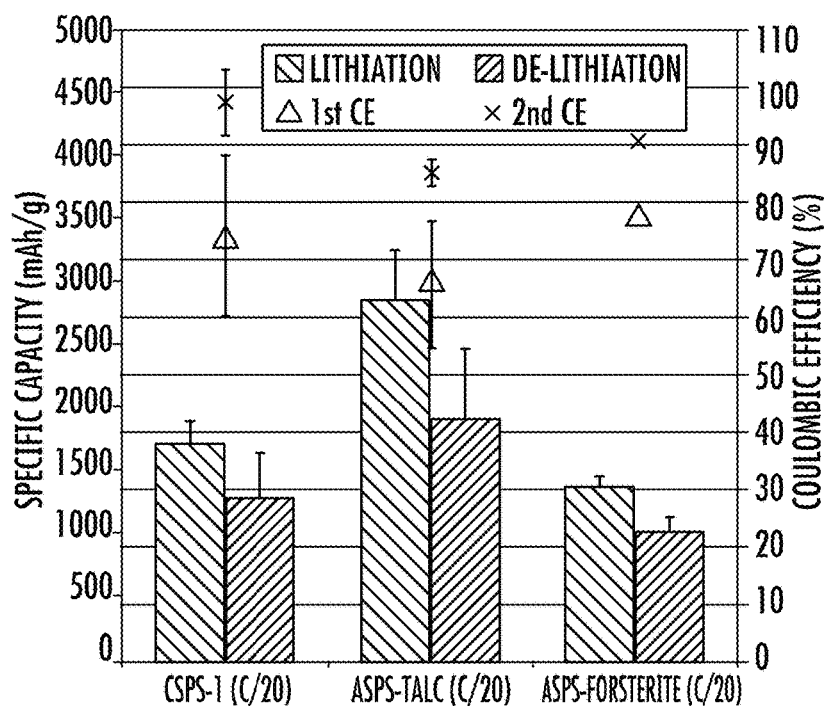
FIGS. 10A and 10B show electrochemical characterization of the disclosed compositions.
Figure 10B:
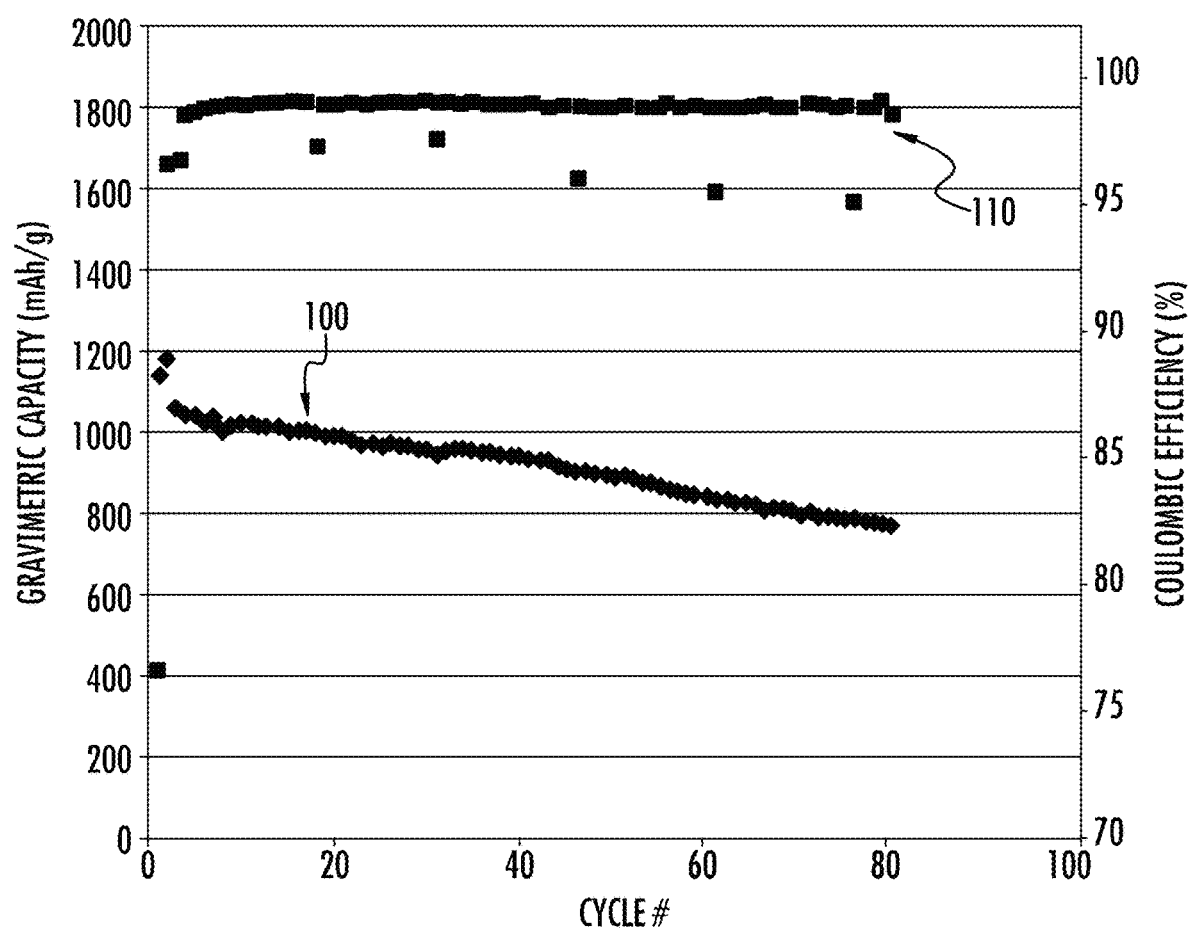

Electrochemical Cycle Performance:

Electrochemical performances of different SPS materials are shown in FIGS. 10A and 10B. All electrochemical performance evaluations were accomplished on porous silicon, alloy porous silicon, or stable porous cermet samples that had been conformally coated as indicated.

FIG. 10A shows, respectively, electrochemical characterization of an inventive CSPS-1 (i.e., conformally carbon coated SPS, where the SPS was prepared as disclosed herein and the conformal coating was applied according to the prior coating method as disclosed in the abovementioned Provisional Patent Application U.S. Ser. No. 62/084,084), an inventive alloy-SPS-talc (ASPS-talc), and an inventive alloy-SPS-forsterite (ASPS-forsterite). FIG. 10A shows the initial electrochemical performance of a coated SPS (CSPS-1)(conformal carbon coated SPS), and two alloy SPS (ASPS) compositions (talc left; forsterite right) that were also conformally coated, in a lithium battery device.

FIG. 10A shows the benefit of the ASPS-talc having the highest average de-lithiation capacity of about 1920 mAh/g. The average delithiation capacity for the coated SPS is 1300 mAh/g. In contrast, the ASPS-forsterite product, which has about 50% inactive $Fe_2Si$ alloy, has an initial capacity of 1046 mAh/g. The initial coulombic efficiency (ICE) of the ASPS-talc and the ASPS-forsterite was 66% and 78%, respectively.

FIG. 10B shows electrochemical characterization (i.e., cycling) of a disclosed SPS (Type 1) composition having a gravimetric capacity (i.e., delithiation specific capacity) (mAh/g) (100) (diamonds) and a coulombic efficiency (%) (110) (squares) over 80 cycles.

Figure 11:
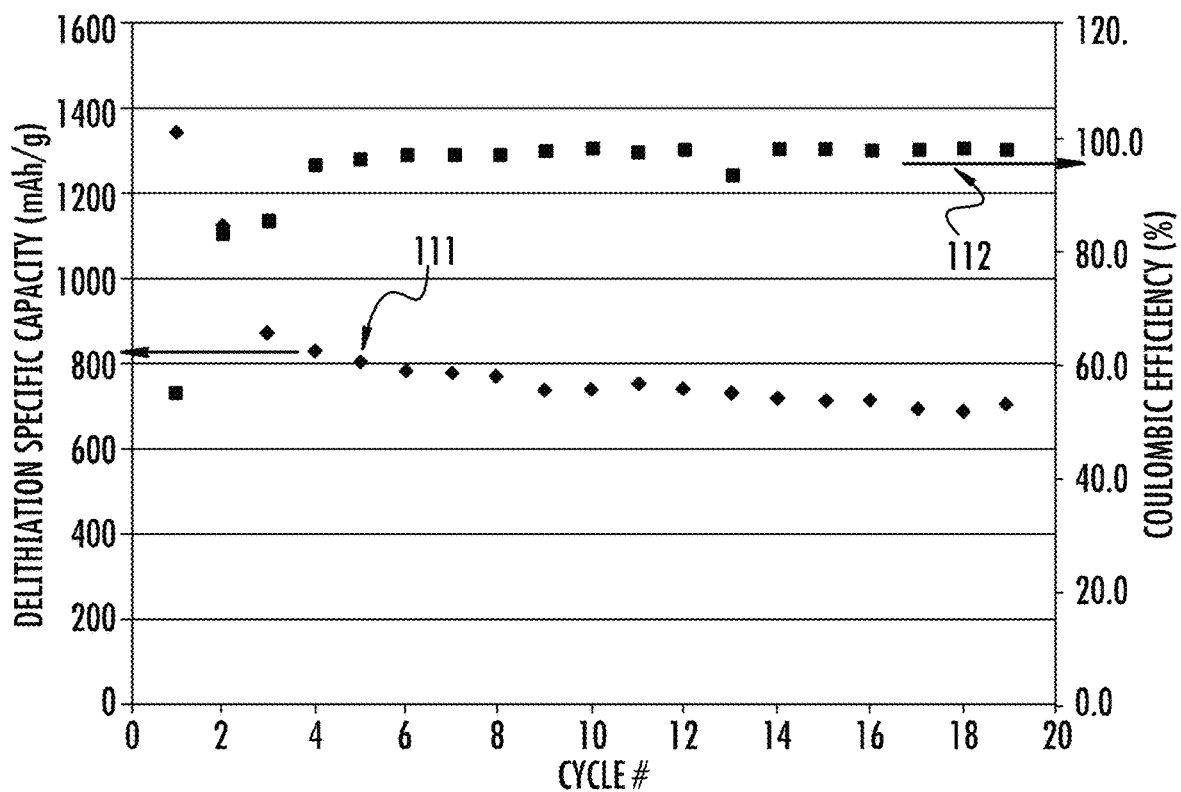
FIG. 11 shows initial electrochemical parameters of a disclosed talc-ASPS including C/20, and C/10 cycling data.
Figure 12:
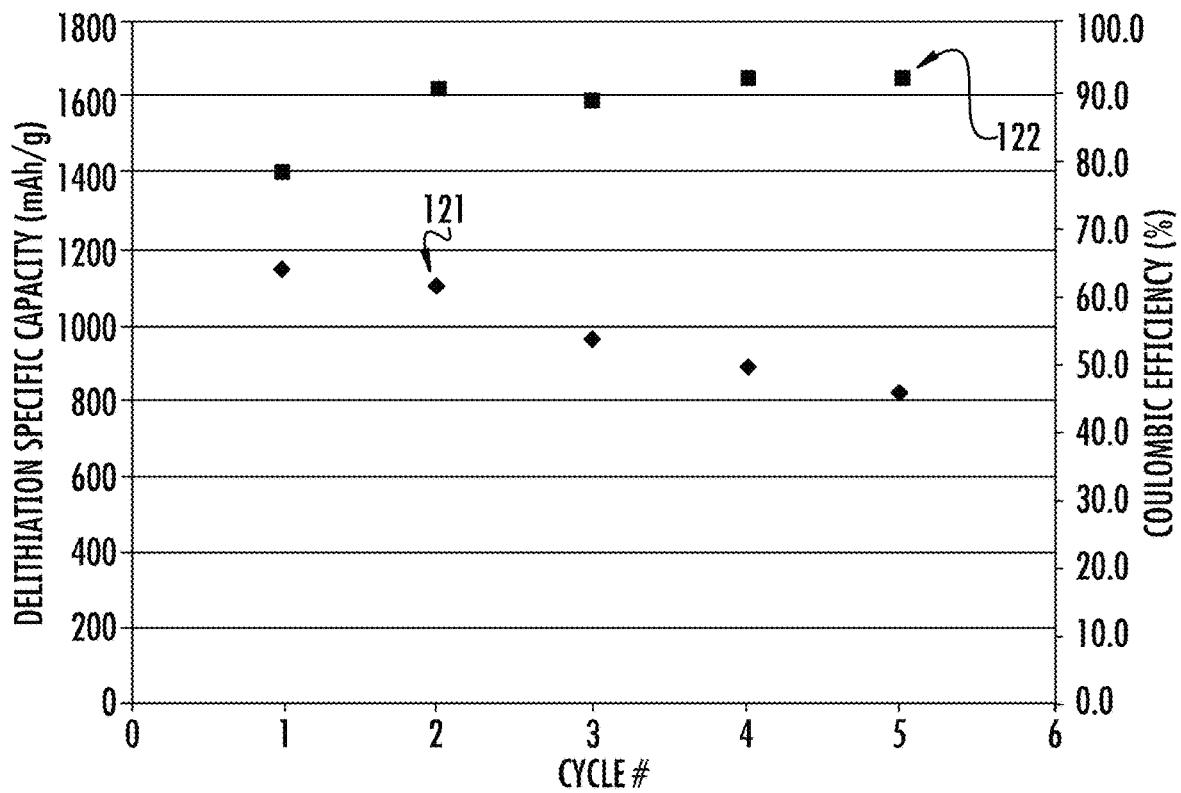
FIG. 12 shows initial electrochemical parameters of a disclosed forsterite-SPS including C/20, and C/10 cycling data.

FIGS. 11 and 12 also show the initial cycling performances of ASPS-talc and ASP S-forsterite, respectively. FIG. 11 shows the delithiation specific capacity (mAh/g) (111) (diamonds) and a coulombic efficiency (%) (112) (squares) over 19 cycles for a disclosed talc-ASPS. FIG. 12 shows the delithiation specific capacity (mAh/g) (121) (diamonds) and a coulombic efficiency (%) (122) (squares) over 5 cycles of a disclosed forsterite-SPS.

It is evident from the talc-ASPS cycling data (FIG. 11) that after the fourth cycle the curve flattens, which indicates cycling stability of the alloy porous structure. The porous alloys are preferably conformally coated to further enhance the cycling performance.

Figure 13:
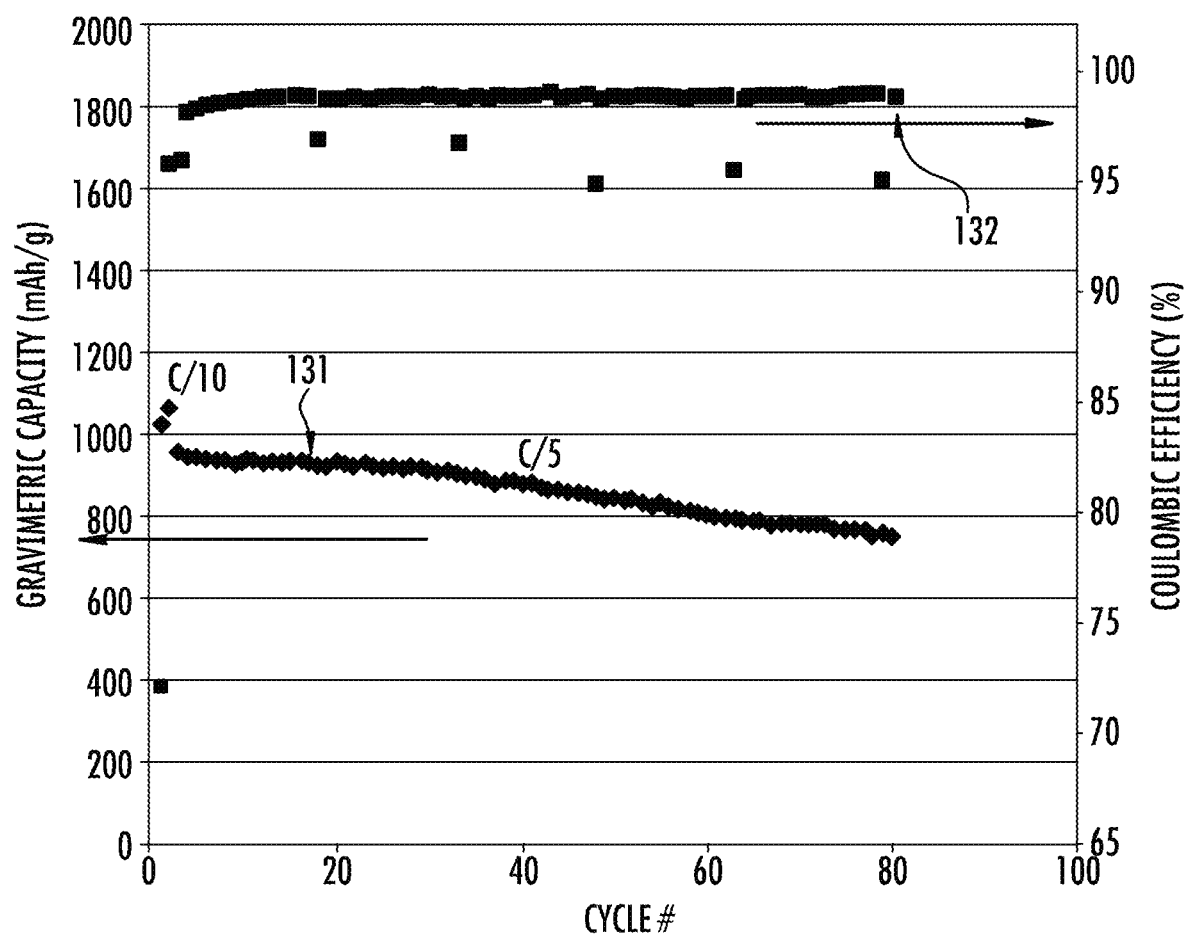
FIG. 13 shows initial electrochemical parameters of an ASPS prepared from a $TiO_2$ doped silica soot precursor, i.e., electrochemical cycling of an ASPS Ti-Silicide (Ti—$Si_2$) prepared using a $TiO_2$ doped silica soot precursor.

FIG. 13 shows initial electrochemical parameters of an ASPS prepared from a $TiO_2$ doped silica soot precursor, i.e., electrochemical cycling of an ASPS Ti-Silicide (Ti—$Si_2$) prepared using a $TiO_2$ doped silica soot precursor. FIG. 13 shows the gravimetric capacity (i.e., delithiation specific capacity) (mAh/g) (131) (diamonds) and a coulombic efficiency (%) (132) (squares) over 80 cycles.

Alloy SPS (ASPS)

Example 5

Magnesiothermal Reduction of 6 wt % $TiO_2$ Doped $SiO_2$; Alloy SPS from $TiO_2$ Doped Silica Soot 1.95 Mg+$TiO_2$ doped $SiO_2$=MgO+Si+$Mg_2SiO_4$+$Mg_2Si$+TiSi Weight in grams: 47.39 g Mg+60.08 g 6 wt % $TiO_2$ doped $SiO_2$ Yield of Si: about 33% by wt.

Soot and magnesium powders are mixed thoroughly in ethanol using a rotovap. The resulting evaporated powder mixture was compressed (as in Example 1) into a 2 inch diameter pellet having a thickness of about 8.1 mm. The mixture was then fired in a sealed graphite crucible under Ar atmosphere at 800° C. for 2 hrs at 5° C./min ramp. After firing it was observed that the as-fired material was very friable (i.e., breaks apart fairly uniformly) to form a large particle powder. This large particle powder was then processed to a 5 micron average particle size through wet milling and screening. Table 6 summarizes the X-ray spectrum of the as-fired powder, which showed usual products (MgO, Si, forsterite, and magnesium silicide) along with some Ti silicide. Table 6 lists the Rietveld data for the as-fired material, which shows that about 20 wt % Si is formed. The as-fired powder was etched and cleaned following the steps outlined in the "standard" soot+Mg cleaning procedure. Although not limited by theory, the Ti silicide may be beneficial for the SPS since Ti can increase the electronic conduction of the porous Si.

TABLE 6

A summary of the X-ray spectrum of the as-fired alloy from 6 wt % $TiO_2$ doped $SiO_2$ powder source.

| Final alloy SPS composition | Wt % | Crystallite size (nm) | Lattice Parameters | | |
|---|---|---|---|---|---|
| Periclase - MgO | 70 | 73 | 4.214 | 4.214 | 4.214 |
| Silicon | 20 | 61 | 5.417 | 5.417 | 5.417 |
| $Mg_2Si$ | 1.2 | 40 | 6.357 | 6.357 | 6.357 |
| Forsterite | 6.4 | 66 | 4.749 | 10.216 | 5.994 |

TABLE 6-continued

A summary of the X-ray spectrum of the as-fired alloy from 6 wt % $TiO_2$ doped $SiO_2$ powder source.

| Final alloy SPS composition | Wt % | Crystallite size (nm) | Lattice Parameters | | |
|---|---|---|---|---|---|
| $TiSi_2$ | 3.3 | 104 | 8.270 | 4.803 | 8.553 |
| $TiSi_2$ | 1.5 | 63 | 3.568 | 13.534 | 3.555 |

SPCermet ("SPCermet")

Example 6

Magnesiothermal Reduction of 20 wt % $SnO_2$ Doped $SiO_2$; SPCermet from $SnO_2$ Doped Silica 1.95Mg+$SiO_2$ (80 wt %)+$SnO_2$ (20 wt %)=MgO+Si+Tin+$SnO_2$+$Mg_9Sn_5$+$Mg_2SnO_4$ Wt in grams: 47.39 g Mg+48.06 g $SiO_2$+12.02 g $SnO_2$ Yield of Active material Si+Sn containing materials: about 33 wt %

Soot, tin oxide, and magnesium powders were mixed thoroughly in ethanol then dried using a rotovap. The dried powders were compressed (as in Example 1) into 2" diameter pellets with a thickness of 8.1 mm. The mixture was then fired in a sealed graphite crucible under Ar atmosphere at 800° C./2 hrs at 5° C./min ramp. After firing it was observed that the as-fired material breaks apart fairly uniformly to form a large particle powder. This large particle powder was then processed to a 5 micron average particle size through wet milling and screening. Table 7 lists the X-ray spectrum of the as-fired powder, which showed usual products (MgO, Si, and magnesium silicide) along with Sn silicide, elemental tin, excess $O_2$, and some $SnO_2$. Although not bound by theory, the Sn silicide may be beneficial for the SPCermet since Sn can increase the electronic conduction of the porous Si. Table 7 lists the Rietveld data for the as-fired material, which shows that about 20 wt % Si is formed. The as-fired powder was etched and cleaned following the steps outlined in the "standard" soot+Mg cleaning procedure.

TABLE 7

20 wt % $SnO_2$ doped Si + Mg.

| Final SPS Cermet composition | Wt % | Crystalline size (nm) | Lattice Parameters | | |
|---|---|---|---|---|---|
| Periclase - MgO | 65 | 92 | 4.213 | 4.213 | 4.213 |
| Silicon | 18 | 88 | 5.421 | 5.421 | 5.421 |
| $Mg_2Si$ | 9.5 | 84 | 6.384 | 6.384 | 6.384 |
| Tin | 2.4 | 100 | 5.832 | 5.832 | 3.181 |
| Cassiterite - $SnO_2$ | 0.4 | 672 | 4.737 | 4.737 | 3.187 |
| $Mg_9Sn_5$ | 1.6 | 156 | 13.251 | 13.251 | 13.322 |
| $Mg_2Sn$ | 2.2 | 30 | 6.723 | 6.723 | 6.723 |
| $Mg_2SnO_4$ | 0.6 | 32 | 8.633 | 8.633 | 8.633 |

Example 7

Magnesiothermal Reduction of Silica Soot and 20 wt % NiO 1.95 Mg+80 wt % $SiO_2$+20 wt % NiO=NiO cermet Weight: 47.39 g Mg+48.06 g $SiO_2$+12.02 g NiO Yield of Active material Si+Ni containing materials: about 33 wt %.

Soot, nickel oxide, and magnesium powders were mixed thoroughly in ethanol using a rotovap then evaporated to dryness. The dry powder was compressed (as in Example 1) into a 2" diameter pellet having a thickness of 8.1 mm. The pellet was then sealed in a graphite crucible under Ar atmosphere and fired at 800° C. for 2 hrs at 5° C./min ramp. After firing it was observed that the as-fired material breaks apart fairly uniformly to form a large particle powder. The large particle powder was then processed to a 5 micron average particle size through wet milling and screening. The as-fired powder was etched and cleaned following the steps outlined in the "standard" soot+Mg cleaning procedure. The milled powder XRD shows unidentified phases. Although not bound by theory, the Ni silicide phase could be beneficial for the SPS Cermet since Ni can increase the electronic conduction of the porous Si.

Example 8

$Al_2O_3$ Cermet: Magnesiothermal Reduction of Silica Soot+20 wt % $Al_2O_3$ 1.95 Mg+80 wt % $SiO_2$+20 wt % $Al_2O_3$=MgO+Si+Al+$Mg_2Si$+$Mg_2SiO_4$+$MgAl_2O_4$ Reactant Wts: 47.39 g Mg+48.06 g $SiO_2$+12.02 g $Al_2O_3$ Yield of Active material Si+$Al_2O_3$ containing materials: about 33 wt %

The soot, aluminum oxide, and magnesium powders were mixed thoroughly in ethanol and then dried in a rotovap. The dried powder was compressed (as in Example 1) into 2" diameter pellets with a thickness of 8.1 mm. The pellet was then fired in a sealed graphite crucible under Ar atmosphere at 800° C. for 2 hrs at 5° C./min ramp. After firing it was observed that the as-fired material breaks apart fairly uniformly to form a large particle powder. The large particle powder was then processed to a 5 micron average particle size through wet milling and screening. Tables 8 (20% $Al_2O_3$) and 9 (10% $Al_2O_3$) show the X-ray spectrum of the as-fired powder, which showed usual products (MgO, Si, magnesium silicide, and forsterite) along with elemental aluminum and spinel (for the 20 wt % doped). Tables 8 and 9 list the Rietveld data for the as-fired material, which shows that about 17 wt % and 20 wt % Si is formed respectively. The as-fired powder was etched and cleaned following the steps for the "standard" soot+Mg cleaning procedure.

TABLE 8

$Al_2O_3$ Cermet from: 20 wt % $Al_2O_3$ + $SiO_2$ + Mg.

| Final $Al_2O_3$ cermet composition | Wt % | Crystallite size (nm) | Lattice Parameters | | |
|---|---|---|---|---|---|
| periclase - MgO | 67 | 87 | 4.213 | 4.213 | 4.213 |
| silicon | 17 | 86 | 5.419 | 5.419 | 5.419 |
| $Mg_2Si$ | 11 | 232 | 6.355 | 6.355 | 6.355 |
| forsterite | 0.8 | 87 | 4.739 | 10.231 | 5.997 |
| aluminum | 3.4 | 65 | 4.054 | 4.054 | 4.054 |
| spinel | 1.1 | 111 | 8.086 | 8.086 | 8.086 |

$Al_2O_3$ Cermet 1.95 Mg+90 wt % $SiO_2$+10 wt % $Al_2O_3$=MgO+Si+Aluminum+$Mg_2Si$+$Mg_2SiO_4$ Reactant Wt: 47.39 g Mg+54.07 g $SiO_2$+6.01 g $Al_2O_3$ Yield of active material Si+Sn containing materials: about 33 wt %

TABLE 9

$Al_2O_3$ Cermet from: 10 wt % Doped $Al_2O_3$ + $SiO_2$ + Mg.

| Final $Al_2O_3$ cermet composition | Wt % | Crystallite size (nm) | Lattice Parameters | | |
|---|---|---|---|---|---|
| periclase - MgO | 69 | 78 | 4.213 | 4.213 | 4.213 |
| silicon | 20 | 75 | 5.418 | 5.418 | 5.418 |
| $Mg_2Si$ | 8 | 195 | 6.355 | 6.355 | 6.355 |
| forsterite | 1.9 | 102 | 4.743 | 10.222 | 5.993 |
| aluminum | 1.6 | 45 | 4.052 | 4.052 | 4.052 |

The above $Al_2O_3$ doped preparative examples indicate that the addition of $Al_2O_3$ to soot forms an SPS Cermet structure. Although not bound by theory, it is believed that when metal oxides ($M_xO_y$), that have a substantially different $\Delta G$ from Si in the Ellingham diagram (either positive or negative), are mixed with soot the reaction and subsequent processing produces a porous cermet.

Conformal Coatings

The aforementioned U.S. Ser. No. 62/084,084 mentions an anode material for lithium ion battery having any of described forms of carbon (e.g., graphene nanoplatelets, graphene sheets, graphite, hard C, soft C, C nanotubes/nanowires) is thermally annealed to porous Si, yielding a more stable porous silicon-carbon composite, resulting in: mitigation of the solid electrolyte interface (SET, problematic on exposed Si surfaces), an increase in first Coulombic efficiency and cycling performance, and improved (i.e., reduced) volume expansion.

The SPS or an alloy SPS, once formed, may be processed to remove certain by-products, e.g., various magnesium containing components, such as $Mg_2Si$, and then used in a second step, where a coating layer can be incorporated on the porous silicon powder product. An alloy SPS includes silicon and another element or mixture of elements. Alloys can include, for example, titanium, tungsten, silver, cobalt, and like elements, or mixtures thereof.

Coating of the SPS can be accomplished by any known process to form an organic or inorganic coating on the SPS.

In embodiments, the coating layer can be formed by chemical bonding. For example, polymers, such as polyaniline (PANT), PEG, PEO, epoxies, silicones, siloxanes, silanes, and like polymers, or mixtures thereof, can be bonded by reaction with external or surface —OH groups on the residual surface silica. Alternatively, polymerizable monomers in solution can be combined with the suspended SPS and polymerized in situ, and allowed to coat the SPS (see Example 9, below). These external polymer coatings can be composite coatings which contain strengthening agent additives, such as graphene or carbon nanotubes. Moreover the polymer additive agents can also be conductive which can help maintain electrode contact during long cycling life. Additionally, the additives can be, for example, conductive only and not strengthening such as silver nanorods. If desired a silane can be used as an adhesion layer to improve adhesion of the organic layer to the SPS.

In embodiments, the coating layer can be, for example, a carbon coating. In embodiments, the carbon coating can be formed by a carbonization process. Carbonization can involve taking a carbon-containing precursor and coating the SPS with the precursor, and then thermally treating the combined material at an elevated temperature and for a time sufficient to produce a carbon coating. In embodiments, the thermal treatment step can comprise, for example, heating to from 400 to 1000° C., 400 to 800° C., 400 to 600° C., 400 to 500° C., 500 to 1000° C., 500 to 800° C., 500 to 600° C., 600 to 1000° C., 600 to 800° C., or 800 to 1000° C., including intermediate values and ranges. In embodiments, the reaction can be accomplished under an inert atmosphere (e.g., argon, nitrogen, etc.). The reaction time can be, for example, from 30 mins to about 12 hrs, from 1 to 8 hrs, or from 3 to 6 hrs, including intermediate values and ranges.

Alternatively, the carbon or other coating can be formed by a known thin film or another deposition technique, such as spin coating, plating, chemical solution deposition, chemical vapor deposition, atomic layer deposition, thermal evaporation, sputtering, pulsed laser deposition, electrospray, and like methods, or combinations thereof. For example, chemical vapor deposition (CVD) can form highly pure materials and can be used to coat carbon or inorganic materials on the disclosed stabilized porous (SP) compositions.

Other processes that may be used to form the coating layer include, for example, electrochemical processes, such as electrochemical deposition, electro-less deposition, sol gel coating, and like methods.

The processes for forming the coating layer can be accomplished, for example, singularly or in multiple iterations to create multiple layers of the same or different coating material. Multiple or iterative processes can also be used to form multiple layers of the same or different coating material. The ability of the processes to be used in combination and the order of their use without adversely affecting the resulting coating layer is apparent to one skilled in the art.

Once the coating layer is formed, the coated composite can be purified or combined with other components and incorporated into devices, such as lithium anodes.

Example 9

Method to Conformally Carbon Coat SPS with a Sugar Based Carbon Precursor Solution In formulations where graphene is desired as a component in the coated SPS, composite graphene oxide can be used as the dopant to improve solubility. A base sugar coating formulation can be prepared, for example, by dissolving 7 g of glucose and 14 g of sucrose in 70 g of water. Then 0.76 mL of concentrated sulfuric acid (96.4% (w/w) assay=18.1 M) was carefully added to the sugar solution to make a final solution of 0.16 M. A suspension of graphene oxide in water was added to the sugar and acid solution. The amount of graphene oxide can be varied as necessary. The graphene oxide can provide added strength and conductivity and the amount can be varied to provide a suitable external coating for a batch of SPS. In this example, 2 mL of a 0.2 g/mL graphene oxide suspension was added to the 70.76 mL of sugar and acid solution to form a 5 mg/mL coating slurry.

In another variation of carbon coating, highly conductive carbon nanotubes can be added to the graphene oxide as a secondary carbon additive. In this instance about 1.7 mg/mL of multiwalled carbon nanotubes were added to the graphene oxide and sugar formulation. SPS powder (approximately 7 g) was combined with 30 mL of the sugar slurry. The solution was sonicated for 1 hr, centrifuged for 30 mins at 5000 to 9000 rpm, and the SPS-sugar mix pellet was separated from the supernatant by decanting and discarding the supernatant. If desired, this procedure can be reiterated for achieving multiple coating prior to final carbonization. Once the coating was completed, the pellet was transferred to a vacuum oven and dried at 80° C. for 4 hrs or more. The pellet was then transferred to a graphite or vitreous carbon crucible and thermally treated for carbonization by heating the closed mixture in an oven under argon atmosphere at 800 to 900° C. for about 5 hrs. The carbonized product can be pulverized or milled to a desired particle size.

Example 10

Method to Conformally Carbon Coat SPS with a Polyacrylonitrile (PAN) Based Carbon Precursor Solution Polyacrylonitrile (Sigma Aldrich 181315-100G, avg. MW 150,000 Da) in DMF was used as a precursor solution. In the instance where graphene was selected, the DMF solvent can be used if the graphene is suspended in the solvent prior to dissolving the polymer. 7 g of the SPS particles are combined with 30 mL of 2% PAN (w/w) in DMF. The PAN solution can be doped with an amount of graphene.

Graphene can be easily introduced into DMF by exfoliation, by for example: 1 mg of graphite is added to a 30 mL of DMF and sonicated for 6 hrs. The graphene in DMF is obtained by centrifugation. Typically graphene will not pellet out of DMF at a speed of 5,000 rpm and so using this speed to separate the non-graphene from the larger flakes of graphene is acceptable. The supernatant contains the graphene in DMF. Graphene disperses well into organic solvents such as NMP and DMF but not in water. When an aqueous sugar based precursor solution is selected, graphene oxide is used instead of graphene because it is water soluble while graphene is not.

The SPS combined with the 2% PAN solution is sonicated for 30 minutes. Then the solution is centrifuged at 5000 rpm for 30 minutes. The supernatant is discarded and the PAN/SPS pellets are dried in a vacuum oven at 80° C. for 5 hrs. The dry powder is then transferred to a graphite crucible and thermally carbonized at 800° C. for 5 hrs in an argon atmosphere oven.

Example 11

Method to Conformally Coat SPS with an Inorganic Oxide Film Using a Sol Gel Solution The inorganic oxide film is made using a precursor solution that has an organic solvent base. Sol gels can use a water:alcohol:catalyst (acid or base) solvent system or they can use a pure organic solvent system. An example of a pure organic system is dimethylformamide (DMF) or N-methylpyrrolidone (NMP). In the instance where graphene is selected the DMF or NMP sol gel solvent system is ideal because graphene is easily suspended into DMF or NMP. The DMF-sol gel system is able to dissolve many metal salts, metal halide salts, organometallic salts, and many salts in general. Alternatively, the ability to combine the polar aprotic solvent systems with alcohol solvents exists and can also be considered as viable sol gel coating methods. Moreover sol gel systems having blends of alcohol and polar aprotic solvents can be used. The sol gel processes described here provide a general technique for yielding a conformal oxide coating. Stated alternatively, nearly any oxide can be conformally coated onto the SPS particles. Conductive oxides such as aluminum zinc oxide or tungsten oxide can be made as conformal coatings over and within the pores of the SPS particles. Non-conducting oxides can also be made as conformal coatings over and within the pores of the SPS particles. Examples include zirconia, alumina, titania, spinel, silica, and like materials. The sol gel coating can include structural stabilizing agents such as graphene or carbon nanotubes.

The following procedure produces a coating that is less than about 50 nm thick on an SPS powder. 7 g of the SPS particles are combined with 30 mL of a 0.1 to 1 M solution of aluminum chloride hexahydrate $AlCl_3.6H_2O$ in DMF. The resulting solution is sonicated for at least 30 mins. Again for preparing graphene and aluminum oxide ($Al_2O_3$) coatings the DMF sol-gel solution can be doped with an amount of graphene. The SPS is combined with the 1 M aluminum chloride sol-gel solution and then centrifuged at 5000 rpm for 30 mins. The aluminum chloride DMF supernatant is discarded and the aluminum chloride sol-gel SPS pellet is then dried in a vacuum oven at 80° C. for about five hrs. The dry powder is then transferred to an oven and further thermally treated by heating at about 500° C. in an argon atmosphere. The resulting $Al_2O_3$ coated SPS particles can optionally be milled into coated particles suitable for preparing an electrode coating slurry.

As an alternative, to prepare a nitride coating using the same sol gel technique, a primary amine such as urea is added to the DMF metal salt sol-gel. The material is then thermally treated in a nitriding atmosphere, like 10% ammonia gas, in nitrogen with a temperature of greater than 700° C.

Example 12 (Prophetic)

Method to Conformally Coat SPS with an Inorganic Oxide Film Using Atomic Layer Deposition Alumina can be coated onto the SPS via atomic layer deposition (ALD) to yield a thinly coated alumina silicon anode for LIB. In some embodiments, it is possible to use less than 10 cycles of ALD to locate a very thin (less than 1 nm thick) $Al_2O_3$ film onto the SPS.

Example 13 (Prophetic)

Method to Conformally Coat SPS with a Conducting Metal Film Using Electroless Coating Electroless coating of SPS can be accomplished with metals, such as silver or gold. The electroless coating can be accomplished over a carbonized SPS particle as a way of obtaining a very stable particle with a conductive outer coat. For example, 0.15 mmol $AgNO_3$ is dissolved in 50 mL distilled water in a beaker. Aqueous ammonia (25 wt % in $H_2O$) is added drop-wise to an $AgNO_3$ solution, until a clear colorless solution is obtained. The pH of the solution is maintained at 9.3. Subsequently, the SPS silicon particle composition (0.2 g) is added into the ammonia/$AgNO_3$ solution with stirring for 30 mins. Formaldehyde (2%, 0.12 mL) is then added dropwise to the solution, followed by stirring for 2 hr at room temperature. Finally, the sample is washed with distilled water and desiccated in a vacuum oven at 60° C. for 12 h. The weight ratio of Ag and Si powder is selected to achieve a weight ratio of about 8:92 such that external coating of silver is sufficiently thin to permit lithium ion passage and rendering the SPS active.

Example 14 (Prophetic)

Method to Conformally Coat SPS with a Conducting Polyaniline (cPANI)

About 7 g of SPS are added to a solution containing 200 mg aniline and 10 mL sulfuric acid (1 M). Then 0.5 g of ammonium persulphate (APS) in 30 mL water is added drop wise with vigorous stirring under nitrogen flow at 0° C. After stirring at 0° C. for 24 hrs, the polyaniline coated SPS particles are collected by centrifugation and dried under vacuum for 16 hrs. The resulting particles comprise a porous silicon core having a conductive polymeric coating.

$^{29}$Si MAS NMR Analysis

FIG. 14 shows exemplary $^{29}$Si MAS NMR spectra of five different batches of the disclosed stable porous silicon (SPS) compositions. Notable features include: little or no variability in the main Si peak (1400); more variability in silica/silicate peak region (1410) having from 15 and 30 atom % Si; most batches show a very weak signal from crystalline forsterite (−61 ppm) in less than about 1 atom % Si. The $^{29}$Si full width half maximum peak of the Si (−81 ppm) (1400) is less than 1 ppm for the disclosed final SPS product from the disclosed process. The narrower, more symmetrical Si peak (1400) NMR results suggest that the disclosed process produces a purer silicon that is: more ordered, contains less silica, and contains less residual amorphous magnesium silicate compared to prior art processes, and the disclosed process provides higher yields of porous silicon compared to prior art processes.

Figure 15:
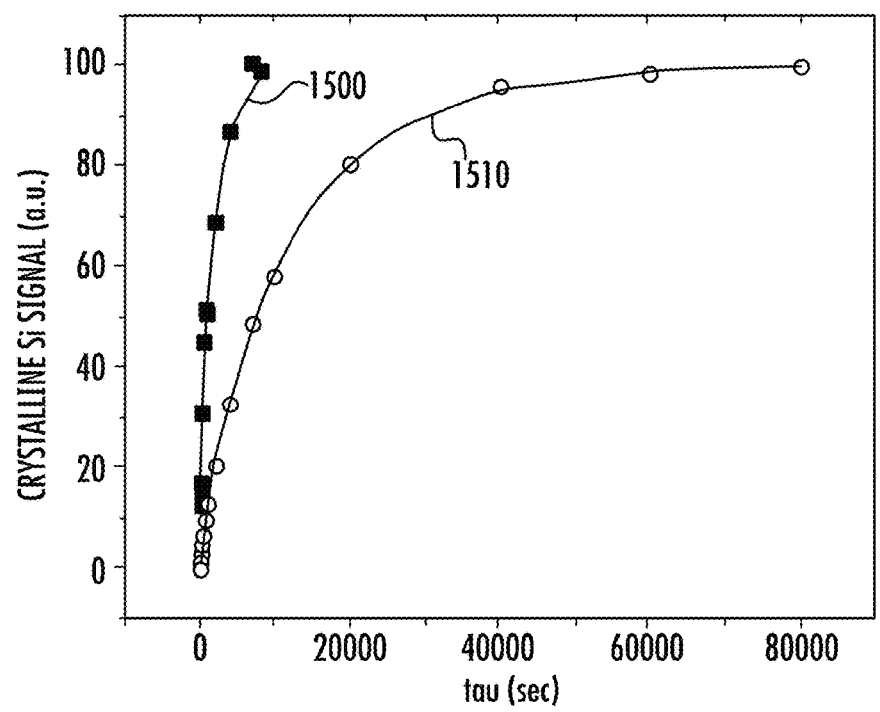
FIG. 15 show exemplary plots representing spin-lattice relaxation measurements that were used to determine the $^{29}Si$ T1 for the disclosed stable porous silicon compositions of the present method.

FIG. 15 show exemplary plots representing spin-lattice relaxation measurements that were used to determine the $^{29}$Si T1 for the disclosed stable porous silicon (SPS) of the present method compared to the stable porous silicon of a prior method (i.e., commonly owned and assigned U.S. Ser. No. 62/084,084). The T1 relaxation time (spin-lattice relaxation in seconds) is sensitive to the purity of the elemental Si in the SPS samples. The prior method produced Si material having a curve (1500)(squares; left) having a $^{29}$Si T1 from 2000 to 3000 seconds. The present method (i.e., compressed pellet and fired reactant mixture of Si source material (1510) (circles; right) has a $^{29}$Si T1 estimated to be about 12,000 seconds, which is about five to six times greater than the SPS prepared by the prior method. This represents an enormous increase in $^{29}$Si T1 relaxation time, reflecting higher purity in the elemental silicon, and is also consistent with a more ordered crystalline structure.

The $^{29}$Si MAS NMR spectra and relaxation time measurements collectively indicate substantial differences between SPS products of the prior method Si material and the present method Si material. Although not limited by theory, the present method is believed to yield superior porous elemental Si, from a stability, a chemical, and a spectroscopic perspective. The $T_1$ of the SPS from the presently disclosed method is similar to the $T_1$ of a high purity non-porous Si material from Sigma-Aldrich.

Figure 16:
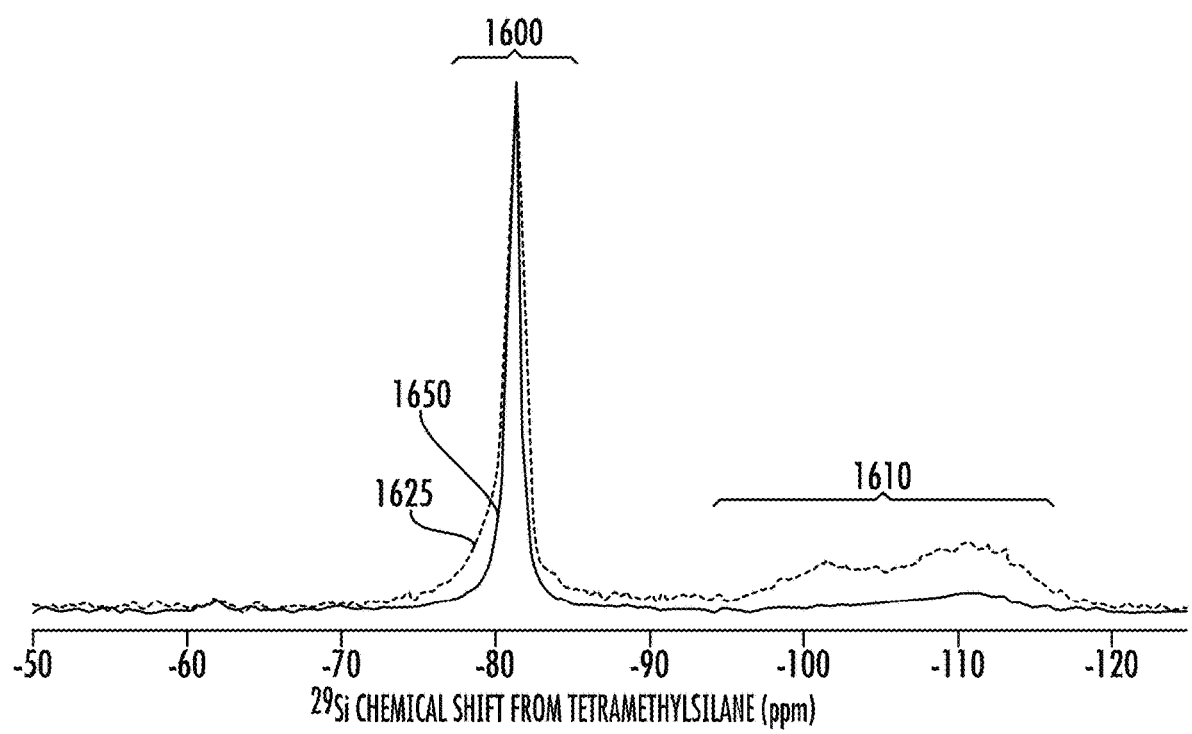
FIG. 16 show exemplary $^{29}Si$ MAS NMR spectra of a stable porous silicon composition of the present method compared to the stable porous silicon of a prior method.

FIG. 16 show exemplary $^{29}$Si MAS NMR spectra of disclosed stable porous silicon compositions of the present method (1650) (solid line) relative to a reference standard teteramethylsilane and compared to the stable porous silicon of the abovementioned prior method (1625) (dashed line). Significant differences include: the present method has $^{29}$Si spectra having a narrower, more symmetrical Si peak at −81 ppm (1600 region), which may suggest a more ordered Si, whereas the abovementioned prior method has a lower Si yield and the $^{29}$Si spectra indicate significantly more silica (1610 region) and amorphous magnesium silicate.

Silicon-29 ($^{29}$Si) solid-state magic angle spinning nuclear magnetic resonance (MAS NMR) spectra of the SPS samples, were generated from the same starting material (pure silica soot) but using the abovementioned prior process (U.S. Ser. No. 62/084,084, i.e., mixed powders that were merely poured or hand packed in a vessel then closed or sealed), and compressed pellets of the presently disclosed process. The elemental compositions of these two materials are very similar, comprised of mostly elemental Si (sharp peak around −80 ppm) and some residual silica and silicates (likely magnesium silicates), which have broader peaks between −100 and −110 ppm. However, the prior method and present method produce products having significant spectroscopic differences. The present method of making, for example, a porous silicon composition, which uses reactants that are formed into compressed pellets, produce a product that has less residual silica or silicates, such as on the order of 15 to 30 atom % silicon less, based on the $^{29}$Si NMR measurements, compared to the prior process, which prior process uses reactants that are not compressed into pellets prior to firing.

The disclosed porous silicon prepared in the present method yields a much higher quality silicon as evidenced by the more symmetric and much sharper Si peak at −80 ppm even with the residual silica or silicates present. The $^{29}$Si NMR linewidth is roughly inversely proportional to crystallinity, so more disorder leads to broader signals. The narrower $^{29}$Si peak for the SPS material of the presently disclosed preparative method is distinct from any samples measured for the abovementioned prior method, and the symmetry of the $^{29}$Si peak (1650) also indicates a more uniform Si environment. Based on these differences, the presently disclosed preparative method provides a more crystalline (i.e., ordered) version of porous silicon.

Figure 17:
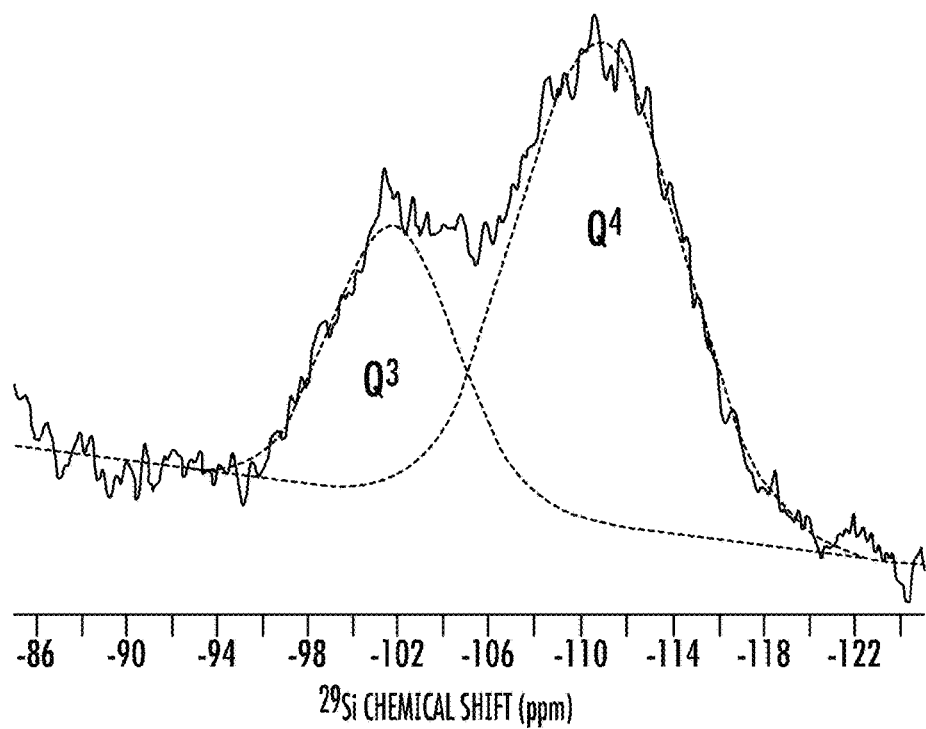
FIG. 17 show additional details of the $^{29}Si$ MAS NMR spectra of the silicate region of FIG. 16.

FIG. 17 shows additional details of the $^{29}$Si MAS NMR spectra of the FIG. 16 "silicates" region (1610), where the $Q^4$ peak region at −111 ppm is believed to be from silica, presumably due to unreacted raw material, and the $Q^3$ peak region at −102 ppm is believed to be from $Q^3$ silicate groups, consistent with an amorphous magnesium silicate phase.

FIGS. 18A and 18B show exemplary $^{29}$Si MAS NMR spectra of disclosed alloy stable porous silicon compositions. FIG. 18A shows an alloy SPS made with 20 wt % $TiO_2$ FIG. 18B shows an alloy SPS made with ultra low expansion (ULE™) silica soot. FIGS. 18A and B show the porous crystalline silicon peak (1800), a "silicates" region (1810), and a highly modified crystalline silicate like forsterite (1820).

FIG. 18C shows an XRD of an uncleaned ASPS composition made from titania doped silica soot.

FIG. 19 shows an overlay of exemplary $^{29}$Si MAS NMR spectra of two disclosed porous Si containing cermet compositions having either a $SnO_2$ or a NiO metal oxide. The $^{29}$Si spectra has peaks or regions corresponding to a porous crystalline Si (1900), a residual silicate region (1910), and an unknown silicon containing material (1940), respectively, for the $SnO_2$ cermet (1920)(dotted line) composition, and the NiO cermet (1930)(solid line) composition.

Amorphous silicon (a-Si) is spectroscopically very different than crystalline Si. a-Si has a much broader $^{29}$Si signal, and the $^{29}$Si peak position is centered at a different chemical shift. Based on literature data (see Shao, W.-L., et al., "NMR and Short Range Order in Amorphous Silicon," *J. of Non-Crystalline Solids*, 114 (1989) 232-234), it is estimated that any amorphous Si in the disclosed SPS materials is below the NMR detection limit. An estimate of amorphous Si in the disclosed SPS materials is less than 1 atom % in the total composition.

Figure 20:
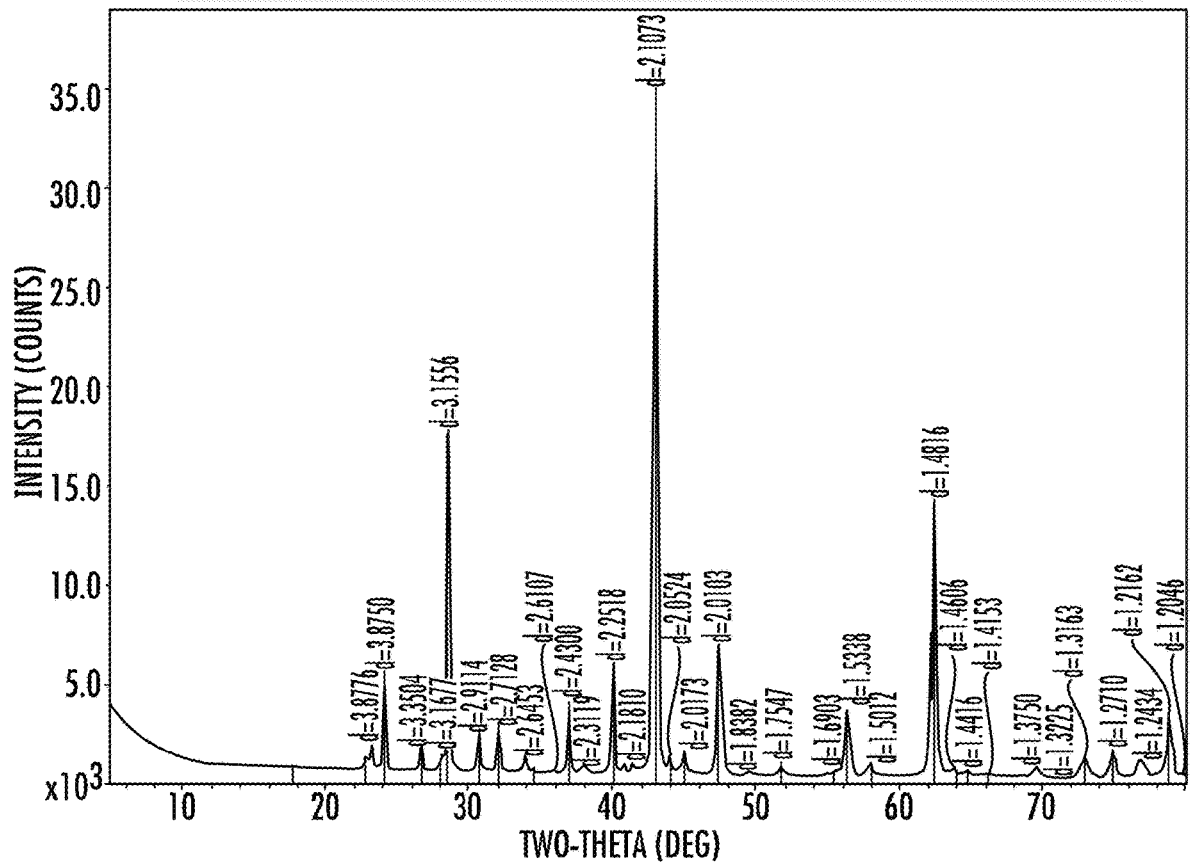
FIG. 20 shows an XRD of a stable porous cermet (SPCermet) prepared from a $SnO_2$ doped silica soot precursor that had been compressed and fired but was un-cleaned.

FIG. 20 shows an XRD of a stable porous cermet (SPCermet) prepared from a $SnO_2$ doped silica soot precursor that had been compressed but un-cleaned.

Figure 21:
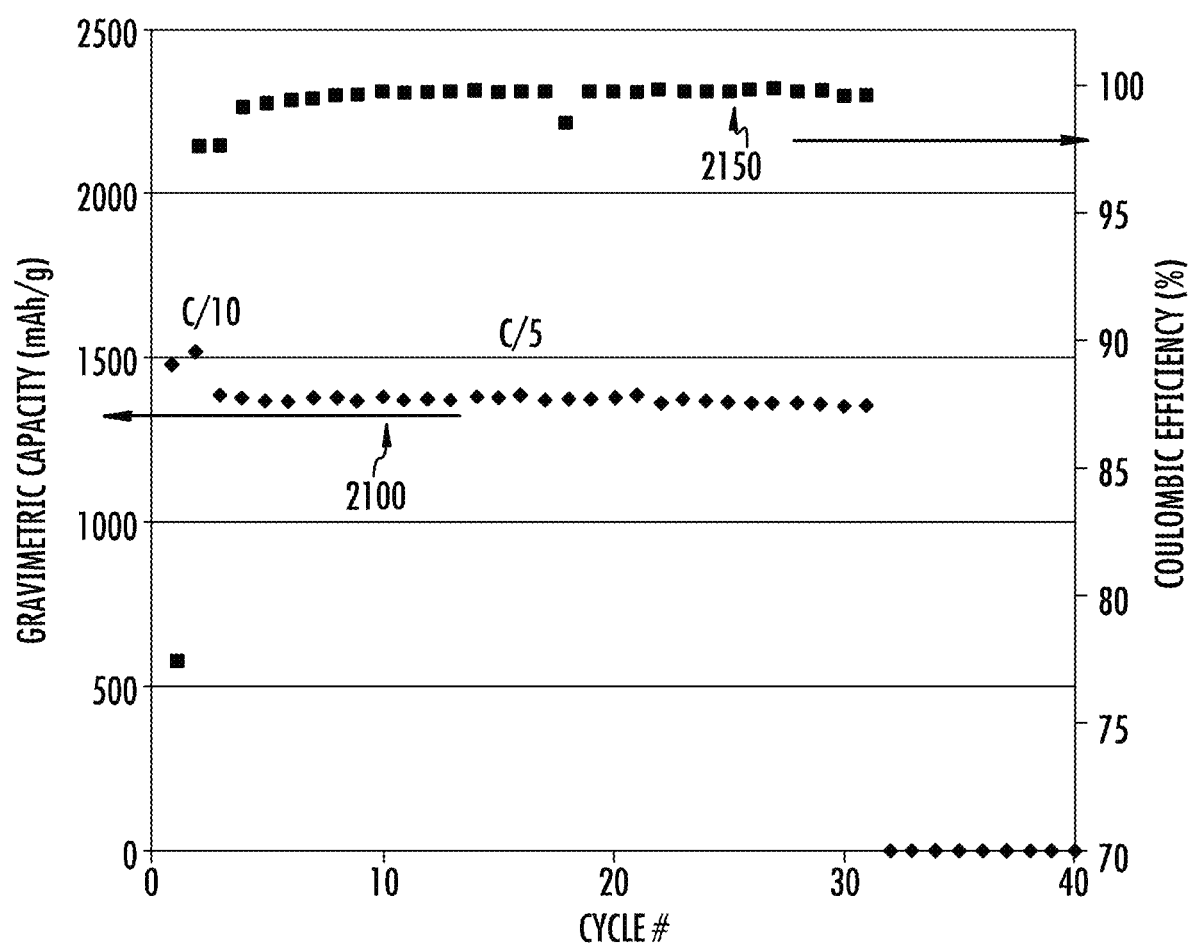
FIG. 21 shows electrochemical cycling data of the carbon coated final product of the $SnO_2$ doped stable porous cermet of FIG. 20.

FIG. 21 shows electrochemical cycling data of the cleaned final product of the $SnO_2$ doped stable porous cermet of FIG. 20 and Example 6, that had been conformally coated with sucrose and glucose. FIG. 21 shows the gravimetric capacity (i.e., delithiation specific capacity) (mAh/g) (2100) (diamonds) and a coulombic efficiency (%) (2150) (squares) over 40 and 30 cycles, respectively, for the $SnO_2$ doped stable porous cermet. Baseline data between 30 and 40 cycles indicate data not available but was being acquired. Additional electrochemical data (not shown) subsequently acquired for this conformally coated $SnO_2$ doped stable porous cermet demonstrated the respective trends extending to 410 cycles or more, and had a delithiation specific capacity of 865.8 mAh/g at a C/10 rate, and a coulombic efficiency of about 100% at 414 cycles.

Figure 22:
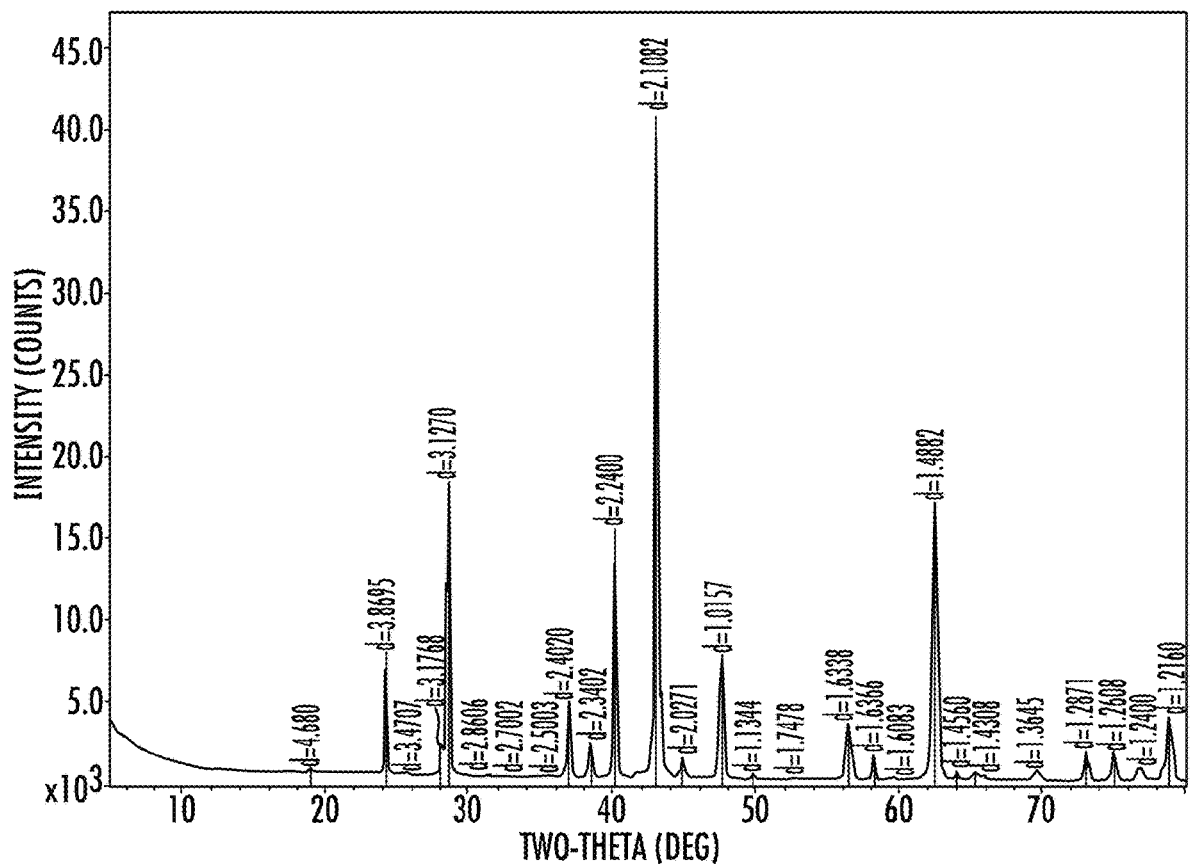
FIG. 22 shows an XRD of an alumina ($Al_2O_3$) doped stable porous cermet (SPCermet) prepared from a $Al_2O_3$ doped silica soot precursor that had been compressed (i.e., calendered), fired, but was uncleaned.

FIG. 22 shows an XRD of an $Al_2O_3$ doped stable porous cermet (SPCermet) prepared from a $Al_2O_3$ doped silica soot precursor that had been compressed (i.e., calendered), fired, but uncleaned.

Figure 23:
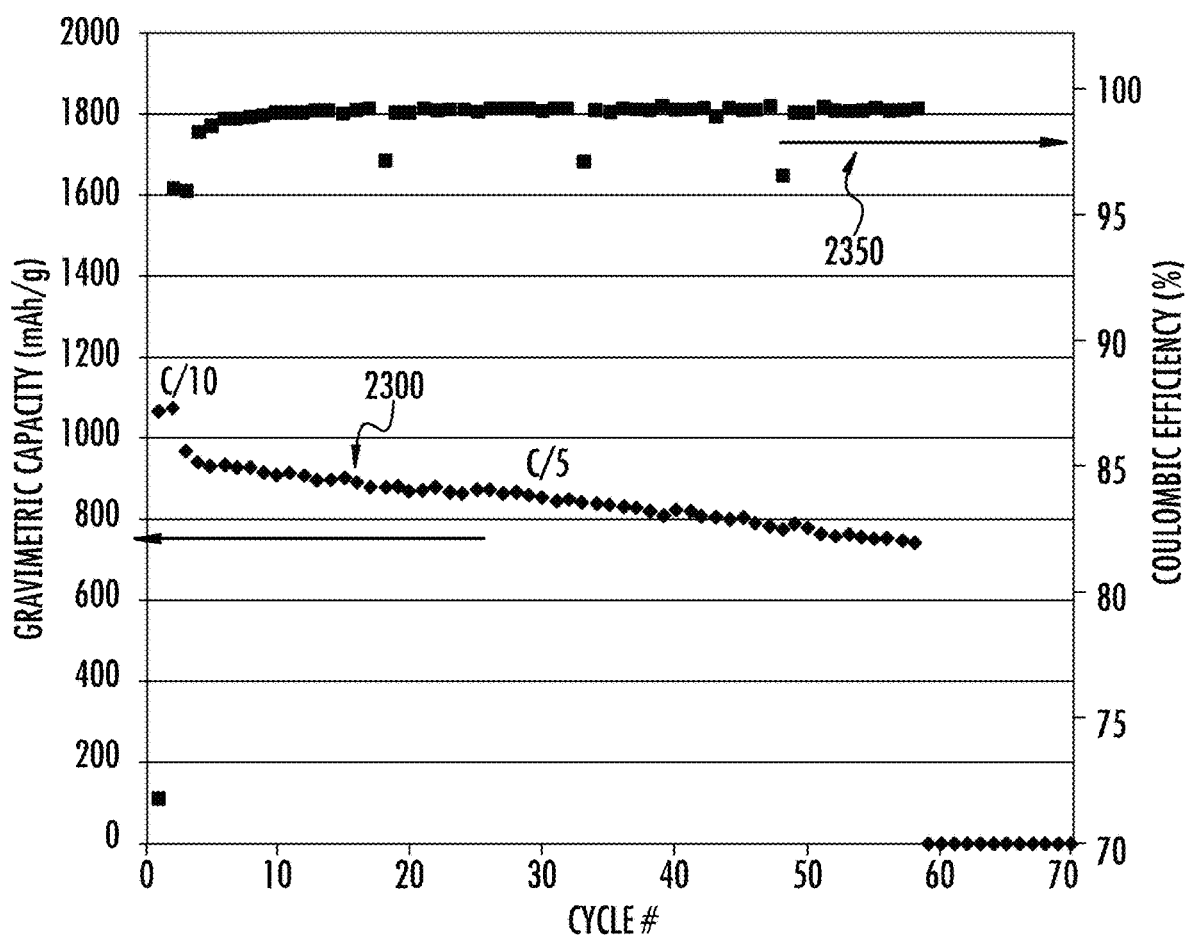
FIG. 23 shows electrochemical cycling data of the carbon coated final product of the NiO doped SPCermet.

FIG. 23 shows electrochemical cycling data of a cleaned final product of a NiO doped SPCermet of Example 7, that had been conformally coated with a mixture of sucrose, glucose, and carbon nanotubes (see also Example 9 including graphene oxide). FIG. 23 shows the gravimetric capacity (i.e., delithiation specific capacity) (mAh/g) (2300) (diamonds) and a coulombic efficiency (%) (2350) (squares) over 70 and 60 cycles, respectively, for the NiO doped stable porous cermet. Baseline data between 59 and 70 cycles indicate data not available but was being acquired. Additional electrochemical data (not shown) subsequently acquired for the NiO doped SPCermet demonstrated the respective trends extending to 75 cycles or more.

Figure 24:
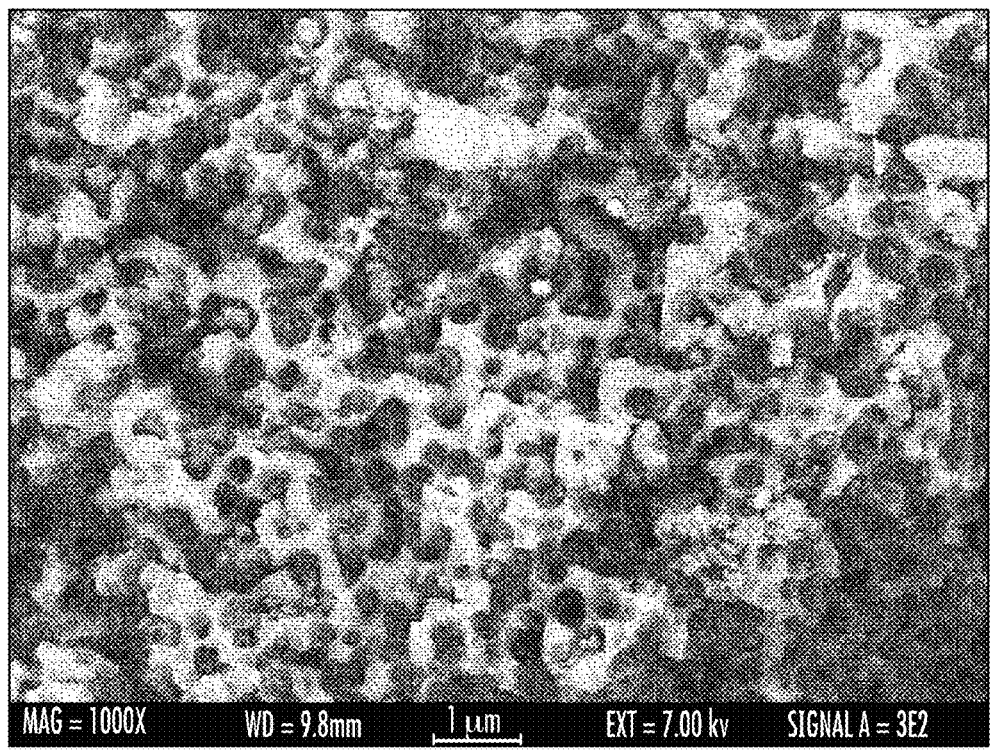
FIG. 24 shows an SEM image of final product tin oxide ($SnO_2$) doped SPCermet.

FIG. 24 shows an SEM image of final product tin oxide ($SnO_2$) doped SPCermet of FIG. 20 and Example 6.

Figure 25:
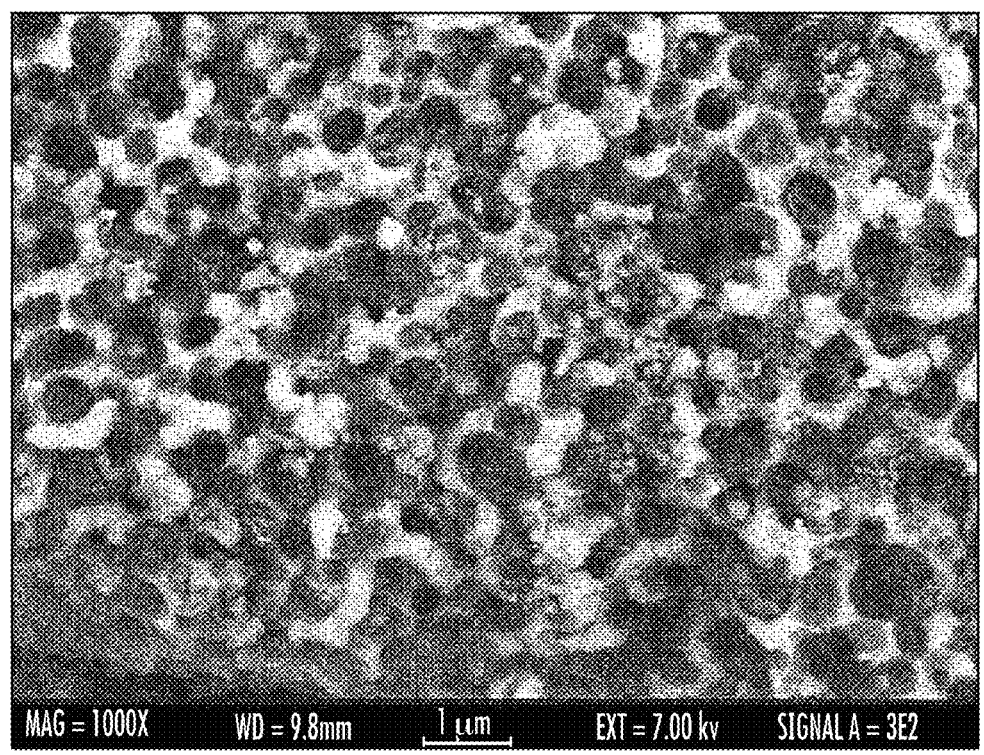
FIG. 25 shows an SEM image of final product nickel oxide (NiO) doped SPCermet.

FIG. 25 shows an SEM image of final product nickel oxide (NiO) doped SPCermet of FIG. 23 and of Example 7.

Figure 27:
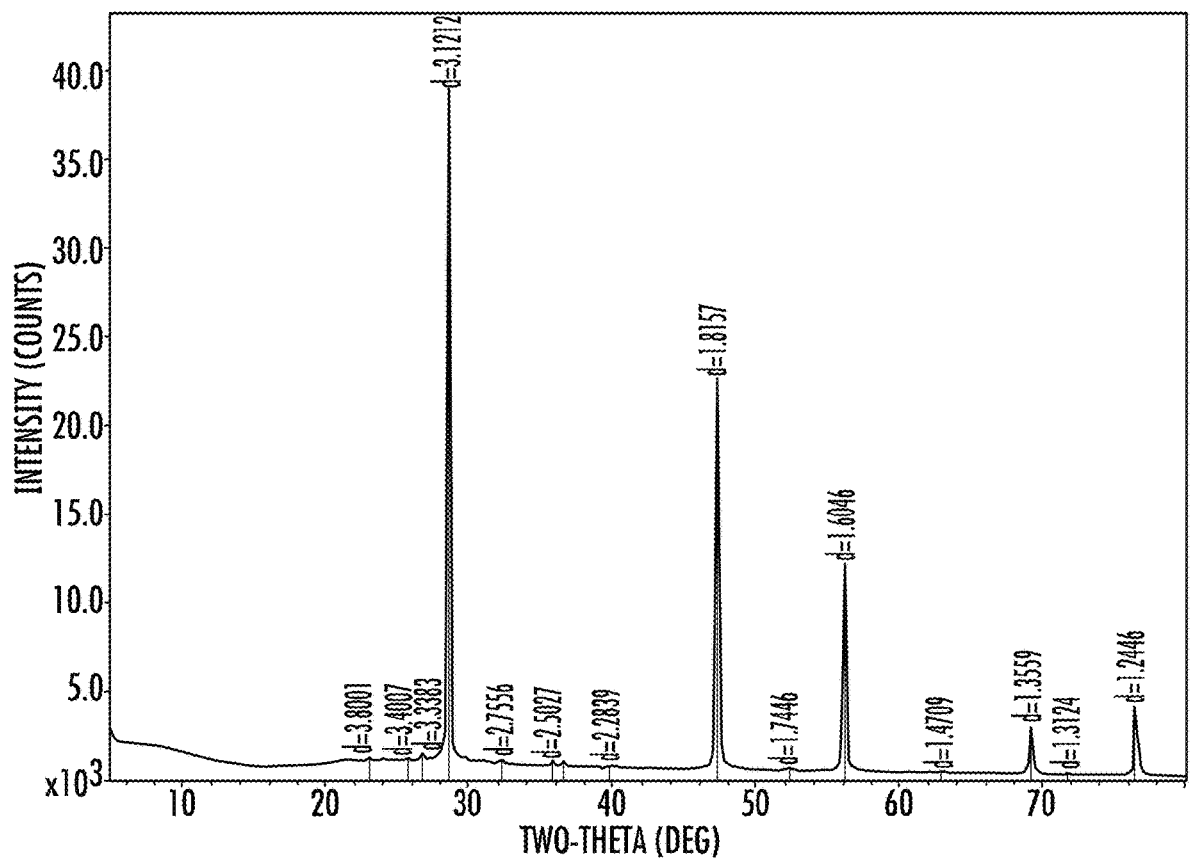
FIG. 27 shows an XRD of a cleaned final SPS product obtained from the intermediate product shown in FIG. 26.

FIG. 26 shows an XRD of an un-cleaned intermediate product of an SPS method of making where the intermediate was made from a pure silica soot starting material (Si source or Si precursor) that had been compressed and fired but unetched (i.e., the un-cleaned product of a pure silica soot starting material/precursor/Si source, that had been compressed and fired), which demonstrates that the intermediate product contains periclase (MgO). An SPS made from soot shows the presence of some quartz in the intermediate products FIG. 27 shows an XRD of a cleaned final SPS product obtained from the intermediate product shown in FIG. 26, which demonstrates the efficient removal of the periclase (MgO) from the intermediate product by cleaning, and shows the presence of some residual forsterite and quartz.

Figure 28:
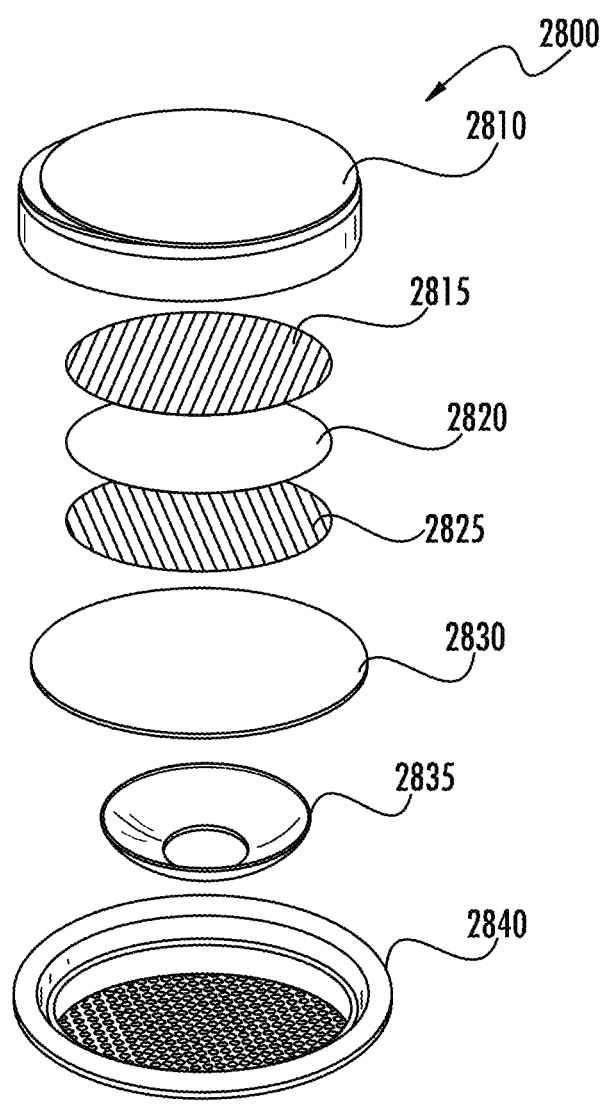
FIG. 28 shows an exploded assembly of an exemplary energy storage device of the disclosure.

FIG. 28 shows an exploded assembly of an exemplary energy storage device (2800) of the disclosure including: an anode cap (2810), an anode (2815), a separator (2820), a cathode (2825), a stainless steel spacer (2830), a spring (2835), and can base (2840).

FIG. 29 shows electrochemical characterization (i.e., cycling) of a typical delithiation curve for a SPS material in a half cell including the gravimetric capacity (i.e., delithiation specific capacity) (mAh/g) (3010) (diamonds), the lithiation specific capacity (mAh/g) (3020) ("*"), and the coulombic efficiency (%) (3000) (squares), over 35 cycles.

Figure 30:
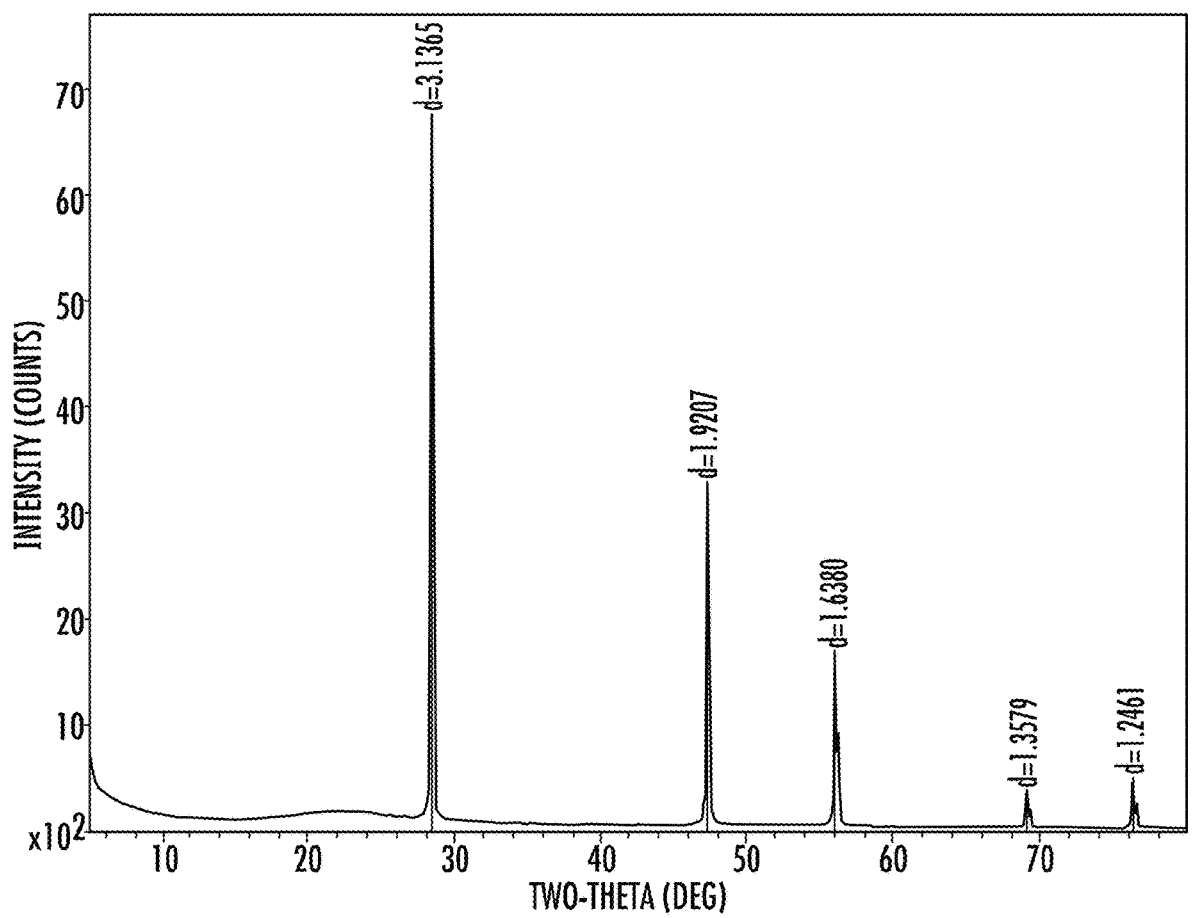
FIG. 30 shows a comparative XRD of a 5 micron milled, non-porous, pure silicon from Sigma-Aldrich having an equivalent particle size to the disclosed Eiger milled porous silicon (SPS).

FIG. 30 shows a comparative XRD of a 5 micron milled non-porous pure silicon from Sigma-Aldrich having an equivalent particle size to the disclosed Eiger milled porous silicon (SPS).

Figure 31:
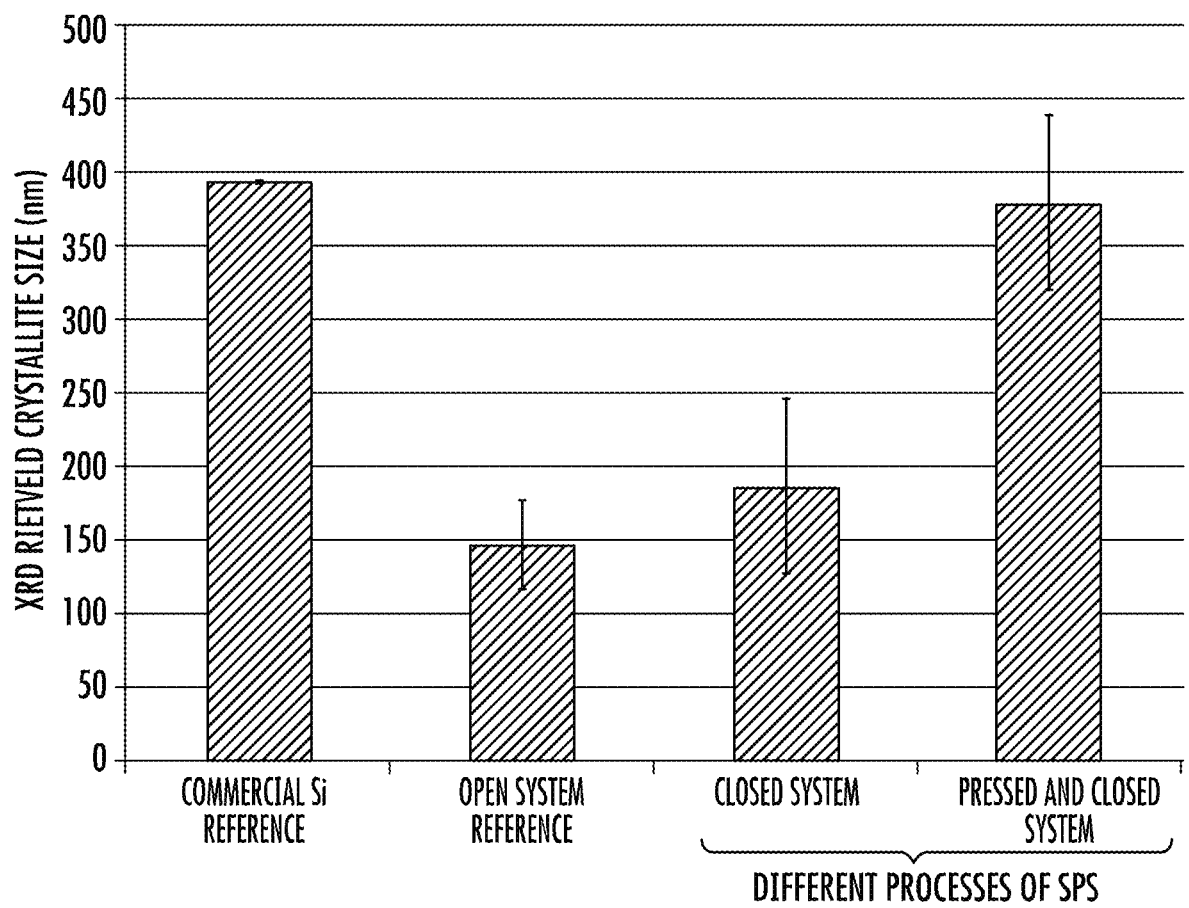
FIG. 31 shows a crystallite size (nm) comparison of Sigma-Aldrich Si (a non-porous Si reference standard), a prior method material ("open system"), and materials prepared by variations of the disclosed method ("closed system"; and "pressed and closed system").

FIG. 31 shows a crystallite size (nm) comparison of Sigma-Aldrich Si (a non-porous Si reference standard) ("Commercial Si"), a prior method reference material ("Open System"), and materials prepared by variations of the disclosed method ("Closed System"; and "Pressed and Closed System"). The "Pressed and Closed System" produced a SPS final product having a crystallite size comparable to the non-porous Si reference standard. "Commercial Si" refers to the non-porous Si reference standard. "Open system" refers to a prior method disclosed in the above mentioned U.S. Ser. No. 13/765,800. "Closed system" refers to the reactants being hand packed and then sealed in a vessel prior to firing. "Pressed and Closed System" refers to the reactants being compressed to a pellet then sealed in a vessel prior to firing as presently disclosed.

Figure 32A:
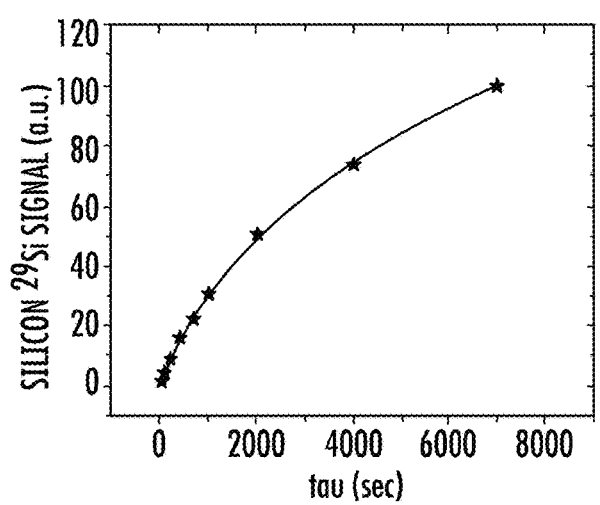
FIGS. 32A and 32B, respectively, show a $^{29}Si$ $T_1$ comparison, and a $^{29}Si$ NMR for the commercial non-porous Si powder and the SPS product of the disclosed process.
Figure 32B:
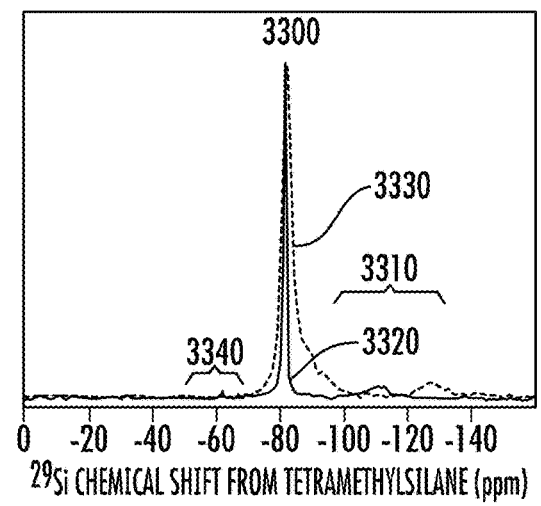

FIGS. 32A and 32B, respectively, show the $^{29}$Si T$_1$ for the commercial Si powder (i.e., high purity non-porous Si from Aldrich) that is relatively lengthy (ca. 2330 seconds) and consistent with high purity Si (32A); and a comparison of the $^{29}$Si NMR for the commercial Si powder (3330) and the SPS (3320) of the disclosed process.

FIG. 32B shows the commercial Si powder (3330) (high purity non-porous Si from Aldrich) having an FWHM of crystalline Si peak (3300) at −81 ppm (crystalline Si; dashed line) that is approximately 3.6 ppm, in contrast to the less than 1 ppm measured for the disclosed SPS material (3320) (solid line). The silicate signal region (3310) is significantly shifted for the respective samples. The unidentified signal region (3340) remained negligible for the respective samples.

The disclosure has been described with reference to various specific embodiments and techniques. However, it should be understood that many variations and modifications are possible while remaining within the scope of the disclosure.

What is claimed is:

1. A method of making a porous silicon composition comprising a porous particle, the method comprising:
   compressing a mixture to a compressed form having a thickness of from 5 to 20 mm having a Mg:silica molar percent ratio from 1:1.5 to 1:1.99,
      wherein the mixture comprises magnesium powder having a particle size of from 10 nm to 100 microns, and a silica source powder having a particle size of from 10 nm to 100 microns;
   heating the compressed form at from 600 to 900° C. to form a fired form;
   milling the fired form to an intermediate product powder;
   leaching the intermediate product powder with an acid solution to produce a leached product; and
   washing the leached product to form the porous particle.

2. The method of claim 1 further comprising coating the porous silicon composition with at least one of a conductive material, a strength enhancing material, or a combination thereof, to form a coated composition.

3. An energy storage device comprising an electrode, wherein the electrode comprises:
   a conductive substrate coated with a mixture comprising the coated composition of claim 2, a conductive carbon, and a binder.

4. The device of claim 3 wherein the device has:
   an electrochemical gravimetric capacity of 1000 to 3400 mAh/g;
   an initial coulombic efficiency of from 38 to 96%;
   a second coulombic efficiency of from 60 to 97%; or
   a combination thereof.

5. The method of claim 1, wherein the heating has a heating rate less than about 10° C./min.

6. The method of claim 1, wherein the porous silicon composition comprises:
   a crystalline phase in from 50 to 99 atom % Si determined by NMR, comprising crystalline Si in from 95 to 100 wt % determined by XRD, crystalline forsterite in from 0.1 to 5 wt % determined by XRD, and crystalline quartz in from 0.1 to 1 wt % determined by XRD;
   an amorphous phase comprising at least one of amorphous silica, amorphous silicate, or a mixture thereof, in from 1 to 50 atom % Si determined by NMR, based on the total amount of Si;
   a total Si content in from 20 to 99 wt % determined by ICP;
   a total elemental oxygen content of from 0.001 to 1 wt % determined by difference, based on a 100 wt % total; and
   a form factor comprising the porous particle.

7. The method of claim 6, wherein the porous particle has:
   a porous particulate powder form having a d50 particle size of from 3 to 14 microns;
   a percent porosity of from 60 to 80%;
   an open pore structure having a pore size diameter from 1 to 1,000 nm, where the total pore volume is greater than 70% for pore diameters greater than 10 nm, and the total pore volume is greater than 40% for pore diameters greater than 40 nm to 1000 nm; and/or
   a BET surface area of from 20 to 75 m$^2$/g; or
   a combination thereof.

8. The method of claim 6, wherein the porous silicon composition has a $^{29}$Si MAS NMR spectrum having a major single peak at a chemical shift of −81 ppm with a FWHM of less than 1 ppm and a diffuse minor signal region at from −95 to −120 ppm.

9. A method of making a porous alloy composition comprising a porous particle, the method comprising:
   compressing a mixture to form a compressed form having a thickness of from 5 to 20 mm having a Mg:silica molar percent ratio from 1:1.5 to 1:1.99,
      wherein the mixture comprises a magnesium powder having a particle size of from 10 nm to 100 microns, and at least one of a source of metal silicide, a silica source powder, a silicate glass, a mixture of a silica source powder and a metal oxide, or a mixture thereof, having a particle size of from 10 nm to 100 microns;
   heating the compressed form at from 600 to 900° C. to form a compressed and heated form;
   milling the compressed and heated form to form an intermediate product powder;
   leaching the intermediate product powder with an acid solution to form a leached product; and
   washing the leached product to form the porous particle.

10. The method of claim 9 further comprising coating the porous alloy composition with at least one of a conductive material, a strength enhancing material, or a combination thereof, to form a coated porous alloy composition.

11. An energy storage device comprising an electrode, wherein the electrode comprises:
   a conductive substrate coated with a mixture of the coated porous alloy composition of claim 10, a conductive carbon, and a binder.

12. The device of claim 11 wherein the device has:
   an electrochemical gravimetric capacity of from 1000 to 2000 mAh/g;
   an initial coulombic efficiency of from 38 to 96%;
   a second coulombic efficiency of from 60 to 94%; or
   a combination thereof.

13. The method of claim 9, wherein the at least one of a source of metal silicide, a silica source powder, a silicate glass, a mixture of a silica source powder and a metal oxide, or a mixture thereof, is selected from a magnesium silicate mineral, a silicate mineral, a titanium oxide, or a mixture thereof.

14. The method of claim 9, wherein the heating has a heating rate less than about 10° C./min.

15. The method of claim 9, wherein the porous alloy composition comprises:
a crystalline phase in from 70 to 90 atom % Si determined by NMR, comprising crystalline Si in from 20 to 80 wt % determined by XRD, crystalline forsterite in from 0.1 to 5 wt % determined by XRD, crystalline quartz in from 0.1 to 1 wt % determined by XRD, and at least one crystalline metal silicide in from 1 to 80 wt % determined by XRD;
an amorphous phase in from 10 to 30 atom % Si determined by NMR comprising at least one of amorphous silica, amorphous silicate, or a mixture thereof;
a total Si content in from 20 to 99 wt % determined by ICP;
a total elemental oxygen content of from 0.001 to 1 wt % determined by difference, based on a 100 wt % total; and
a form factor comprising the porous particle.

16. The method of claim 15, wherein the porous particle has:
a percent porosity (% P) in from 60 to 80 vol %;
a BET surface area of from 20 to 75 m$^2$/g;
an open pore structure having a pore size diameter from 1 to 1,000 nm, wherein the porous particle has a total pore volume greater than 85% for pore diameters greater than 10 nm and a total pore volume greater than 50% for pore diameters greater than 40 nm to 1,000 nm; or
a combination thereof.

17. The method of claim 15, wherein the porous alloy composition has a $^{29}$Si MAS NMR spectrum having a major single peak at a chemical shift of −81 ppm, a first diffuse minor signal region from at from −95 to −135 ppm or at from −95 to −120 ppm, and a second diffuse minor signal region at from −50 to −70 ppm.

18. A method of making a cermet composition comprising a porous silicon composition, wherein the porous silicon composition comprises a porous particle, the method comprising:
compressing a mixture to a compressed form having a thickness of from 5 to 20 mm and having a Mg:silica molar percent ratio from 1:1.5 to 1:1.99,
wherein the mixture comprises magnesium powder having a particle size of from 10 nm to 100 microns, a metal oxide having a particle size of from 10 nm to 100 microns, and a silica source powder having a particle size of from 10 nm to 100 microns;
heating the compressed form at from 600 to 900° C. to form a heated form;
milling the heated form to form an intermediate product powder;
leaching the intermediate product powder with an acid solution to form a leached product; and
washing the leached product to form a porous particle.

19. The method of claim 18 further comprising coating the porous silicon containing cermet composition with at least one of a conductive material, a strength enhancing material, or a combination thereof, to form a coated cermet composition.

20. An energy storage device comprising an electrode, wherein the electrode comprises:
a conductive substrate coated with a mixture of the coated cermet composition of claim 19, a conductive carbon, and a binder.

21. The device of claim 20 wherein the device has:
an electrochemical gravimetric capacity of from 1000 to 2000 mAh/g;
an initial coulombic efficiency of from 38 to 96%;
a second coulombic efficiency of from 60 to 96%, or
a combination thereof.

22. The method of claim 18 wherein the metal oxide is selected from a transition metal, a metal, an alkaline earth metal, a metalloid, or a mixture thereof, and the silica source powder is selected from silica soot, quartz, fumed silica, or mixtures thereof.

23. The method of claim 18, wherein the heating has a heating rate less than about 10° C./min.

24. The method of claim 18, wherein the porous silicon composition comprises:
a crystalline phase in from 70 to 90 atom % Si determined by NMR comprising crystalline Si in from 90 to 95 wt % by XRD, crystalline forsterite in from 0.1 to 5 wt % by XRD, crystalline quartz in from 0.1 to 1 wt % by XRD, and at least one crystalline ceramic component in from to 1 to 10 wt % by XRD;
an amorphous phase in from 10 to 30 atom % Si by NMR comprising at least one of amorphous silica, amorphous silicate, or a mixture thereof;
a total Si content in from 20 to 99 wt % by ICP;
a total elemental oxygen content of from 0.001 to 1 wt % by difference, based on a 100 wt % total; and
a form factor comprising the porous particle.

25. The method of claim 24, wherein the porous particle has:
a percent porosity in from 60 to 80%;
an open pore structure having a pore size diameter from 1 to 1,000 nm, having a total pore volume greater than 85% for pore diameters greater than 10 nm, and having a total pore volume greater than 50% for pore diameters greater than 40 nm to 1,000 nm;
a BET surface area of from 20 to 75 m$^2$/g; or
a combination thereof.

26. The method of claim 24, wherein the porous silicon composition has a $^{29}$Si MAS NMR spectrum having a major single peak at a chemical shift of −81 ppm, a first diffuse minor signal region from at from −95 to −130 ppm, and a second diffuse minor signal region at a −35 to −55 ppm.

* * * * *

UNITED STATES PATENT AND TRADEMARK OFFICE
CERTIFICATE OF CORRECTION

PATENT NO. : 10,629,900 B2  
APPLICATION NO. : 15/350343  
DATED : April 21, 2020  
INVENTOR(S) : Indrajit Dutta et al.

Page 1 of 1

It is certified that error appears in the above-identified patent and that said Letters Patent is hereby corrected as shown below:

On the Title Page

On page 2, in Column 1, item (56), Other Publications, Line 23, delete "Coposite" and insert -- Composite --, therefor.

On page 2, in Column 2, item (56), Other Publications, Line 10, delete "Stber" and insert -- Stober --, therefor.

On page 2, in Column 2, item (56), Other Publications, Line 43, delete "Temperautre" and insert -- Temperature --, therefor.

In the Claims

In Column 36, Line 16 (approx.), Claim 21, delete "96%," and insert -- 96%; --, therefor.

Signed and Sealed this  
Twenty-fifth Day of July, 2023

Katherine Kelly Vidal  
*Director of the United States Patent and Trademark Office*